(12) United States Patent
Akita et al.

(10) Patent No.: US 7,351,486 B2
(45) Date of Patent: Apr. 1, 2008

(54) DIRECT TYPE FUEL CELL POWER GENERATOR

(75) Inventors: Masato Akita, Yokohama (JP); Takashi Yamauchi, Yokohama (JP); Masahiro Takashita, Kawasaki (JP); Eiichi Sakaue, Tokyo (JP); Kei Matsuoka, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 714 days.

(21) Appl. No.: 10/722,607

(22) Filed: Nov. 28, 2003

(65) Prior Publication Data
US 2004/0166393 A1    Aug. 26, 2004

(30) Foreign Application Priority Data
Nov. 28, 2002  (JP) .............................. 2002-346213
Mar. 31, 2003  (JP) .............................. 2003-096694

(51) Int. Cl.
*H01M 8/10* (2006.01)
(52) U.S. Cl. .......................................... 429/32; 429/33
(58) Field of Classification Search ...................... None
See application file for complete search history.

(56) References Cited

U.S. PATENT DOCUMENTS 5,863,671 A    1/1999   Spear, Jr. et al.

FOREIGN PATENT DOCUMENTS

| JP | 6-60905 | 3/1994 |
|----|---------|--------|
| JP | 8-273696 | 10/1996 |

*Primary Examiner*—Patrick Joseph Ryan
*Assistant Examiner*—Julian Mercado
(74) *Attorney, Agent, or Firm*—Oblon, Spivak, McClelland, Maier & Neustadt, P.C.

(57) ABSTRACT

A direct type fuel cell power generator comprises an anode electrode including an anode catalyst layer, a cathode electrode including a cathode catalyst layer, a fuel container comprising at least two electromotive portion units, each of which comprises an electrolyte film disposed between the anode electrode and the cathode electrode, the fuel container housing a fuel therein, and a fuel flow path to supply a fuel in the electromotive portion unit. In the power generator, the fuel flow path has a flow path which produces flow-back again from the fuel container to the first electromotive portion unit via the first electromotive portion unit and the second electromotive portion unit, and which is not branched during the flow-back.

3 Claims, 35 Drawing Sheets

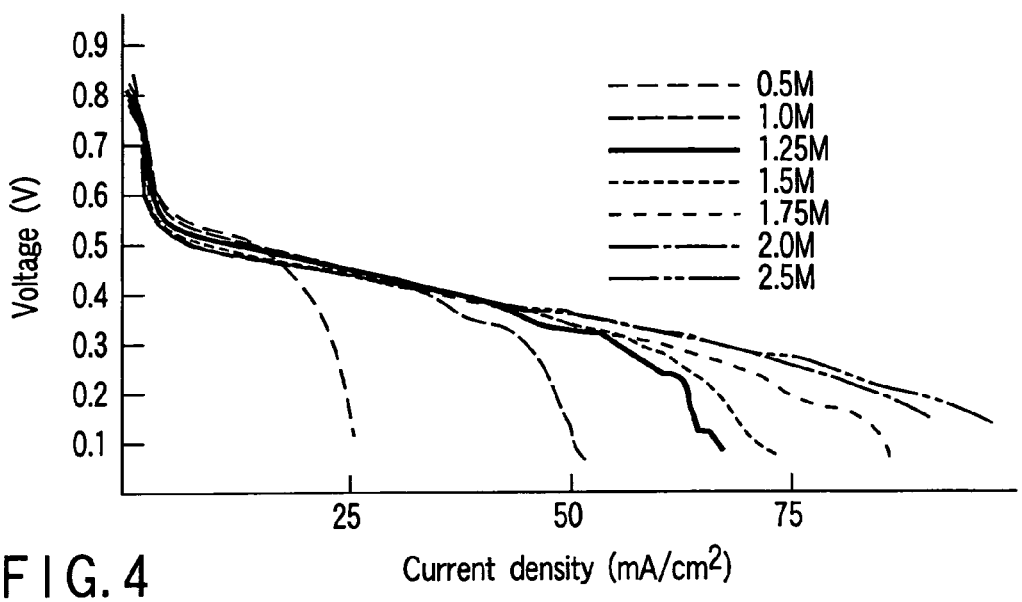
F I G. 4
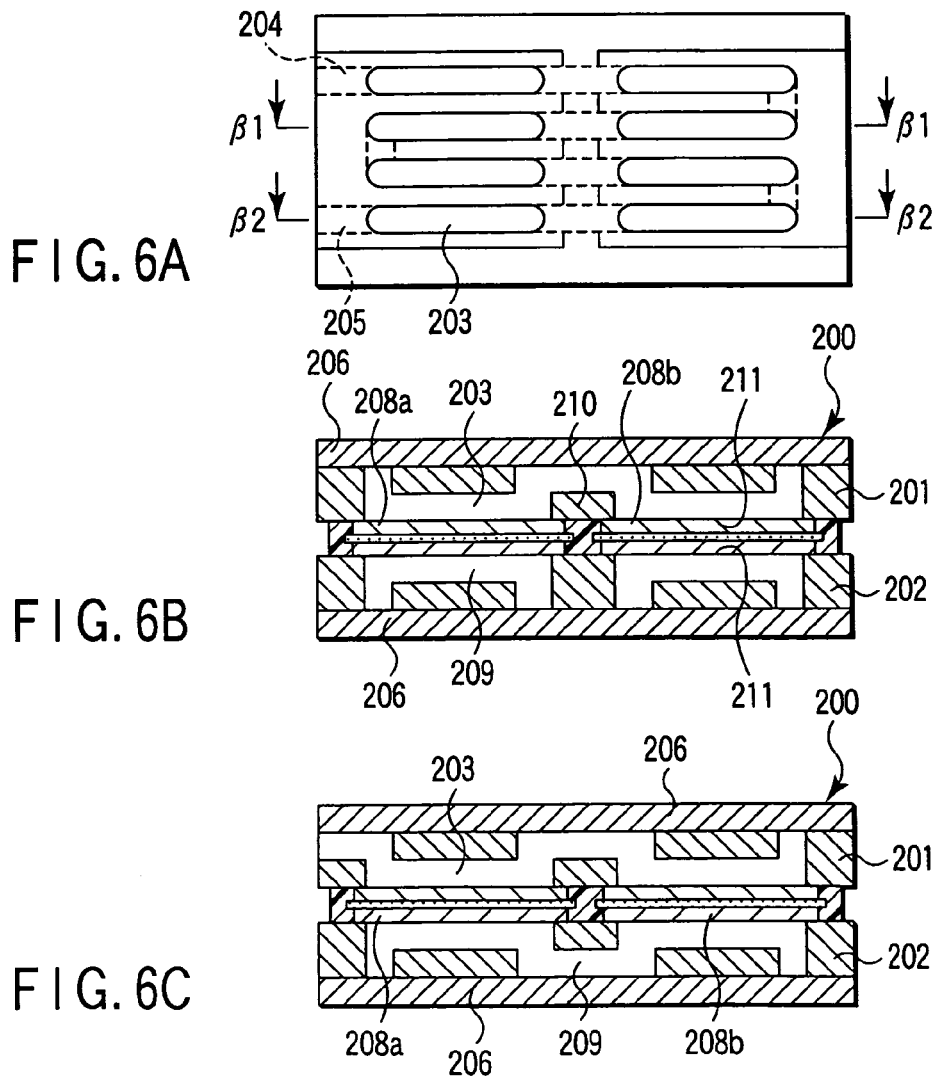
F I G. 6A
F I G. 6B
F I G. 6C

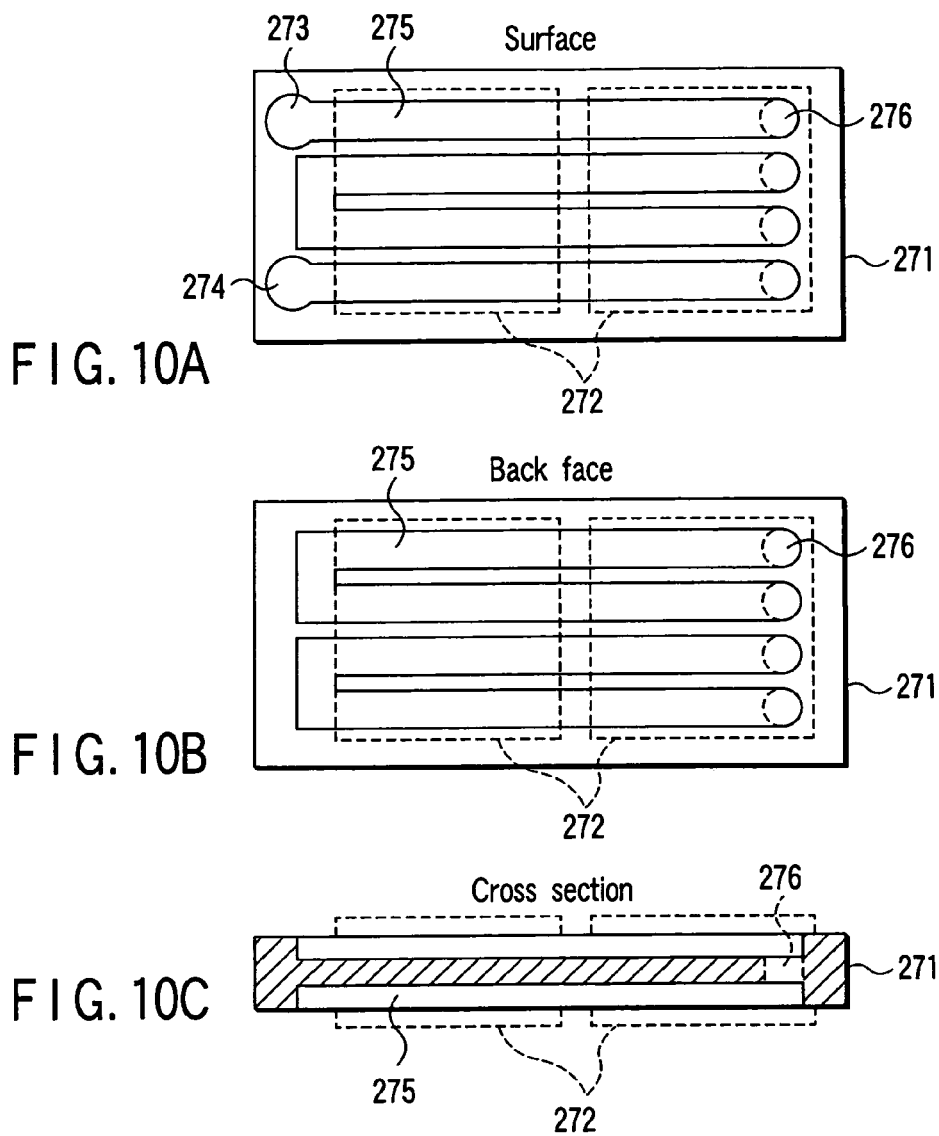
FIG. 10A
FIG. 10B
FIG. 10C
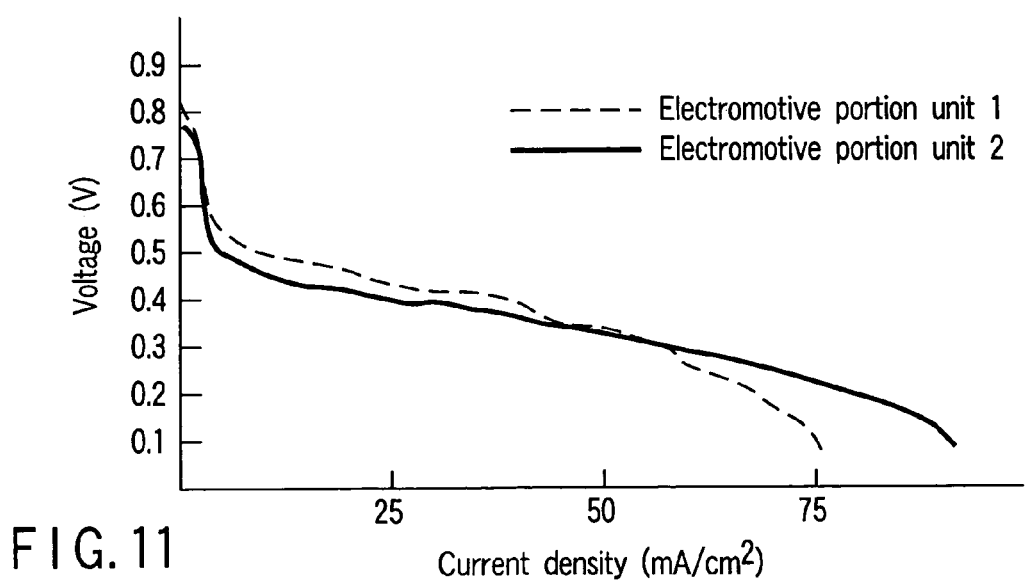
FIG. 11

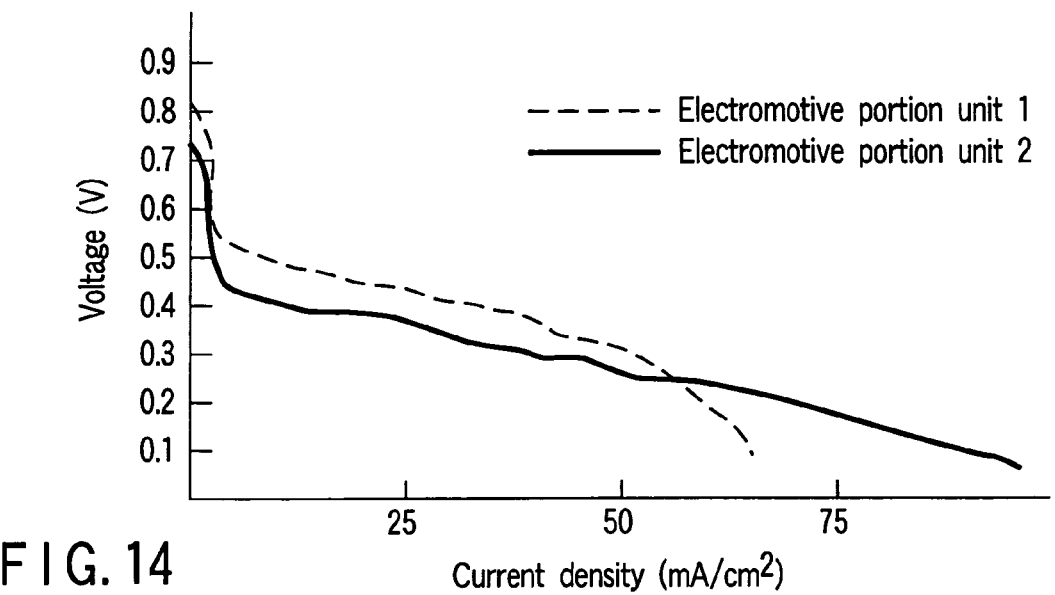
FIG. 14
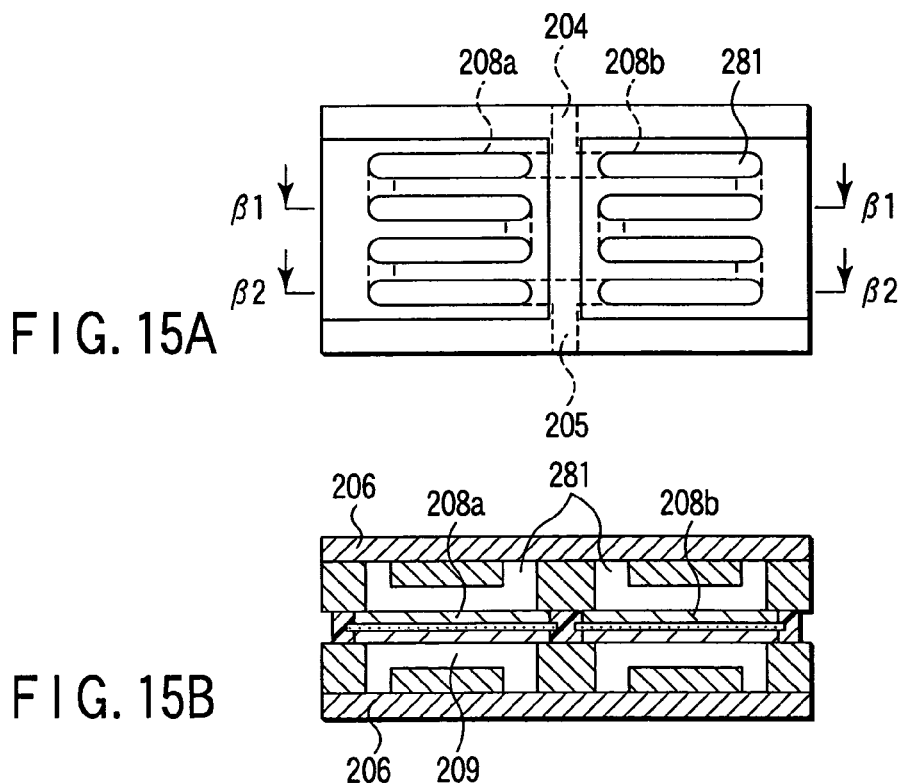
FIG. 15A
FIG. 15B
FIG. 15C

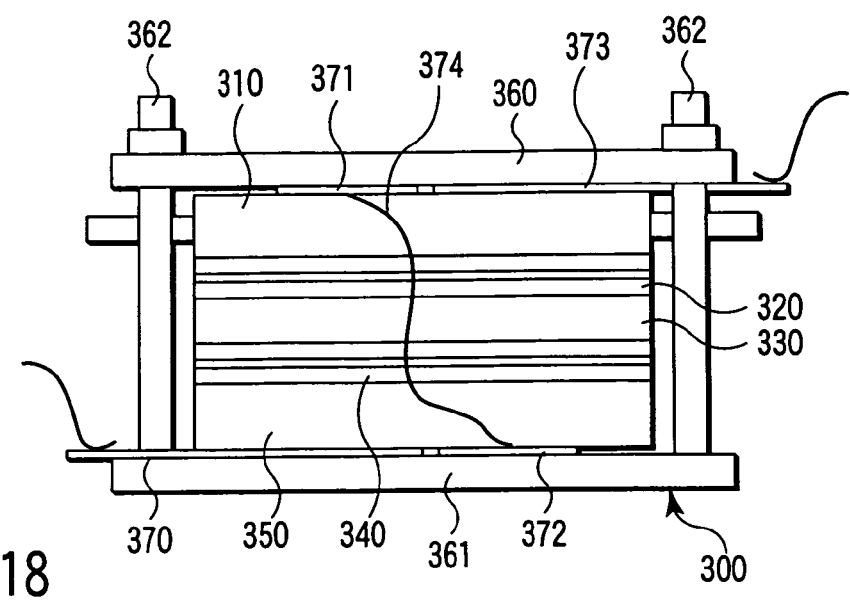
FIG. 18
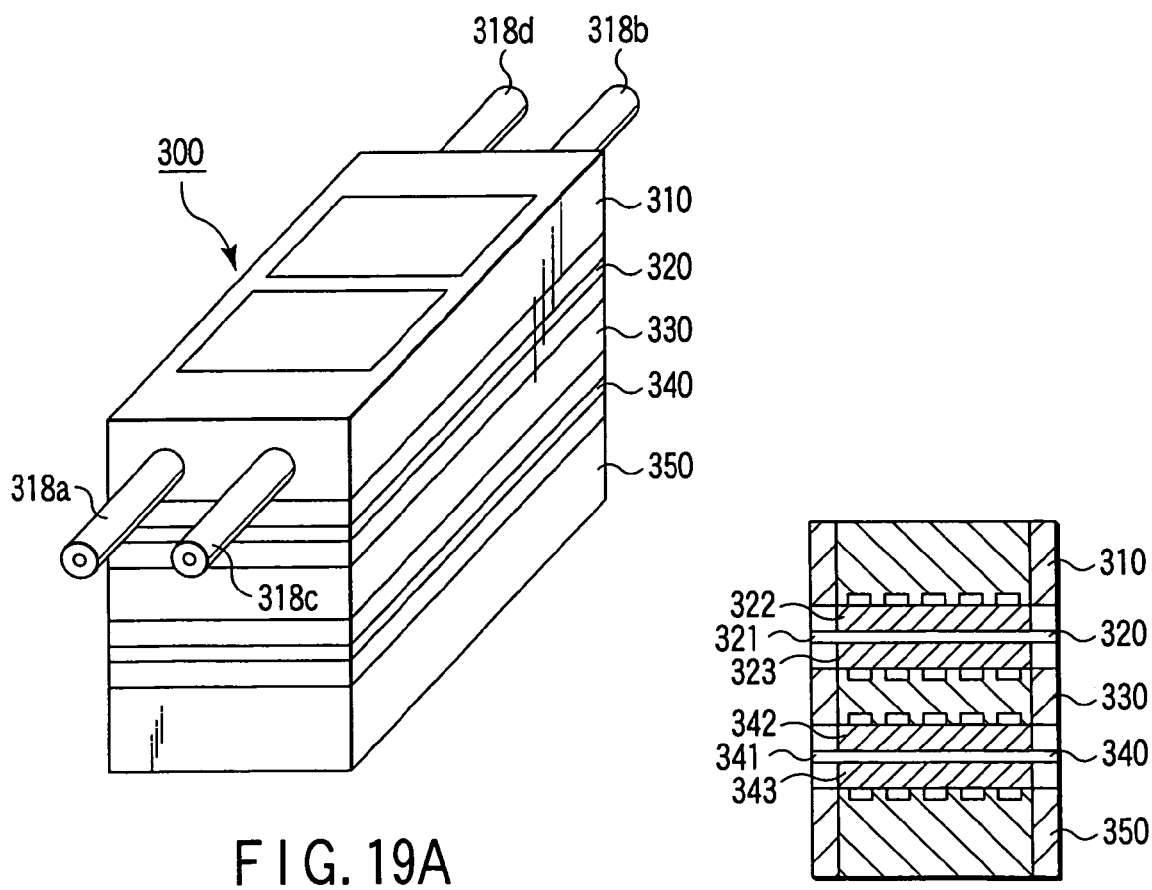
FIG. 19A
FIG. 19B

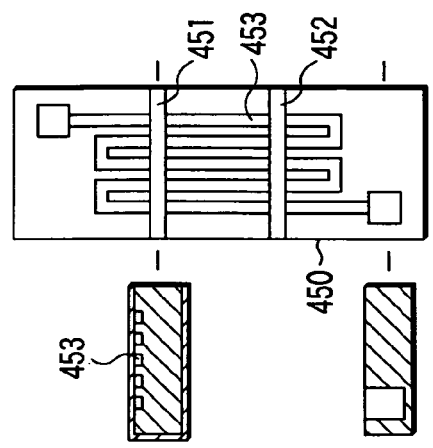
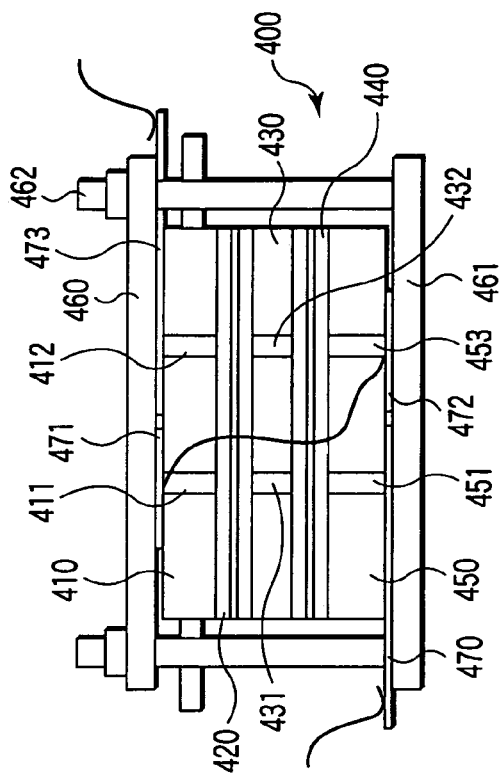
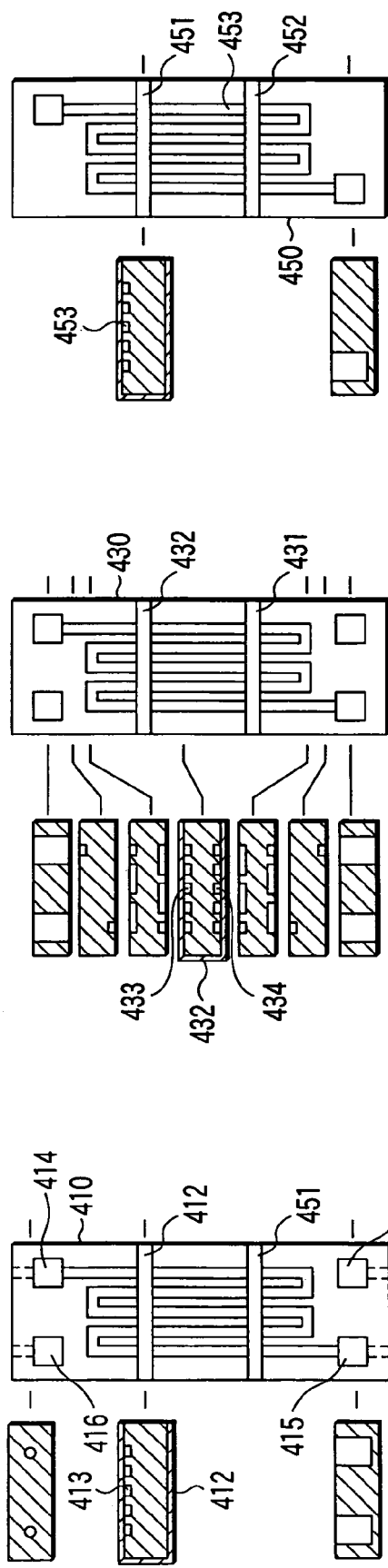
FIG. 27
FIG. 28A
FIG. 28B
FIG. 28C

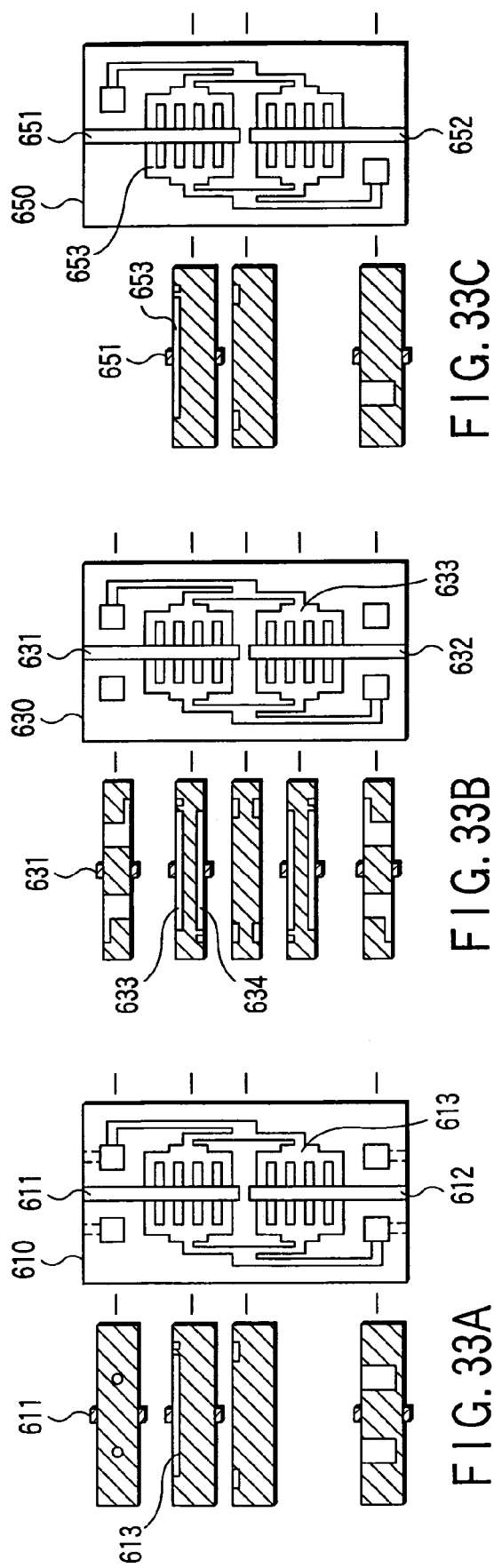
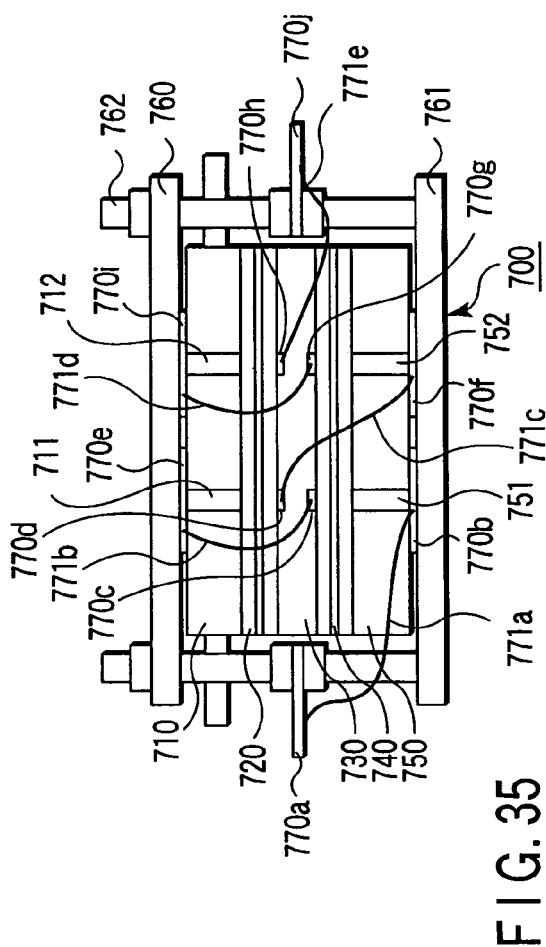
FIG. 33A
FIG. 33B
FIG. 33C
FIG. 35

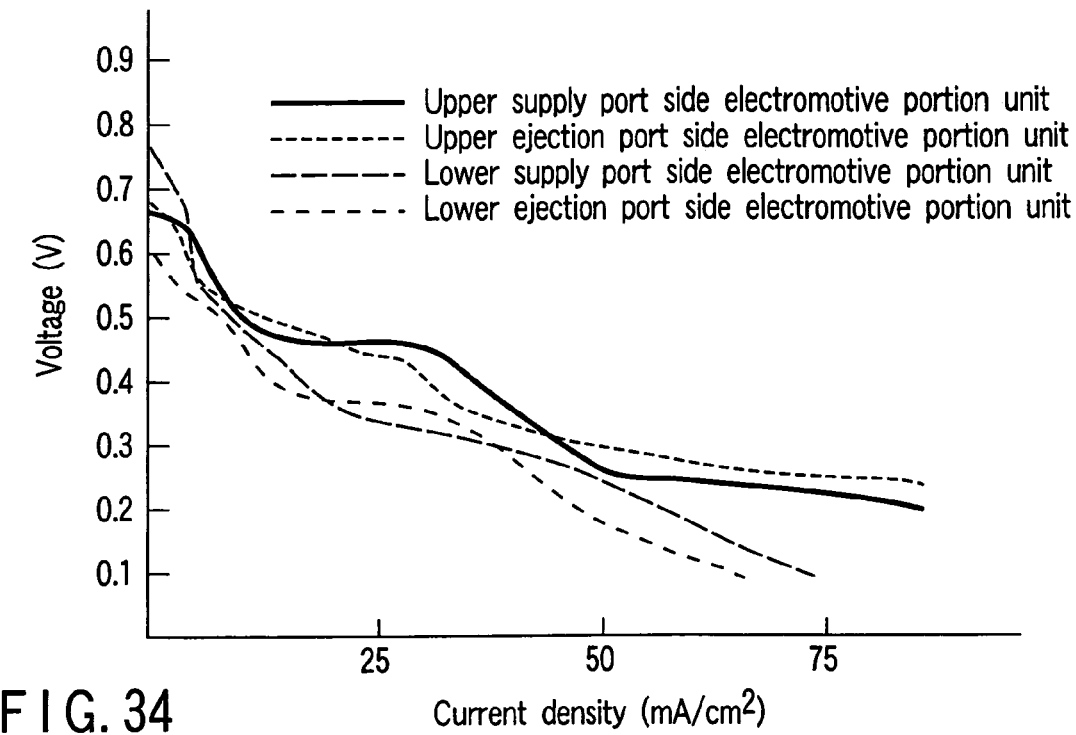
FIG. 34
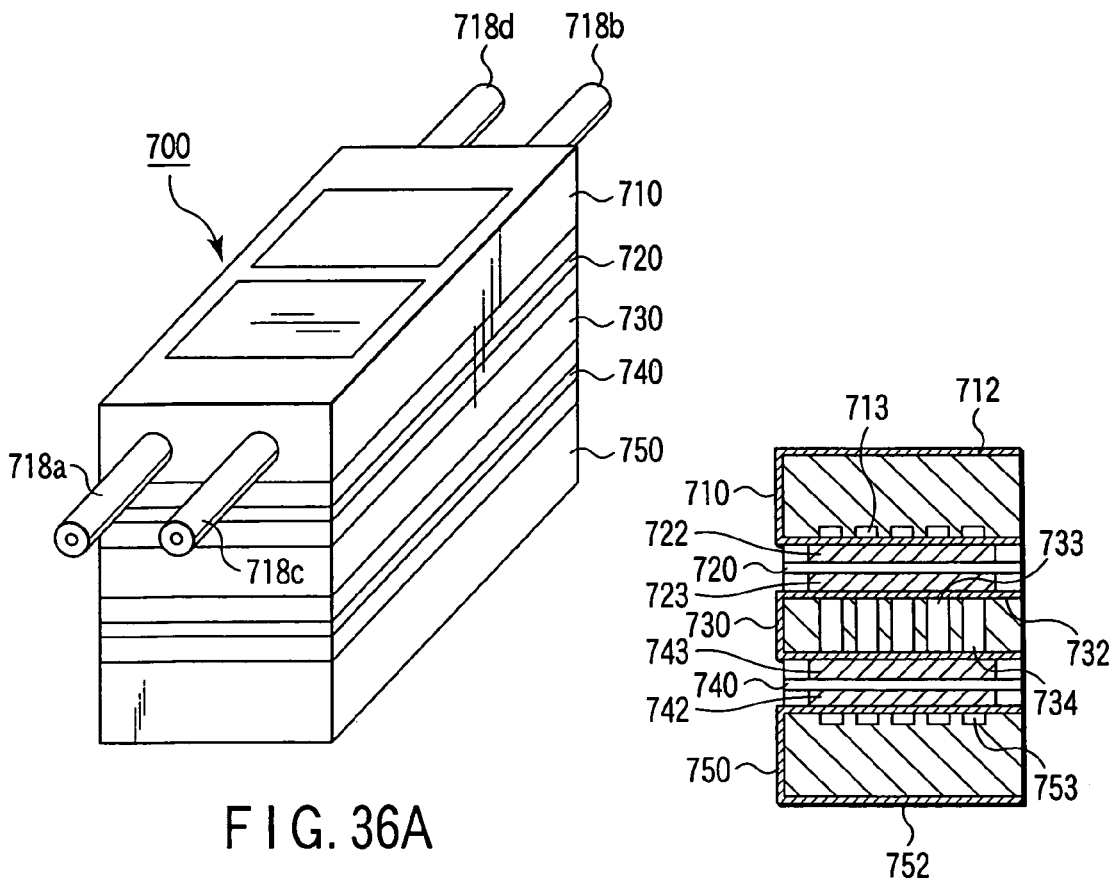
FIG. 36A
FIG. 36B

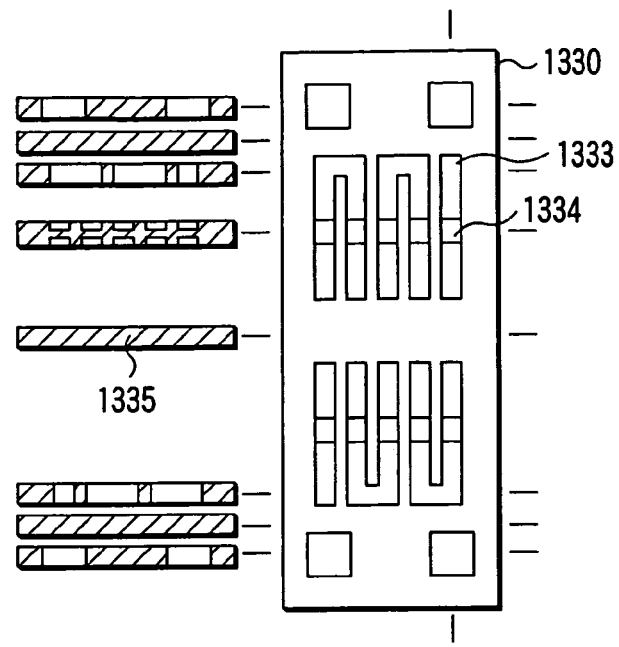
F I G. 49
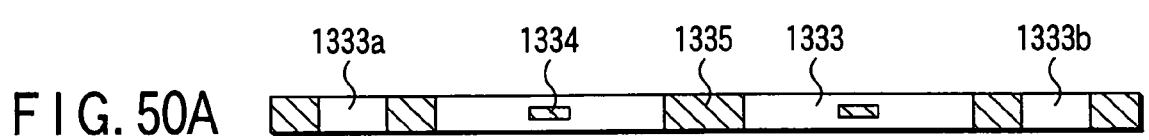
F I G. 50A
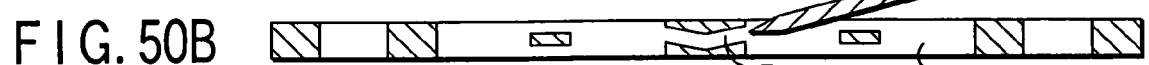
F I G. 50B
F I G. 50C

DIRECT TYPE FUEL CELL POWER GENERATOR

CROSS-REFERENCE TO RELATED APPLICATIONS

This application is based upon and claims the benefit of priority from the prior Japanese Patent Applications No. 2002-346213, filed Nov. 28, 2002; and No. 2003-096694, filed Mar. 31, 2003, the entire contents of both of which are incorporated herein by reference.

BACKGROUND OF THE INVENTION

1. Field of the Invention

The present invention relates to a direct type fuel cell power generator using methanol or a methanol aqueous solution, etc. as a fuel, and more particularly, to a direct type fuel cell power generator in which a stable output can be obtained by improving a shape of a flow path of a flow path plate through which a fuel flows.

2. Description of the Related Art

A fuel cell is provided as a device which converts chemical energy having a fuel such as hydrogen, hydrocarbon, or alcohol by electrochemical reaction. This device is expected as a power generator of high efficiency and low pollution type.

In such fuel cells, a solid polymer type fuel cell for which an ion exchange resin film is used as an electrolyte is provided as a fuel cell whose development has been accelerated as a power source for electric automobile or a power supply for housing in recent years. The solid polymer type fuel cell supplies a fuel gas containing hydrogen to an anode electrode side and an oxygen gas or air to a cathode electrode side. In the anode electrode and cathode electrode, reactions shown in (Formula I) and (Formula II) respectively occur, and an electromotive force is generated.

Anode electrode: $2H_2 \rightarrow 4H^+ + 4e^-$ (Formula I)

Cathode electrode: $O_2 + 4H^+ + 4e^- \rightarrow 2H_2O$ (Formula II)

That is, by means of a catalyst inside of the anode electrode, an electron and a proton are generated from hydrogen, and the electron is captured by an external circuit. After the proton is conducted inside of a proton conductive electrolyte film, when the conducted proton reaches the cathode electrode, the proton reacts on the electron and oxygen on the catalyst inside of the cathode electrode, and then, water is generated. Power is generated by such an electrochemical reaction.

On the other hand, in recent years, attention has been paid to a direct type methanol fuel cell. FIG. 59 shows a structure of an electromotive portion unit in the direct type methanol fuel cell. The direct type methanol fuel cell is constituted by sandwiching a proton conductive electrolyte film 7 (for example, a perfluorocarbon sulfonic acid based ion exchange film is used, and Nafion manufactured by Du Pont Co., Ltd. or the like is preferably used) between an anode electrode 3 and a cathode electrode 6. Each of the electrodes is composed of substrates 1 and 5 and catalyst layers 2 and 4. The catalyst layers each are constituted by a catalyst or a carbon black to which a catalyst has been carried being dispersed to a perfluorocarbon sulfonic acid resin. In general, as a catalyst, there is generally used a precious metal catalyst or an alloy of the metal. In many cases, the catalyst is used by carrying it on a carrier such as a carbon black. As a catalyst for the anode electrode, a Pt—Ru alloy is preferably used. Alternatively, as a catalyst for the cathode electrode, Pt is preferably used. In order to drive this fuel cell, methanol and water are supplied to the anode electrode side, and an oxygen gas or air is supplied to the cathode electrode side, whereby the reactions shown in (Formula III) and (Formula IV) occur with the anode electrode and cathode electrode, respectively.

Anode electrode: $CH_3OH + H_2O \rightarrow CO_2 + 6H^+ + 6e^-$ (Formula III)

Cathode electrode: $(3/2) O_2 + 6H^+ + 6e^- \rightarrow 3H_2O$ (Formula IV)

That is, by means of a catalyst in the anode electrode catalyst layer, an electron, a proton, and carbon dioxide are generated from methanol and water, and the generated carbon dioxide is discharged into air. The electron is externally captured as a current. In addition, the proton moves on the proton conductive electrolyte film, reaches the cathode electrode, and reacts on an electron and oxygen, and then, water is generated. Power is generated based on this electrochemical reaction.

In this direct type methanol fuel cell power generator, a closed circuit voltage is generally 0.6 V to 0.8 V, and in actual power generation with a charge current, the voltage drops to a voltage close to 0.5 V. Therefore, in order to obtain a voltage at which operation of an electronic circuit or electric equipment is compensated for, it is required to electrically connect a plurality of electromotive portion units. Hence, there is need to stack the plurality of electromotive portion units, and provide a flow path shape or pipe for uniformly supplying a fuel to these units, and a variety of proposals have been made.

Many flow paths or pipes can be roughly divided into two structures, i.e., a parallel type flow path structure and a serial type flow path structure. In the parallel type flow path structure, the pipes or flow paths guided from a fuel container housing a fuel therein are branched by the number of electromotive portion units. In the serial type flow path structure, one flow path circulates a plurality of electromotive portion units sequentially.

However, in the former case, a dispersion of a fuel supply state with respect to each electromotive portion unit, the dispersion being caused by branching of the flow paths or pipes, is prone to occur, and there is a need to make further contrivance for decreasing such a dispersion. In the latter case as well, since a fuel is consumed serially in a plurality of electromotive portion units, there occurs a difference in output due to a fuel concentration difference in electromotive portion units positioned at the first half of the flow paths and in electromotive portion units positioned at the latter half of the flow paths. Also in this case, there is a need to design a fine flow path shape for decreasing the difference.

In addition, as a method for stacking a plurality of electromotive portion units and flow path plates, there is widely used a bipolar structure in the anode electrodes or cathode electrodes in the electromotive portion units are arranged in a unidirectional manner. In this bipolar structure, a flow path plate separating electromotive portion units is formed of a member made of an electrically good conductor, a fuel flow path is applied to one face of one flow path plate to supply a fuel, an oxidizing agent flow path is applied to the other face to supply an oxidizing agent, and these flow path plates are merely stacked alternatively in the electromotive portion units, whereby an electrical series state can be easily obtained. That is, electrical wiring for making serial electrical outputs from a plurality of electromotive portion units can be eliminated, thus making it possible to simplify a stack structure.

However, in actuality, in many cases, there is provided means in which a plurality of stack units of the number of stacks for which a mechanical strength or spatial restriction is compensated are disposed in parallel, each of which is electrically connected. For example, there is proposed a structure such that conductive flow path plates are insulated and aggregated with each other by using an insulating member. In ensure downsizing of this bipolar type stack, reduction of a flow path plate itself in thickness is the most effective except an element which depends on an electromotive portion unit itself, and a study has been made from structural and material points of view.

In order to structurally reduce the thickness of a flow path plate, there are considered a method for reducing the depths of anode and cathode flow paths and a method for reducing the thickness of a layer for partitioning the anode and cathode flow paths. In the former method, the depths of the flow paths are restricted by a pressure loss in flow path. Theoretically, it is possible to remarkably reduce the depths of the flow paths as long as a burden on a pump is ignored. However, in actuality, consideration must be taken into power generation efficiency and machining precision in an overall system including power consumed in a pump. The latter method is restricted by a fuel for a material or permeability for an oxidizing agent, and the strength of a material is restricted as film thickness is reduced.

Moreover, an attempt has been made to reduce a flow path plate in thickness from a material point of view. In general, as a material for flow path plate, there is often used a carbon which is a material having electrical conductivity. However, it is impossible to provide a pure carbon of 1 mm to 2 mm or less in thickness from the viewpoints of strength, permeability, and machining precision. Therefore, a slight amount of resin is permeated or mixed, whereby a material with the improved characteristics is used. However, if a rate of a nonconductive component other than carbon is increased, in general, it is difficult to provide such a characteristic compatible with a strength of resin or plastics suitable to small molding.

Because of this, there is proposed that a metal is used as a flow path plate in view of solving a program with strength or permeability in the above-described carbon based flow path plate. However, the flow path plate is provided as a portion which comes into contact with a fuel or oxidizing agent and an electrode portion and captures a current. Thus, a metal used as a material for flow path plate must have sufficient corrosion resistance. Metals available from a chemical point of view include precision metals such as gold, platinum, rhodium, iridium, ruthenium and the like. A flow path plate using these metal materials are hardly considered to be industrially applied from a cost efficiency. Therefore, in general, in forming a metal flow path plate, there is employed a technique for applying coating using the above precision metal onto an entire surface of a base material made of titanium or partial alloy which is a base metal having slight corrosion resistance. However, also in the thus prepared flow path plate, if a scratch of pinhole size occurs during electrode tightening, corrosion is considered to advance from such a scratched portion. In view of the above-described cost efficiency, currently, it is considered advantageous to use a carbon as a material for flow path plate rather than a metal.

As has been described above, a variety of attempts have been made to reduce a bipolar type stack in thickness from structural and material points of view, but remarkable improvement has not been achieved. In such a circumstance, as one of the methods for structurally reducing the stack in thickness, in recent years, there has been proposed a mono-polar type stack structure in which only an oxidizing agent or fuel is supplied to one flow path plate, and only a cathode electrode or an anode electrode is arranged on both faces of the flow path plate.

In the mono-polar structure, as compared with the bipolar structure, there is a disadvantage that an electrical series state according to a plurality of electromotive portion units cannot be easily formed merely by stacking them because the orientations at both ends of the electromotive portion units are not uniformed in a stacking direction. On the other hand, since only either of the oxidizing agent and fuel is supplied to one flow path plate, there is no need to make top and bottom flow paths independent of each other. Therefore, the mono-polar structure is structurally advantageous in that the thickness of partitioning the top and bottom flow paths can be eliminated. In addition, in a flow path equivalent to a depth equal to that in the bipolar structure as well, a wet edge length is reduced, and thus, a pressure loss of the flow path is expected to lower, making it possible to further reduce the depth of the flow path.

Accordingly, a mono-polar type stack structure is expected as a stack structure of a fuel battery power generator oriented to a portable information terminal, the stack structure requiring downsizing in particular. Further, in the case where such an application is considered, there is expectedly proposed a mono-polar type stack structure for direct type methanol fuel cell, in which there is a high possibility that a direct type methanol fuel cell which does not require a complimentary device such as a vaporizing device or refining device is used.

In the direct type methanol fuel cell, a methanol aqueous solution is consumed at an anode electrode, and hydrocarbon that is a reaction product at the anode electrode is generated as air bubbles. In addition, the volume of carbon dioxide that is the generated gas is several times as compared with a methanol aqueous solution that is a liquid to be supplied. The volume expansion of carbon dioxide in a flow path is one of the main causes which prevents the flow of the methanol aqueous solution in the flow path. Once prevention of the flow of the methanol aqueous solution inside of the flow path, such prevention causes a fuel supply rate-determining at the anode electrode, and a high charge current density cannot be obtained.

That is, this denotes a lowered output of a direct type methanol fuel cell, and such an output cannot be recovered until carbon dioxide retained in the flow path has been swept. This program with a gas-liquid double layer flow may occur in the flow path at the cathode electrode side. However, the problem is much more serious than a problem which occurs inside of the flow path at the cathode electrode side by virtue of reasons such as small liquid volume change rate than gas and greater inter-wall frictional force. That is, the above problem is more serious in a direct type methanol fuel cell for supplying a liquid fuel than a solid polymer type fuel cell (PEM, PEFC) in which gaseous hydrogen is supplied as a fuel to the anode electrode, and further, no gaseous product is obtained. A flow path design from this point of view is important in proposing a mono-polar type flow path plate for direct methanol fuel cell.

First, in general, a cross section of a flow path is reduced in order to achieve a smooth flow of a methanol aqueous solution inside of the flow path in the direct methanol fuel cell. This is because carbon dioxide generated inside the flow path is easily pushed out by efficiently increasing a flow rate of the fuel flowing the flow path. Further, a serpentine type flow path exhibiting a shape in which a narrow flow path is folded back many times is well used as a flow path of a direct type methanol fuel cell in order to deliver a fuel to an entire face of an electromotive portion unit in a state in which the cross section of the flow path is reduced.

In particular, since this serpentine type flow path can be easily formed as a bipolar type flow path plate, in forming the bipolar type flow path plate, the serpentine type flow path is often used. Furthermore, in order to increase power generation efficiency, a comb type protrusion partitioning the adjacent flow paths in an opposite manner is reduced in width so as to increase an area in which the electromotive portion unit and methanol aqueous solution come into contact with each other.

However, if the comb type protrusion is extremely reduced in width in order to increase power generation efficiency, the outer-most power collecting portion of an electrode in the electromotive portion unit is porous. Thus, air bubbles of carbon dioxide expanding therefrom short-circuits at the adjacent flow paths, and a pressure is not applied correctly in a direction in which the flow path advances. Because of this, there occurs a problem that a fuel is retained at a flow path portion which is short-circuited and through which no air bubbles pass. Conversely, there occurs a problem that, if a fuel short-circuit occurs, carbon dioxide is retained. Therefore, in general, the width of the comb shaped protrusion structure is often designed primarily by about 1 mm.

In other words, in order to ensure proper fuel supply to the bipolar type flow path plate in the direct type methanol fuel cell, it is desirable that a serpentine type flow path of about 1 mm in width of the comb type protrusion structure be used. Further, it is required to push an electrode face of the electromotive portion unit against a flow path plate by applying a proper pressure.

However, a similar flow path structure cannot be used for a mono-polar type flow path plate. This is because, in the serpentine type flow path produced so as to penetrate both faces of the flow path plate, the comb type protrusion structure is established in a floated state only at one small portion from the periphery of the flow path plate, and even under a pressure in the flow path which is not so problematic in the bipolar type flow path plate, the short-circuit of carbon dioxide or fuel easily occurs. Also, a method which solves this problem is not proposed yet. As a flow path shape of a mono-polar type flow path plate which has been studied in recent years, there is merely used a simple structure in which a plurality of linear flow paths are arranged in parallel. Accordingly, there is expectedly proposed a flow path shape for improving power generation efficiency and a flow path plate structure or material for achieving such a shape.

The above-described problems with the mono-polar structure are similar in the case of a flow path plate made of metal which can be easily formed. As the cutting faces of the flow path plate are very large in number, making it further difficult to increase the uniformity of corrosion resistance processing. In addition, as in the bipolar structure, in the case where the electromotive portion units are arranged in parallel in a planer direction of the flow path plate, a complicated structure via an insulating member must be unavoidably provided.

The following problem with the above-described direct type methanol fuel cell has occurred. That is, the direct type methanol fuel cell is expected to be used as a power source of a portable electronic device from a height of energy density of methanol which is a liquid fuel. In addition, there is no need for fuel pressurization from the viewpoint of a liquid fuel. Further, there is a low possibility that a fuel leakage occurs from a gap between a flow path and an electromotive portion unit as compared with a solid polymer type fuel cell which uses hydrogen as a fuel. Therefore, unlike a fuel supply flow path of the solid polymer type fuel cell, it is considered possible to provide a comparatively complicated flow path structure or flow path disposition. However, there is not proposed a flow path structure in a direct type methanol fuel cell power generator which solves problems with the parallel type flow path and the serial type flow path, respectively.

Moreover, as long as a flow path plate consisting essentially of a carbon for power collection is used, rapid development and production of a small sized fuel cell power generator for portable device becomes obstacle due to necessity of improvement and development of a carbon material for reducing one flow path plate in thickness; necessity of technique for integrated molding using an insulating material for making the plates in parallel in a planar direction; or complication or the like in which plural types of members are required in a production process.

BRIEF SUMMARY OF THE INVENTION

It is therefore an object of the present invention to provide a direct type methanol fuel cell power generator composed of a plurality of electromotive portion units, the power generator being capable of reducing a deflection in output on an electromotive portion unit by unit basis and ensuring stable fuel supply.

In order to solve the above-described problems and to achieve the object, a direct type fuel cell power generator according to the present invention is configured as follows.

According to a first aspect of the present invention, there is provided a direct type fuel cell power generator comprising: an electromotive portion unit group composed of a plurality of electromotive portion units formed by sandwiching an electrolyte layer between an anode electrode including an anode catalyst layer and a cathode electrode including a cathode catalyst layer; a first flow path plate having formed thereon a first flow path which is disposed in abutment with the anode electrode of the electromotive portion unit group and through which a fuel flows; and a second flow path plate having formed thereon a second flow path which is disposed in abutment with the cathode electrode of the electromotive portion unit group and through which a oxidizing agent flows, wherein the first flow path passes so as to come into contact with all anode electrodes in the electromotive portion unit group without branching from an inlet thereof to an outlet, and is formed so as to come into contact with an anode electrode of at least one electromotive portion unit a plurality of times.

According to a second aspect of the present invention, there is provided a direct type fuel cell power generator comprising: an electromotive portion unit group composed of a plurality of electromotive portion units formed by sandwiching an electrolyte film between an anode electrode including an anode catalyst layer and a cathode electrode including a cathode catalyst layer; a first flow path plate having formed thereon a first flow path which is disposed in abutment with the cathode electrode of the electromotive-portion unit group and through which an oxidizing agent flows; and a second flow path plate having formed thereon a second flow path which is disposed in abutment with the anode electrode of the electromotive portion unit group and through which a fuel flows, wherein the first flow path passes so as to come into contact with all cathode electrodes in the electromotive portion unit group without branching from an inlet thereof to an outlet, and is formed so as to come into contact with a cathode electrode of at least one electromotive portion unit a plurality of times.

According to a third aspect of the present invention, there is provided a direct type fuel cell power generator comprising: an anode electrode including an anode catalyst layer; a cathode electrode including a cathode catalyst layer; a fuel container comprising at least two electromotive portion units, each of which comprises an electrolyte film disposed between the anode electrode and the cathode electrode, the fuel container housing a fuel therein; and a flow path plate having formed thereon a flow path to supply an oxidizing agent or a fuel to the electromotive portion unit, wherein the flow path has a flow path which produces flow-back again from the fuel container to the first electromotive portion unit via the first electromotive portion unit and the second electromotive portion unit, and which is not branched during the flow-back.

BRIEF DESCRIPTION OF THE SEVERAL VIEWS OF THE DRAWING

FIG. 4 is a characteristic view showing dependency of a current voltage characteristic in an electromotive portion unit of a direct type methanol fuel cell with respect to an initial concentration of a methanol aqueous solution;

FIGS. 6A to 6C are views each showing essential portions of a direct type methanol fuel cell power generator according to a second embodiment of the present invention;

FIGS. 10A to 10C are plan views each showing a modified example of a flow path plate;

FIG. 11 is a view showing a result of a current voltage characteristic of a direct type methanol fuel cell power generator;

FIG. 14 is a view showing a current voltage characteristic of Comparative Example 1 under the operating condition of Example 1;

FIGS. 15A to 15C are views each showing a direct type methanol fuel cell power generator using a parallel type flow path;

FIG. 18 is a side view showing a direct type methanol fuel cell power generator according to a third embodiment of the present invention;

FIG. 19A is a perspective view showing the direct type methanol fuel cell power generator;

FIG. 19B is a transverse cross section showing the direct type methanol fuel cell power generator;

FIG. 27 is a side view showing a direct type methanol fuel cell power generator according to a fourth embodiment of the present invention;

FIGS. 28A to 28C are plan views each showing a flow path plate of the direct type methanol fuel cell power generator;

FIGS. 33A to 33C are views each showing first to third flow path plates incorporated in the direct type methanol fuel cell power generator;

FIG. 34 is a view showing a current voltage characteristic when the direct type methanol fuel cell power generator has been operated under the operating condition of Example 3;

FIG. 35 is a side view showing a direct type methanol fuel cell according to a seventh embodiment of the present invention;

FIG. 36A is a perspective view showing the direct methanol fuel cell power generator;

FIG. 36B is a sectional view showing the direct methanol fuel cell power generator;

FIG. 49 is a flow showing a flow path plate before forming a penetrating portion;

FIGS. 50A to 50C are sectional views each showing a process for forming a penetrating portion;

DETAILED DESCRIPTION OF THE INVENTION

First Embodiment

Figure 1:
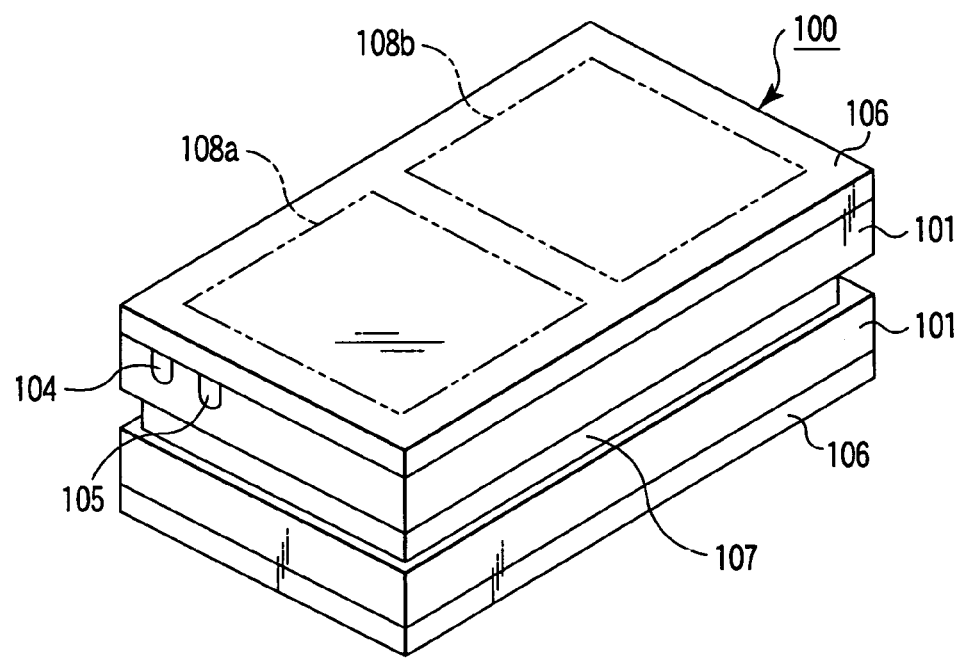
FIG. 1 is a perspective view showing a direct type methanol fuel cell power generator according to a first embodiment of the present invention.
Figure 2B:
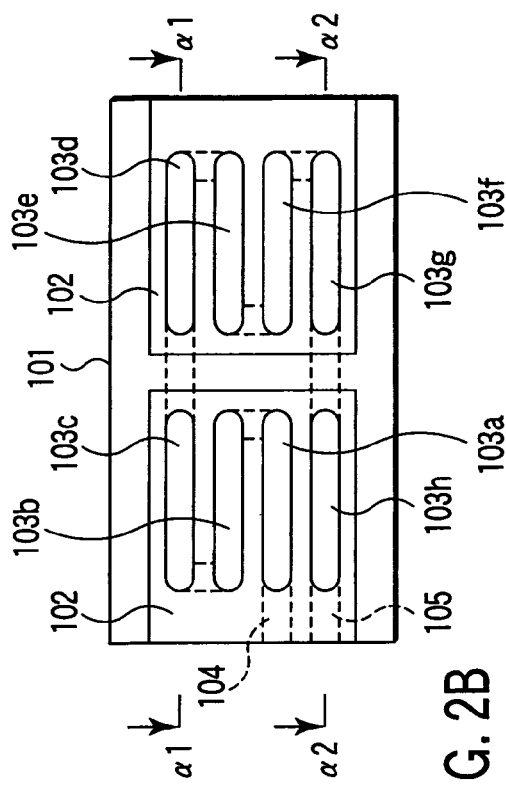
FIGS. 2A to 2D are views each showing essential portions of the direct type methanol fuel cell power generator.
Figure 2D:
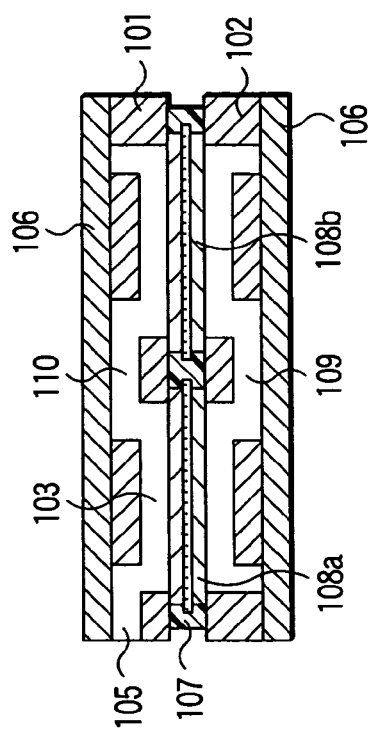
Figure 2A:
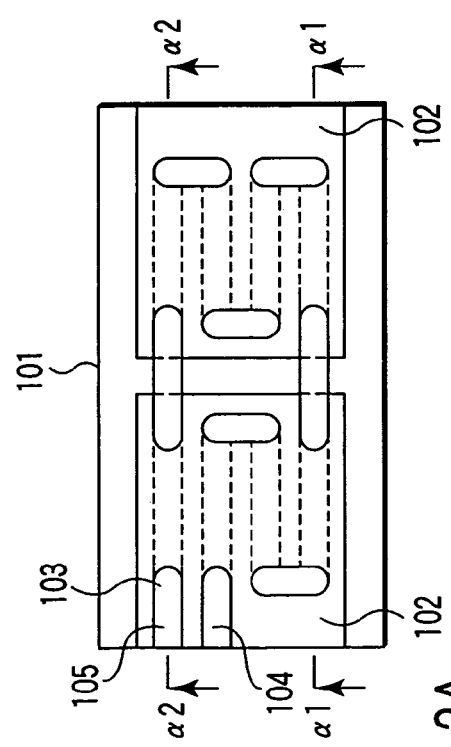
Figure 2C:
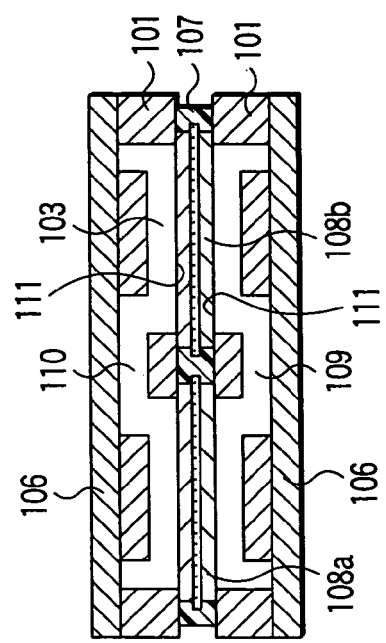

FIG. 1 is a schematic view showing a direct methanol fuel cell power generator 100 having electromotive portion units according to a first embodiment of the present invention. FIGS. 2A to 2D are views each showing essential portions of the direct type methanol fuel cell power generator 100, in which FIG. 2A is a top view showing an insulating flow path plate 101 positioned at the shown top side; and FIG. 2B is a bottom view showing the insulating flow path plate 101 positioned at the shown top side; FIG. 2C is a sectional view viewed in a direction indicated by the arrow, the sectional view being taken along the line α1-α1 in FIGS. 2A and 2B; and FIG. 2D is a sectional view viewed in a direction indicated by the arrow, the sectional view being taken along the line α2-α2 in FIGS. 2A and 2B.

In FIGS. 2A to 2D, reference numeral 101 designates an insulating flow path plate (fuel side); 102 designates an insulating flow path plate (oxidizing agent side); 103 designates a fuel flow path; 104 designates a fuel flow path supply port; 105 designates a fuel flow path ejection port; 106 designates a flow path cap body at a back face of the flow path; 107 designates a resin based sealing member; 108a and 108b each designate an electromotive portion unit; 109 denotes an air flow path; 110 designates a flow path portion bent to the side of the flow path cap body 106 such that the flow path does not face the electromotive portion units 108a and 108b; and 111 designates a metallic thin film for leading out a current. The electromotive portion units 108a and 108b employ the above-described structure shown in FIG. 58. Reference numerals 103a to 103h in FIGS. 2A to 2D designate individual regions of the fuel flow path 103.

The fuel flow path supply port 104 of essential portions of this power generating portion is connected to fuel supply means via a fuel pump (not shown) so that a fuel is supplied. In addition, an air pump (not shown) for supplying an oxidizing agent such as air is connected to the air flow path 109, and an electrode terminal (not shown) is connected to the metallic thin film 111 for leading out a current, configuring a fuel cell power generator. The shape of the air flow path 109 for supplying an air is identical to that of a conventional parallel type flow path (refer to FIGS. 15A to 15C).

In the thus configured direct type methanol fuel cell power generator, power is generated in the following manner. That is, a fuel such as a methanol aqueous solution supplied from the fuel supply means is supplied from the fuel flow path supply port 104. Then, a fuel flows sequentially through the regions 103a, 103b, and 103c of the fuel supply flow path 103 facing the electromotive portion unit 108a. Further, the fuel flows sequentially through the regions 103d, 103e, 103f, and 103g of the fuel flow path 103 facing the electromotive portion unit 108b, and furthermore, the fuel is discharged from the fuel flow path ejection port 105 to the outside via the region 103h facing the electromotive portion unit 108a. In this way, while the fuel flows through the regions 103a, 103b, 103c, and 103h, the fuel is supplied to an anode electrode substrate of the electromotive portion unit 108a. While the above fuel flows through the regions 103a, 103e, 103f, and 103g, the fuel is supplied to the electromotive portion unit 108b.

In the direct type fuel cell power generator according to the present embodiment, at the fuel flow path 103 for supplying a fuel to the first electromotive portion unit 108a and the second electromotive portion unit 108b, the fuel flow path 103 passing through the second electromotive portion unit 108b from the first electromotive portion unit 108a circulates so as to supply a fuel to the first electromotive portion unit 108a again without branching the fuel flow path 103. Then, at a plurality of electromotive portion units 108a and 108b, a contact area between the fuel flow path 103 and each of the power generating elements of the electromotive portion units 108a and 108b is adjusted such that an amount of fuel supply is substantially equal to another, thereby making it possible to improve stability of a power generation output.

Figure 3A:
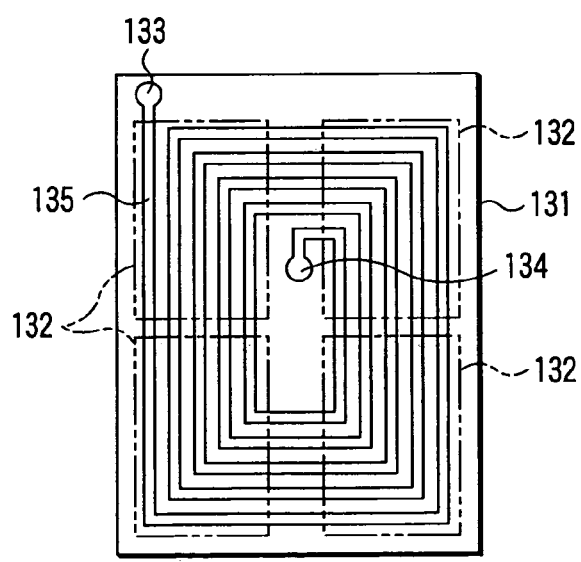
FIG. 3A is a bottom view showing a flow path plate according to a first modified example of the flow path plate.

FIG. 3A is a bottom view showing a flow path plate 131 according to a first modified example of the above-described flow path plate 101. In FIG. 3A, reference numeral 131 designates the flow path plate; 132 designates a portion at which an electrode portion of the electromotive portion unit 108 is disposed; 133 and 134 designate a supply port and an ejection port of A fuel flow path 135; and 135 designates the fuel flow path. In these fuel flow path shapes, a fuel is supplied to an electrode portion of a first electromotive portion unit, and then, is supplied to an electrode portion of another electrode portion unit. Further, the fuel is then supplied to the first or another electromotive portion unit without branching the fuel flow path. Also in this modified example, this fuel cell power generator can achieve advantageous effect identical to the above-described direct type methanol fuel cell power generator 100.

Figure 3B:
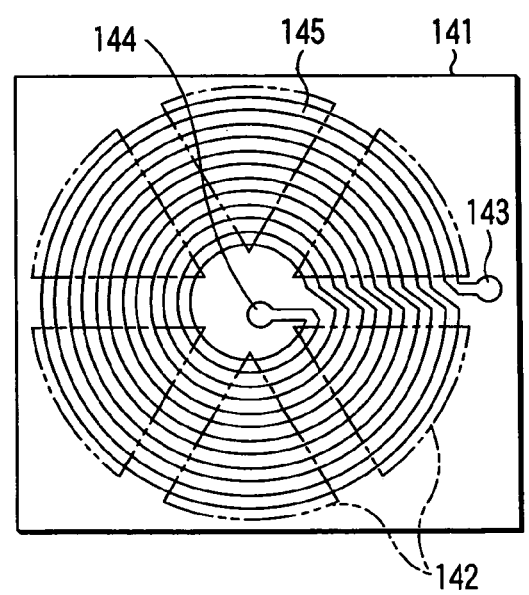
FIG. 3B is a bottom view showing a flow path plate according to a second modified example of the flow path plate.

FIG. 3B is a bottom view showing a flow path plate 141 according to a second modified example of the above-described flow path plate 101. In FIG. 3B, reference numeral 141 designates the flow path plate; 142 designates a portion at which an electrode portion of the electromotive portion unit 108 is disposed; 143 and 144 designate a supply port and an ejection port of a fuel flow path 145; and 145 designates the fuel flow path. In these flow path shapes, a fuel is supplied to an electrode portion of a first electromotive portion unit, and then, is supplied to an electrode portion of another electromotive portion unit. Further, the fuel is then supplied to the first or another electromotive portion unit again without branching the fuel flow path. Also in this modified example, this fuel cell power generator can achieve advantageous effect identical to the above-described direct type methanol fuel cell power generator 100.

In the above first embodiment, an amount of fuel supply to the electromotive portion unit is identical to a current density at the electromotive portion unit, and thus, can be described as in Formula (3) in accordance with a law of conservation of weight.

$$\frac{d}{dZ}(\rho \cdot u) = -\frac{50JS}{6FS_0L_0} \quad (3)$$

In Formula (3), Z denotes a distance (cm) from a flow path supply port of a fuel flow path; S denotes an area (cm$^2$) of an electromotive portion unit; $L_0$ denotes an effective full length (cm) of a fuel flow path; $S_0$ denotes a sectional area (cm$^2$) of a flow path; J denotes a current density (A/cm$^2$); $\rho$ denotes a fuel density (g/cm$^3$) at position Z; $\rho_0$ denotes an initial fuel density (g/cm$^3$); "u" denotes a flow rate (cm/sec) of a fuel in a fuel flow path; and F denotes a Faraday constant 96487 C/mol. A molecular weight of methanol is defined as 32, a molecular weight of water is defined as 18, and the number of electrons obtained per reaction is defined as 6. A solution of Formula (3) is obtained in accordance with Formula (4).

$$\rho = \rho_0 - \frac{25JS}{3FS_0L_0} \cdot \frac{Z}{u} \quad (4)$$

A fuel concentration in Formula (4) is bonded with a molar concentration C (mol/l) of a methanol aqueous solution fuel in accordance with Formula (5) described later, and finally, Formula (6) is derived. In the formula, the density of methanol which is not diluted is defined as 0.8 g/cm$^3$.

$$\rho = 1 - \frac{C}{125} \quad (5)$$

$$C = C_0 - \frac{3125JS}{3FS_0L_0} \cdot \frac{Z}{u} \quad (6)$$

FIG. 4 is a characteristic view showing dependency of a current voltage characteristic in an electromotive portion unit of a direct type methanol fuel cell with respect to an initial concentration of a methanol aqueous solution. In a measuring condition, a temperature is defined as 70° C.; a flow rate of a methanol aqueous solution fuel is defined as 0.07 cm/min; and a flow rate of air is defined as 11 cm/min. An electromotive portion unit whose area can be ignored in length of a fuel flow path or a change of fuel concentration is used. From the fuel concentration dependency of the current voltage characteristic shown in FIG. 4, in the case where a difference in fuel concentration is within the range of 10%, it is understood that a difference between voltage values in a charge current value at a critical charge current density of 50±10% can be ignored. In accordance with Formula (6), it can be understood that a change in distance from a flow supply port is equal to $\Delta C = C_0 - C$ by a change in fuel concentration. That is, even if a flow path length in a given fuel concentration electromotive portion unit is different from another by 10%, it is considered that a difference between voltage values in a charge current value at a critical charge current density of 50±10% can be ignored.

In order to drive a fuel cell power generator with a fuel whose amount is as small as possible for a long period of time, it is required to improve a rate of an amount of power generation captured by an external circuit in an amount of electricity having the supplied fuel, i.e., fuel utilization efficiency. However, as can be seen from Formula (6), it is evident that a decrease of the fuel concentration in the fuel flow path is proportional to a distance from the flow path supply port, and an output at electromotive portion unit positioned at the latter half of the fuel flow path is significantly lowered as fuel utilization efficiency from the fuel supply port to the ejection port increases. That is, this is because a significant decrease (10% or more) of the fuel concentration at the latter half of the fuel flow path leads to a decrease of the critical charge current density. Therefore, there is a need to make contrivance for reducing a temperature difference in a fuel to be supplied to all the electromotive portion units. By using a method for allocating a fuel flow path described later to an electrode portion, it becomes possible to ensure that an average of fuel concentrations supplied to the electromotive portion units is close to another among the electromotive portion units.

Figure 5A:
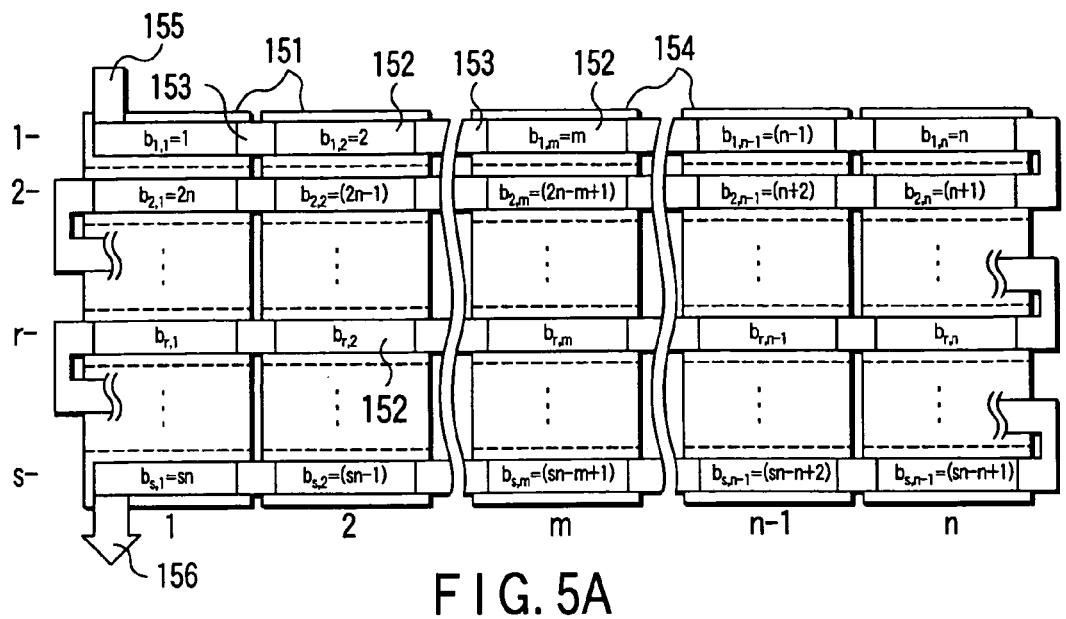
FIGS. 5A to 5C are illustrative views schematically illustrating a method for allocating a fuel flow path.
Figure 5B:
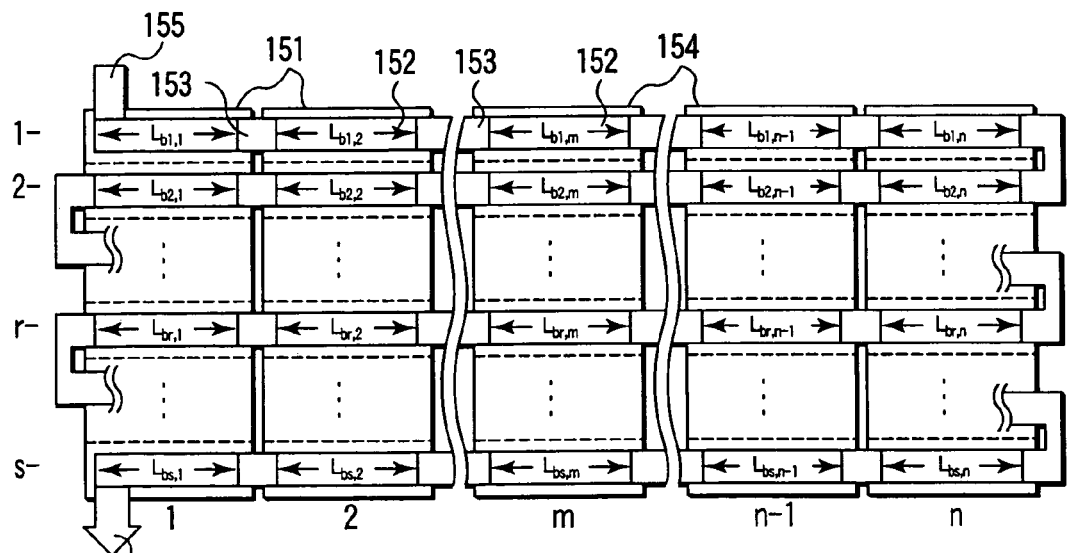

FIGS. 5A and 5B are illustrative views schematically illustrating a method for allocating the fuel flow path defined in Formula (2). A description of FIG. 5C will be given later. In FIGS. 5A and 5B, reference numeral 151 designates an electromotive portion unit; 152 designates a divided effective flow path region; 153 designates a flow path region which is not effective; 154 designates a region of the divided electromotive portion unit; 155 designates a fuel supply port of a fuel flow path; and 156 designates a fuel ejection port of a fuel flow path. FIG. 5A shows a correlation with a region of the divided effective fuel flow path of $b_{r,m}$; and FIG. 5B shows a correlation with the divided effective flow path region of $Lb_{r,m}$.

In FIGS. 5A and 5B, a flow path width is identical to another in any place; "n" denotes the number of electromotive portion units in which a flow path supplies a fuel; and "m" denotes an arbitrary electromotive portion unit in the above electromotive portion units. "s" denotes the number of flows when a fuel flow path flows through electromotive portion units, and is taken as values equal to each other in all the electromotive portion units. That is, the fuel flow path is divided into "s" regions on an electromotive portion unit by unit basis, and entirely, is divided into "ns ($\approx$ h)" regions. Here, in the case where a fuel is supplied to the fuel flow path, all the regions of "ns" electrode portions in the figure are defined as anode electrodes. In the case where an air flow path is provided instead of the fuel flow path, air (oxidizing agent) is supplied. In this case, all the regions of "ns" electrode portions are defined as cathode electrodes.

An arithmetic progression $b_{r,m}$ indicates a natural number ranging from 1 to "h", the number being allocated to regions divided into "h" sections, as shown in FIG. 5A. In FIG. 5A, in the fuel flow path, the fuel flows through a first region $b_{1,1}$ a second region $b_{1,2}$, a third region $b_{1,3}$, ... an "n-th" region $b_{1,n}$. Then, the fuel flows through another region $b_{2,n}$ in the last "n-th" electromotive portion unit, from where the fuel flows trough regions in reversed order, and returns to the first electromotive portion unit. In FIG. 5A, this operation is repeated s/2 times, and therefore, a lowercase letter "s" is defined as an even number.

It is indicated that an arithmetic progression $b_{r,m}$ meet a recursion formula of Formula (7). In general, a solution of this Formula (7) can be expressed as Formula (8), and thus, the above-described Formula (2) is derived from Formula (9) obtained by substituting Formula (7) for Formula (8).

$$b_{r,m} - b_{r-1,m} = n + (-1)^{r-1}(2m-n-1) \quad (7)$$

$$b_{r,m} = b_{1,m} + \sum_{i=2}^{l} (b_{i,m} - b_{i-1,m}) \quad (8)$$

$$b_{r,m} = b_{1,m} + \sum_{i=2}^{r} [n + (-1)^{i-1}(2m-n+1)] \quad (9)$$

As shown in Formula (6), the concentration of the fuel in the fuel flow path decreases in proportion to a distance from the flow path supply port. Therefore, in order to reduce a difference in fuel concentration supplied to the electromotive portion units each, a difference on an electromotive portion unit by unit basis, between average distances from the flow path regions 1 to "s" passing through the electromotive portion units, may be reduced. An effective length from the fuel supply port of a flow path region "r" ($1 \leq r \leq s$) divided by an arbitrary electromotive portion unit "m" ($1 \leq m \leq n$) is defined in accordance with Formula (10).

$$Z_{b_{r,m}} = \sum_{i=1}^{b_{r,m}} L_{b_{r,m}} \quad (10)$$

In the formula, $Lb_{r,m}$ denotes a length of he flow path region "r" divided by the electromotive portion unit "m". Further, it is required to average the effective fuel concentrations supplied from the flow path in the electromotive portion unit "m", in "s" flow path regions passing through the electromotive portion unit."m". The effective fuel concentration supplied to this electromotive portion unit "m" may be thought to depend on a length obtained by averaging $Zb_{r,m}$ defined in accordance with Formula (10) with respect to "s" flow path regions. An effective length $Z_m$ between this electromotive portion unit "m" and the flow path supply port is defined in accordance with Formula (11).

$$Z_m = \frac{1}{s} \sum_{i=1}^{s} Z_{b_{r,m}} \quad (11)$$

Further, what is the most ideal is that all values of $Lb_{r,m}$ are designed to the identical length, and distribution of the flow paths may be carried out. If all the values $Lb_{r,m}$ set to the identical length are defined as $L_e$, a formula obtained by substituting Formula (10) for Formula (11) can be rewritten as in Formula (12) below.

$$\langle Z_m \rangle = L_e \frac{1}{s} \sum_{i=1}^{s} b_{i,m} \quad (12)$$

In the formula, $\langle Z_m \rangle$ denotes an average of $Lb_{r,m}$ values in an "m"-th electromotive portion unit when all the values $Lb_{r,m}$ are defined as $L_e$. Further, when a length obtained by averaging the values $\langle Z_m \rangle$ with respect to "n" electromotive portion units, $\langle Z \rangle$ is defined as Formula (13). When calculation is actually executed, it is indicated that the calculated value is given in accordance with Formula (14).

$$\langle Z \rangle = \frac{1}{n} \sum_{m=1}^{n} \langle Z_m \rangle \qquad (13)$$

$$\langle Z \rangle = L_e \frac{sn+1}{2} \qquad (14)$$

Further, when a length obtained by multiplying the number "sn (=h)" of all flow path regions for $L_e$ is expressed as a full length of an effective flow path by using $L_0$, $L_e$ can be written as in Formula (15). Further, <Z> defined in accordance with Formula (15) can be written into Formula (16).

$$L_e = \frac{L_0}{sn} \qquad (15)$$

$$\langle Z \rangle = \frac{L_0(h+2)}{2h} \qquad (16)$$

If the average $\langle Z_m \rangle$ of the effective length from the flow path supply port in all the electrode units "m" meets an inequality of Equation (17) described later, a difference between $\langle Z_m \rangle$ and $\langle Z_{m'} \rangle$ with respect to arbitrary electromotive portion units m and m' is within 10% of $\langle Z \rangle$. Therefore, as can be seen from the above discussion, a concentration difference on an electromotive portion unit by unit basis is also within 10% of the average value of the fuel concentrations supplied in "n" electromotive portion units. This denotes that the outputs obtained from all the electromotive portion units are substantially equal to each other, and a fuel cell power generator with its stable high output can be provided.

$$|\langle Z_m \rangle - \langle Z \rangle| \leq \frac{1}{20} \langle Z \rangle \qquad (17)$$

$$|\langle z_m \rangle - \langle z_{m'} \rangle| \leq |\langle z_m \rangle - \langle z \rangle| + |\langle z_{m'} \rangle - \langle z \rangle| \qquad (18)$$

$$\leq \frac{1}{20} \langle z \rangle + \frac{1}{20} \langle z \rangle$$

$$= \frac{1}{10} \langle z \rangle$$

Now, a description will be given with respect to forming of an electromotive portion unit of a direct type methanol fuel cell. An anode catalyst (Pt:Rt=1:1) carrier carbon-black and a cathode catalyst (Pt) carrier carbon black were formed in accordance with a publicly known process (R. Remakumar et al. J. Power Sources 69 (1997) 75). The catalyst carrier amounts of the anode and cathode were defined as 30 and 15 in percent by weight with respect to carbon 100, respectively.

A perfluorocarbon sulfonic acid solution (Nafion solution SE-20092 available from Dupont Co., Ltd.) and ion exchange water were added to the anode catalyst carrier carbon black formed in the foregoing process, the catalyst carrier carbon black was dispersed, and a paste was prepared. The paste of 550 µm was applied onto a water repellent processed carbon paper TGPH-120 (available from E-TEK) which is an anode collector, the applied paste was dried, and an anode catalyst layer was formed, whereby an anode electrode was obtained.

A perfluorocarbon sulfonic acid solution (Nafion solution SE-20092 available from Dupont Co., Ltd.) and ion exchange water were added to the cathode catalyst carrier carbon black formed in the foregoing process, the catalyst carrier carbon black was dispersed, and a paste was prepared. The paste of 225 µm was applied onto a water repellent processed carbon paper TGPH-120 (available from E-TEK) which is a cathode collector, the applied paste was dried, and a cathode catalyst layer was formed, whereby a cathode electrode was obtained.

A perflourocarbon sulfonic acid film (Nafion 117 available from Dupont Co., Ltd.) commercially available as an electrolyte film was disposed between the anode catalyst layer of the anode electrode and the cathode catalyst layer of the cathode layer, and a hot press (125° C., 5 minutes, 50 kg/cm$^2$) was applied thereto, whereby the anode electrode, the electrolyte film, and the cathode electrode were bonded with each other to obtain an electromotive portion unit. A sectional area of the anode catalyst layer in the electromotive portion unit was 10 cm$^2$. In addition, after the electromotive portion was cut, when the sectional area was observed by using an electron microscope, the thickness L of the anode catalyst layer was 105 µm, and the thickness of the cathode catalyst layer was 50 µm. By this electro microscope observation, it was successfully verified that a bonding state among the anode electrode, the electrolyte film, and the cathode electrode was good.

Now, a description will be given with respect to evaluation of the formed electromotive portion unit. The formed electromotive portion unit was mounted on an evaluation separator, and evaluation of a current voltage characteristic was carried out while a temperature was maintained at 70° C. Note that measurement was carried out under an operating condition in which a methanol aqueous solution flow rate is defined as 0.01 cm/min, an air flow rate is defined as 10 cm/min, a methanol aqueous solution concentration is within the range of 0.5M, 1.0M, 1.25M, 1.5M, 1.75M, 2.0M, and 2.5M. As a result, a result which was substantially similar to the current voltage characteristic obtained in FIG. 4 was obtained. After it was verified that the substantially similar current voltage characteristic can be obtained by a similar evaluation method, 100 electromotive portion units of 10 cm$^2$ in sectional area were formed, and the thus formed electromotive portion units were used for testing in the embodiments of the present invention.

Second Embodiment

FIGS. 6A to 6C are views each showing essential portions of a direct type methanol fuel cell power generator 200 according to a second embodiment of the present invention. FIG. 6A is a bottom view showing an insulating flow path plate 201 positioned at the shown top side. FIG. 6B is a sectional view viewed in a direction indicated by the arrow, the view being taken along the line β1-β1 in FIG. 6A. FIG. 6C is a sectional view viewed in a direction indicated by the arrow, the view being taken along the line β2-β2 in FIG. 6A.

In FIGS. 6A to 6C, reference numeral 201 designates an insulating flow path plate (fuel side); 202 designates an insulating flow path plate (oxidizing agent side); 203 designates a fuel flow path; 204 designates a fuel flow path supply port; 205 designates a fuel flow path ejection port; 206 designates a flow path cap body of a back face of a flow path; 207 designates a resin based sealing member; 208a and 208b each designate an electromotive portion unit; 209 designates an air flow path; 210 designates a flow path portion bent to the side of the flow path cap body 206 such that a flow path does not face the electromotive portion units 208a and 208b; and 211 designates a metallic thin film for leading out a current. In addition, the electromotive portion units 208a and 208b each employ the above-described structure shown in FIG. 58. The fuel flow path 203 is provided as an example when two electromotive portion units 208a and 208b flow alternatively (hereinafter, the structure of such a flow path is referred to as an "alternating type flow path").

In the direct type methanol fuel cell power generator 200, a fuel is supplied from the fuel flow path supply port 204 into a system. A fuel flow path is formed in the electromotive portion units 208a and 208b so as to supply the fuel alternately. The fuel is ejected from the fuel flow path ejection port 205. On the other hand, an oxidizing agent flows through the fuel flow path 209, and power is generated on a surface of an electromotive portion unit. In this embodiment, the fuel flow path 203 supplies a fuel to the electromotive portion unit 208, and then, supplies the fuel to the electromotive portion unit 208b. Further, the fuel returns to the electromotive portion unit 208a. Then, while the fuel is supplied alternately to the electromotive portion units 208a and 208b, the fuel is ejected from the fuel flow ejection port 205. The fuel flow path 203 is thus configured, whereby the fuel can be supplied substantially uniformly and constantly to the electromotive portion units 208a and 208b. Thus, its output becomes further stable.

In this embodiment, it is desirable that a return count "s" of the flow path is an even number and great in order to easily meet the condition of Formula (2). In the case where the return count is an odd number, as the count "s" increases, a difference between $<Z_m>$ and $<Z>$ is reduced, and thus, it is desirable that the count "s" is equal to or greater than 5 in particular.

In the above-described two embodiments, although an example of two electromotive portion units is shown, stability of a power generation output can be improved by a similar technique also in a power generator having three or more electromotive portion units.

Furthermore, an example of such a flow path shape as to meet the condition of Formula (2) is shown in FIGS. 7A to 7D, FIG. 8, FIGS. 9A and 9B, and FIGS. 10A to 10C. In these figures, reference numeral 271 designates a flow path plate; 272 designates a portion at which an electrode portion in an electromotive portion unit is disposed; 273 and 274 designate a supply port and an ejection port of a flow path; and 275 designates a flow path. In FIGS. 10A to 10C, two electromotive portion units are arranged on each of both faces of the flow path plate. Then, a fuel or oxidizing agent is supplied alternately to electromotive portion units on both faces via the penetrating port 276 penetrating both faces of the flow path.

Figure 5C:
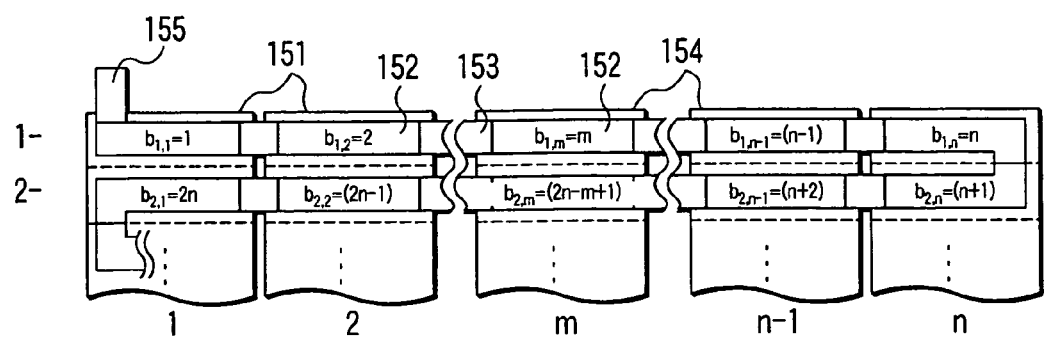
Figure 7A:
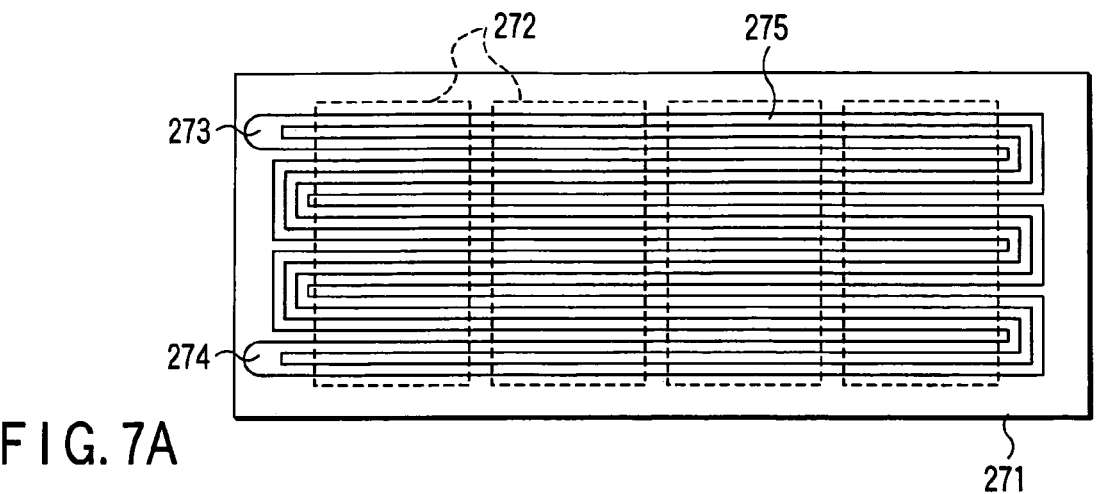
FIGS. 7A to 7D are plan views each showing a modified example of a flow path plate.
Figure 7B:
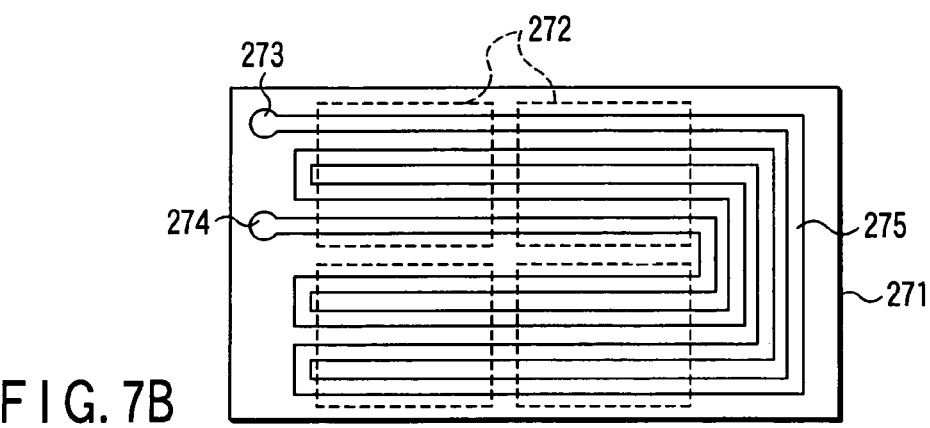
Figure 7C:
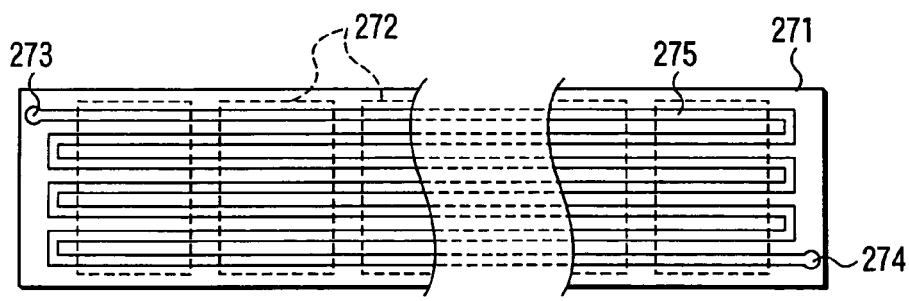
Figure 7D:
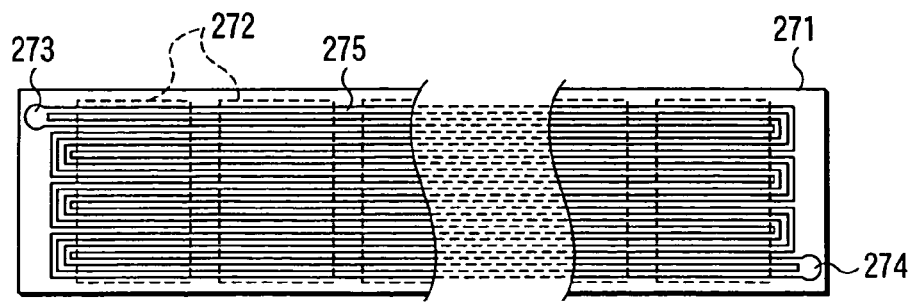
Figure 8:
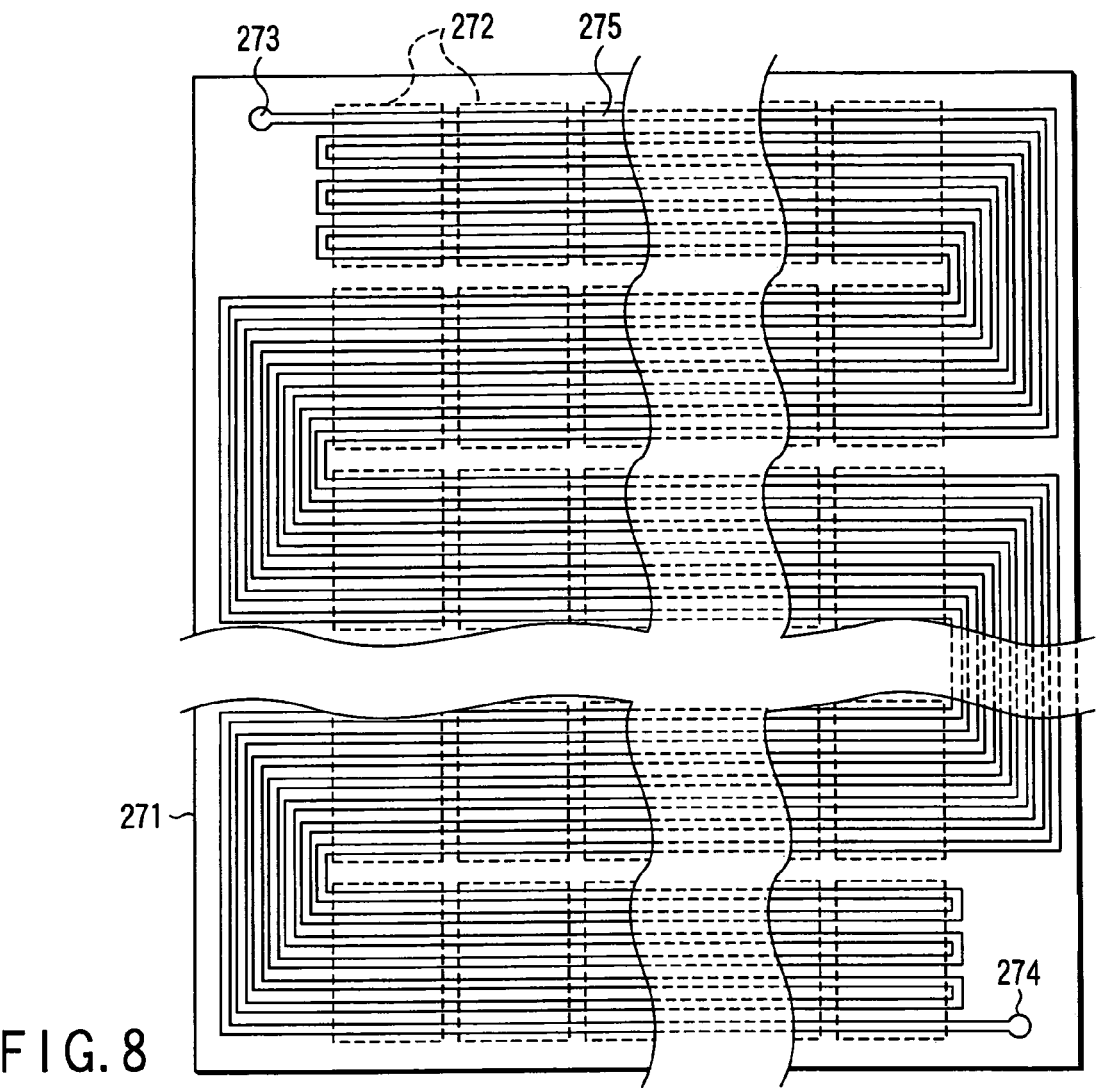
FIG. 8 is a plan view showing a modified example of a flow path plate.
Figure 9A:
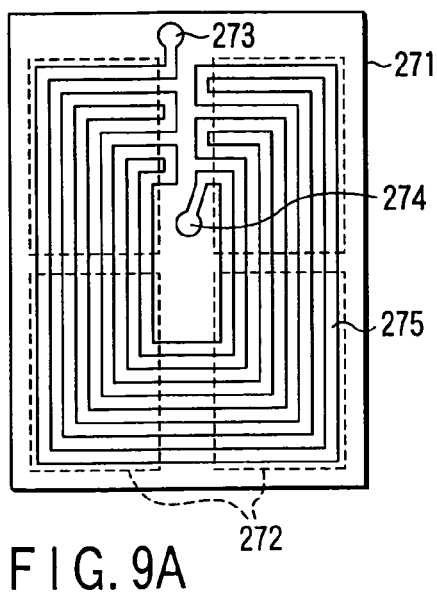
FIGS. 9A and 9B are plan views each showing a modified example of a flow path plate.
Figure 9B:
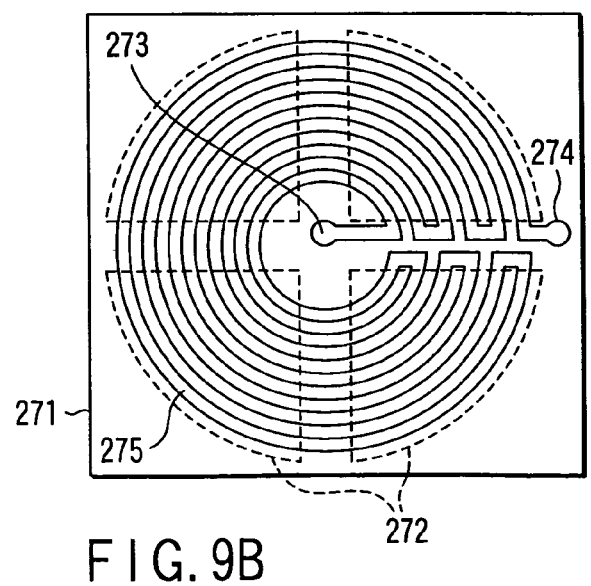

Even in the case where a distance between the divided flow paths is remarkably different from another, a rate of a length to an average of flow path widths in the whole flow path may be substituted to be converted by multiplying it on a region by region basis. For example, even in the case where a portion at which the flow path is returned is disposed at the inside instead of the outside in the range of the electrode portion as in FIG. 5A, the flow path can be allocated by partitioning it as shown in FIG. 5C.

Further, in a flow path plate for supplying a fuel or oxidizing agent to electromotive portion units arranged on both faces of such a flow path plate as used for a mono-polar type flow path plate, advantageous effect of the structure of the flow path described in the present embodiment can be achieved as in Example 7 or the like described later.

EXAMPLE 1

A power generation test under the following condition was carried out with respect to the direct type methanol fuel cell power generator 100 described above. That is, an initial concentration of a methanol aqueous solution fuel was defined as 3 mol/l; a flow path plate temperature was defined as 70° C.; a fuel flow rate was defined as 0.02 cm/min; and an air flow rate was defined as 20 cm/min. Hereinafter, this condition is referred to as an operating condition of Example 1.

FIG. 11 is a view showing a result of a current voltage characteristic of the direct type methanol fuel cell power generator 100. As can be seen from FIG. 11, it was observed that a critical charge current in an electromotive portion unit at the side of the flow path supply port was about 95 mA/cm$^2$ and that an electromotive current unit at the side of the flow path ejection port was 77 mA/cm$^2$. Therefore, in the case where both of them were electrically connected to each other in series, a charge current of 77 mA/cm$^2$ was substantially obtained. As compared with a case in which a conventional serial type flow path of Comparative Example 1 described later was used, it was verified the critical charge current density was improved by about 10%. This indicates that the flow path plate 101 supplies a fuel better as compared with the conventional serial type flow path.

EXAMPLE 2

Figure 12:
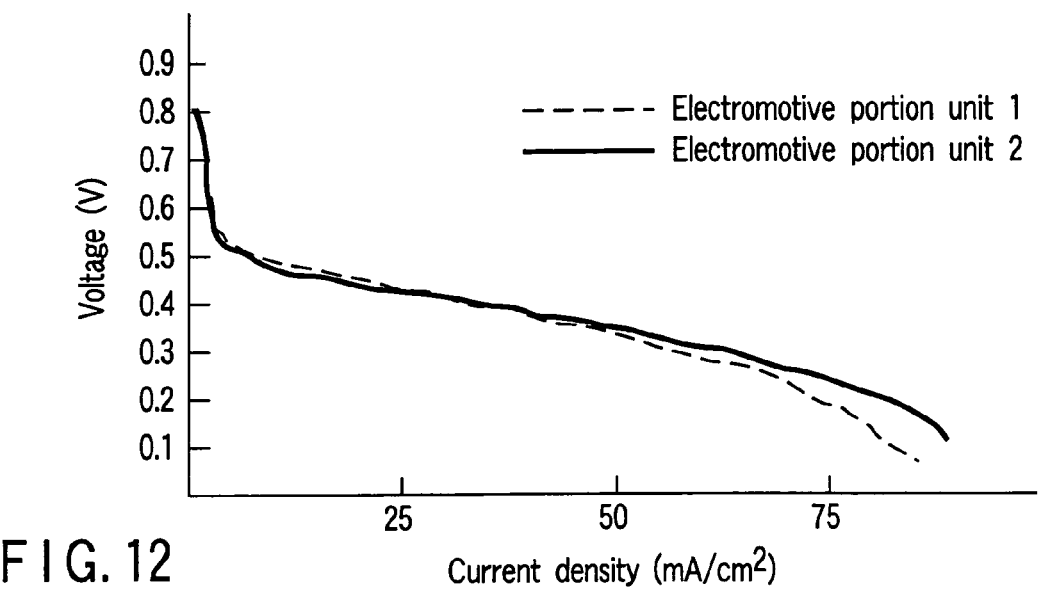
FIG. 12 is a view showing a result obtained by measuring a current voltage characteristic under an operating condition of Example 1.

FIG. 12 shows a result obtained by measuring a current voltage characteristic under the operating is condition of Example 1. As shown in FIG. 12, it was found that a value of the critical charge current density of an electromotive portion unit 1 at the side of the flow path supply port was about 90 mA/cm$^2$ and that a value of an electromotive portion unit 2 at the side of the flow path ejection port was about 87 mA/cm$^2$. Therefore, in the case where both of them were electrically connected to each other in series, a charge current of 87 mA/cm$^2$ was substantially obtained. As compared with a case in which the conventional serial type flow path of Comparative Example 1 described later was used, it was verified that the critical charge current density was improved by about 24%. In addition, in the flow path plates in this Example and Example 1, the lengths of eight flow path regions efficiently divided were all equal to each another. In this Example, $<Z_1>-<Z_2>=0$, and the condition of Formula 1 is met. However, in Example 1, $|<Z>-<Z_m>|=1/5<Z>$, and the condition is not met. That is, the flow path plate used in Example 2 is designed so as to meet Formula (1), and thus, it is considered that the critical charge current density has been improved more remarkably than the flow path plate formed in Example 1.

Comparative Example 1

Figure 13A:
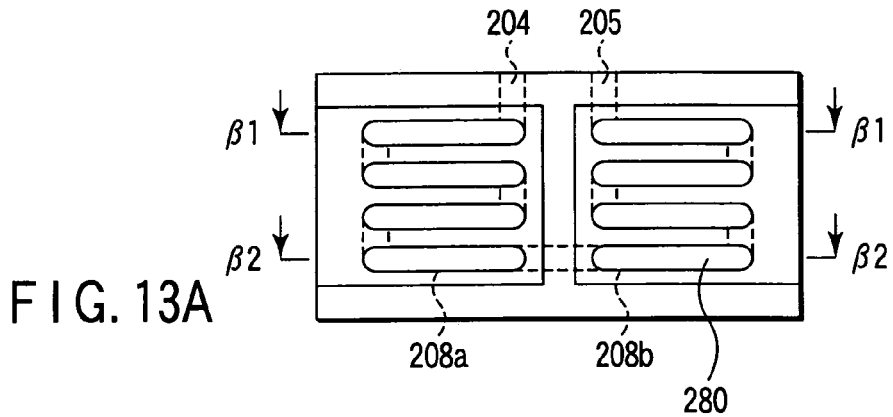
FIGS. 13A to 13C are views each showing a direct type methanol fuel cell power generator using a serial type flow path.
Figure 13B:
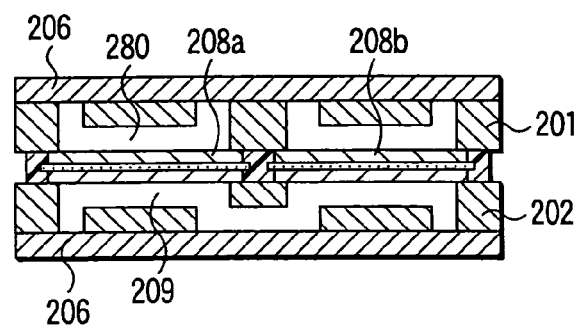
Figure 13C:
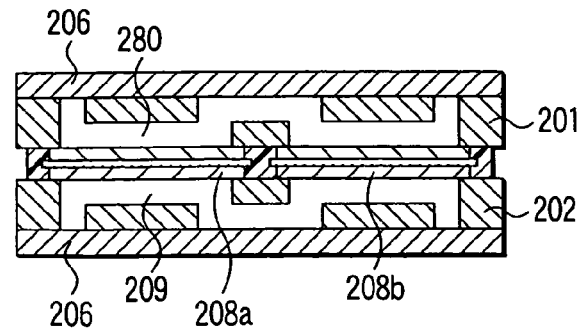

A direct type methanol fuel cell power generator was configured as shown in FIGS. 13A to 13C by providing two electromotive portion units, and employing the conventional serial type flow path. In FIGS. 13A to 13C, like functional portions in FIG. 6 are designated by like reference numerals. A detailed description of these functional portions is omitted here.

In Comparative Example 1, a parallel type flow path was used as a flow path 280 for supplying an oxidizing agent. A power generation test of a stack portion of Comparative Example 1 was carried out under the operating condition of Example 1. As a result, a current voltage characteristic shown in FIG. 14 was obtained. As is seen in FIG. 14, a value of the critical charge current density of the electromotive portion unit 208*a* at the side of the flow path supply port was about 100 mA/cm$^2$, and a value of the electromotive portion unit 208*b* at the side of the flow path ejection port was about 70 mA/cm$^2$. Therefore, in the case where both of them were electrically connected to each other in series, only a charge current of 70 mA/cm$^2$ was obtained.

Comparative Example 2

A direct type methanol fuel cell power generator was configured as shown in FIGS. 15A to 15C by providing two electromotive portion units, and employing the conventional parallel type flow path. In FIGS. 15A to 15C, like functional portions in FIGS. 6A to 6C are designated by like reference numerals. A detailed description of these functional portions is omitted here.

Figure 16:
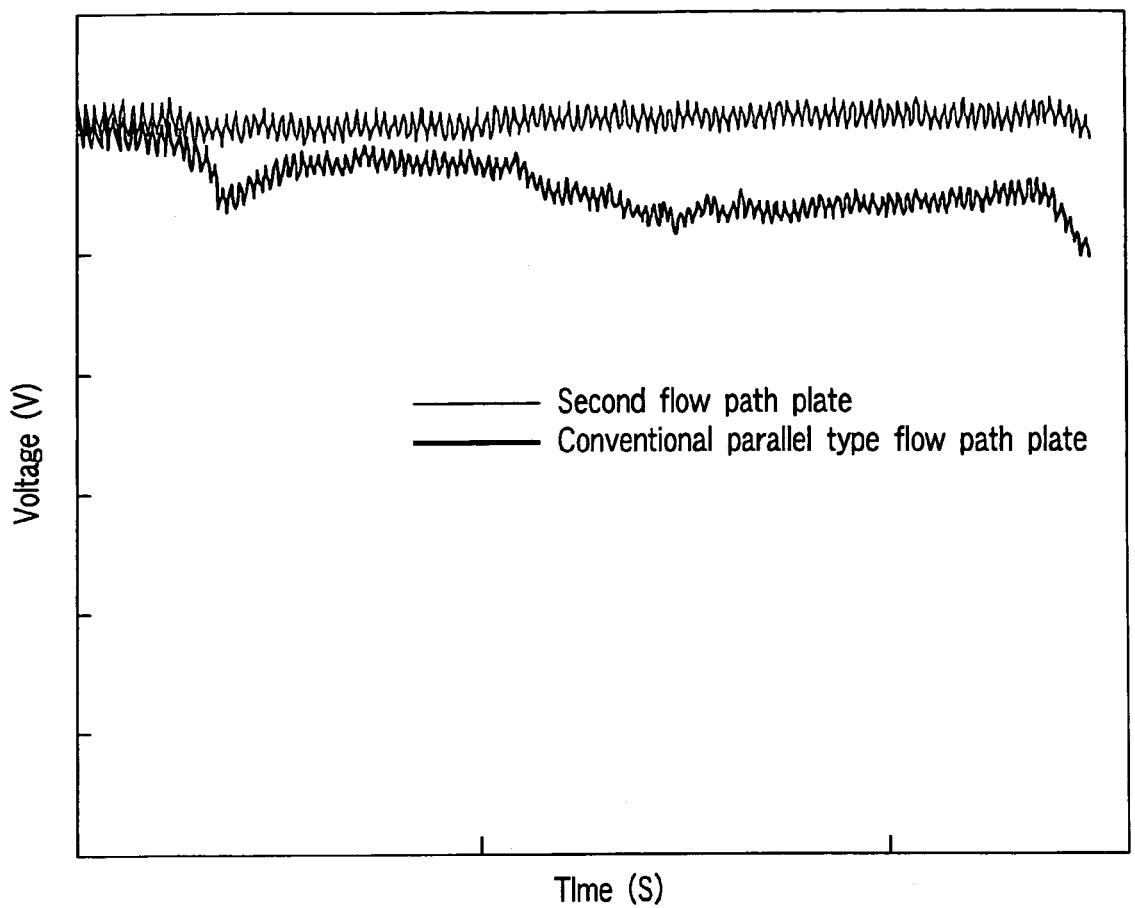
FIG. 16 is a view showing a current voltage characteristic under the operating condition of Example 1.

This fuel cell power generator was powered ON in an operating condition of Example 1. As a result, a current voltage characteristic shown in FIG. 16 was obtained. FIG. 16 shows that two electromotive portion units were used as an electrically serial circuit, a charge current of 75 mA/cm$^2$ was obtained, and a change after elapse of time was tracked.

In addition, FIG. 16 shows a charge current characteristic in the case where a fuel cell power generator using the flow path plate of Example 2 has been operated. A regular fine fluctuation in both plots of FIG. 16 is caused by a temperature controller. It was seen from FIG. 16 that, when the conventional parallel type flow path was used, the instability of an output due to a deflection in a fuel supply amount with respect to two electromotive portion units occurred. In the case where the flow path plate formed in Example 2 was used, it was found that a stable output was obtained irrespective of an operation time. As a result, in the conventional parallel type flow path, no stable output was obtained because a fuel did not flow constantly at a branched portion of a pipe. However, by using the flow path plate of the present invention, a fuel can be supplied uniformly because no pipe branching occurs. This indicates that a stable output can be obtained.

Comparative Example 3

Figure 17:
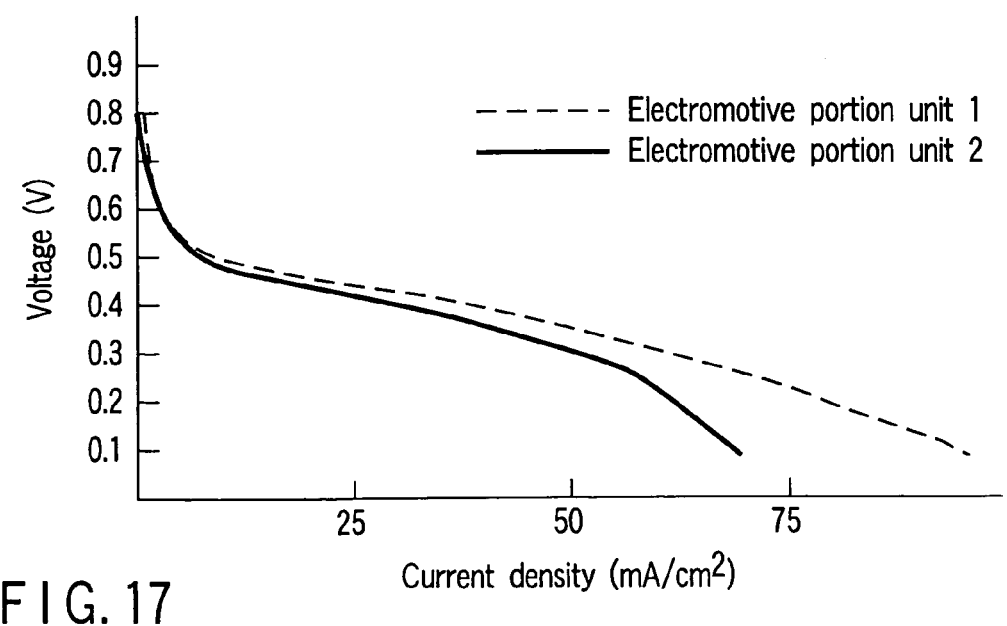
FIG. 17 is a view showing a result of a power generation test in Comparative Example 3.
Figure 20A:
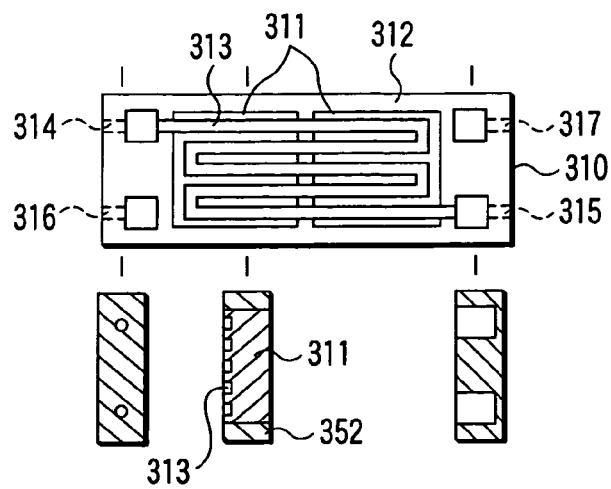
FIGS. 20A to 20E are exploded views each showing the direct type methanol fuel cell power generator.
Figure 20B:
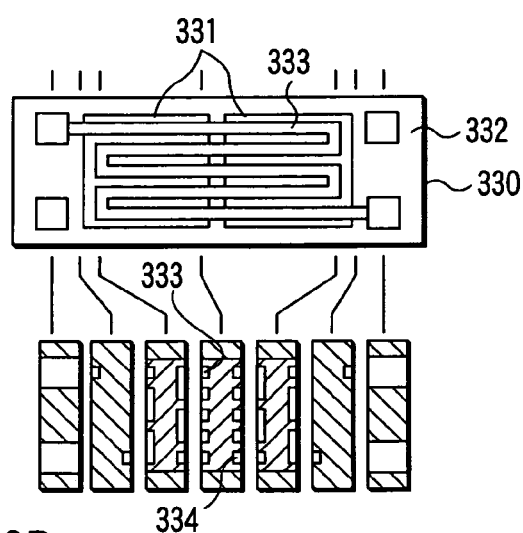
Figure 20C:
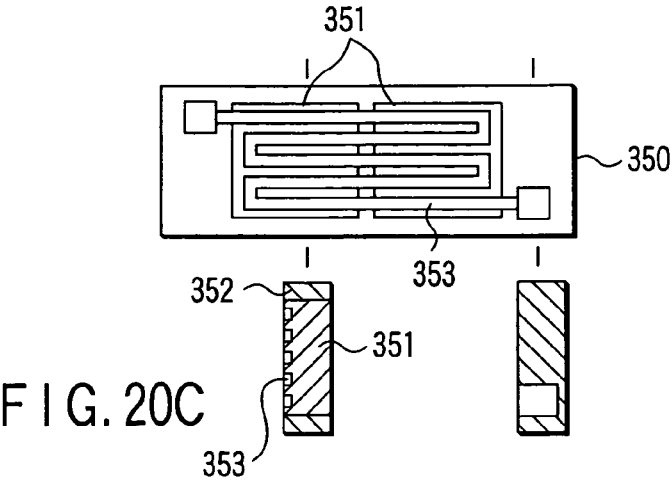
Figure 20D:
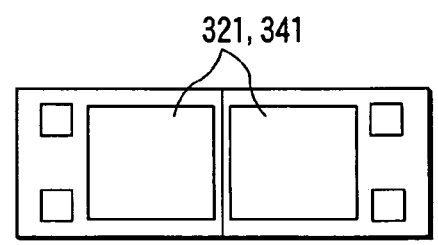
Figure 20E:
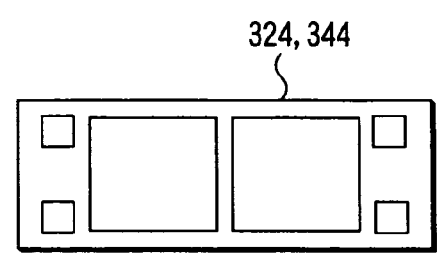

FIG. 17 is a view showing a result of a power generation test in Comparative Example 3. In Comparative Example 3, although a flow path is formed in the same manner as the flow path plate formed in Example 2, there was formed a flow path in which an effective full length of the flow path passing through the side of the electromotive portion unit 2 was shorter by 20% with respect to an effective full length of the flow path passing through the side of the electromotive portion unit 1, and a methanol fuel cell power generator comprising two electromotive portion units was configured.

As compared with FIG. 12 in Example 2, it is found that a difference in critical charge current-density between both of the electromotive portion units is remarkable. This is because effective flow path lengths of which two electromotive portion units pass are different from each other. This is also because, even if a flow path shape was used such that the average methanol concentrations supplied from the fuel flow path to the electromotive portion units each are equal to each another, absolute amounts of methanol supplied to each of the electromotive portion units are different from each another by 20%. Therefore, as was assumed when Formula (1) is derived, in addition, an effective length of a flow path region divided by each of the electromotive portion units should be configured to be equal to another in order to facilitate flow path design.

As described above, according to the direct type methanol fuel cell power generator 300 of the present embodiment, a deflection in outputs on an electromotive portion unit by unit basis is reduced and stable fuel supply can be carried out. Thus, a stable output can be obtained.

Third Embodiment

FIG. 18 is a side view showing a direct type methanol fuel cell power generator 300 according to a third embodiment of the present invention. FIGS. 19A and 19B are views each showing the direct type methanol fuel cell power generator 300. FIG. 19A is a schematic view showing the power generator, and FIG. 19B is a transverse cross section showing the power generator. FIGS. 20A to 20E are exploded views each showing the direct type methanol fuel cell power generator 300. These figures are also sectional views showing the power generator.

In the direct type methanol fuel cell power generator 300, a stack body is stacked with a first flow path plate 310, a first electromotive portion layer 320, a second flow path plate 330, a second electromotive portion layer 340, and a third flow path plate 350 from the upper middle of FIG. 18. This stack body is sandwiched between thick plates 360 and 361 made of a stainless material, and is formed by tightening it with a bolt 362. Reference numerals 370 to 373 each designate a metallic terminal, and the terminals are connected to carbon materials 311 and 351, respectively. Further, reference numeral 374 designates a copper wire, wherein the metallic terminal 371 and the metallic terminal 372 are made conductive to each other.

The first flow path plate 310 is integrally molded so as to insulate two square shaped carbon materials 311 with a thermosetting type epoxy resin 312. The area and shape of the carbon material 311 are identical to those of an electromotive portion unit to be arranged as described later. In addition, on the bottom face, a first flow path 313 for fuel is formed, in the shape of a recessed groove. Further, a fuel supply port 314, a fuel ejection port 315, an oxidizing agent supply port 316, and an oxidizing agent ejection port 317 are formed, and pipes 318*a* to 318*d* are connected thereto, respectively.

The first electromotive portion layer 320 comprises: two sets of electrolyte films 321 configuring electromotive units; an anode electrode 322 including an anode catalyst layer provided so as to sandwich these electrolyte films 321 and a cathode electrode 323 including a cathode catalyst layer; and a silicon rubber resin based sealing member 324 sandwiching these electrodes. The anode electrode 322 is disposed at the upper side in the figure, and the cathode layer 323 is disposed at the lower side in the figure.

The silicon rubber resin based sealing member 324 is formed by cutting the supply port and the ejection port of the flow path and the electrode portion of the electromotive portion unit in order to prevent a fuel or an oxidizing agent from leaking from a side face of the flow path or electromotive portion unit. The thickness of the silicon rubber resin based sealing member 324 used is larger by 0.1 mm than that of the anode electrode 322 and cathode electrode 323, and the electrolyte film 321 is sandwiched between them.

Moreover, an interval between the anode electrodes 322 arranged in parallel and an interval between the cathode electrodes 323 arranged in parallel were identical to a distance between the two carbon materials 311 of the first flow path plate 310.

The second flow path plate 330 is a bipolar type flow path plate, and is integrally molded so as to insulate two square shaped carbon materials 331 with a thermosetting epoxy resin 332. The area and shape of the carbon material 331 are identical to those of electromotive portion units arranged as described later. In addition, on the top face, a second flow path 333 for oxidizing agent is formed in the shape of a recessed groove, and on the bottom face, a third flow path 334 for fuel is formed in the shape of a recessed groove.

Two electromotive portion units are provided in the second electromotive portion layer 340. The second electromotive portion layer 340 comprises: two sets of electrolyte films 341 configuring electromotive portion units; an anode electrode 342 including an anode catalyst layer provided so as to sandwich these electrolyte films 341 and a cathode layer 343 including a cathode catalyst layer; and a silicon rubber resin based sealing member 344 sandwiching these electrodes. The anode electrode 342 is disposed at the upper side in the figure, and the cathode electrode 343 is disposed at the lower side in the figure.

The silicon rubber resin based sealing member 344 is formed by cutting the supply port and the ejection port of the flow path and the electrode portion of the electromotive portion unit in order to prevent a fuel or an oxidizing agent from leaking from a side face of the flow path or the electromotive portion unit. The thickness of the silicon rubber resin based sealing member 344 used is larger by 0.1 mm than that of the anode electrode 342 and cathode electrode 343, and the electrolyte film 341 is sandwiched between them.

In addition, an interval between the anode electrodes 342 arranged in parallel and an interval between the cathode electrodes 343 arranged in parallel were identical to a distance between the two carbon materials 311 of the first flow path plate 310.

The third flow path plate 350 is integrally molded so as to insulate two square shaped carbon materials 351 with a thermosetting type epoxy resin 352. The area and shape of the carbon material 351 are identical to those of the electromotive portion units arranged. In addition, on the top face, a fourth flow path 353 for oxidizing agent is formed in the shape of a recessed groove.

The fuel supplied from a fuel pump (not shown) is supplied to the fuel supply portion 314 via the pipe 318c. The supplied fuel is discharged from the fuel ejection port 315 to the outside of the cell through the first flow path 313 and the third flow path 334 via the pipe 318d. That is, a fuel is supplied to the anode electrodes 322 and 342. In addition, the oxidizing agent supplied from an air pump (not shown) is supplied to the oxidizing agent supply port 316 via the pipe 318a. Then, the supplied oxidizing agent is discharged from the oxidizing agent ejection port 317 to the outside of the cell through the first flow path 335 and the third flow path 353 via the pipe 318b. That is, the fuel is supplied to the anode electrodes 323 and 343.

EXAMPLE 3

In the direct type methanol fuel cell power generator 300 as described above, if a fuel and an oxidizing agent are supplied, four electromotive portion units are electrically connected in series, and thus, an electrical output is obtained from the metallic terminals 370 and 373 by means of an electron charge device. Note that a gold wire of 0.1 mm in diameter was brought into contact with the anode electrode and the cathode electrode on an electromotive portion unit by unit basis, and was led out to the outside of a stack. A voltage on an electromotive portion unit by unit basis was measured.

Operation of the direct type methanol fuel cell power generator 300 is substantially identical to the operating condition of Example 1. However, supply amounts of the oxidizing agent and fuel were doubled by two times of Example 2 in the number of electromotive portion units. That is, the initial concentration of a methanol aqueous solution fuel was defined as 3 mol/l; a flow path-plate temperature was defined as 70° C.; a fuel flow rate was defined as 0.04 cm/min; and an air flow rate was 40 cm/min. Hereinafter, this operating condition is referred to as an operating condition of Example 3.

Figure 21:
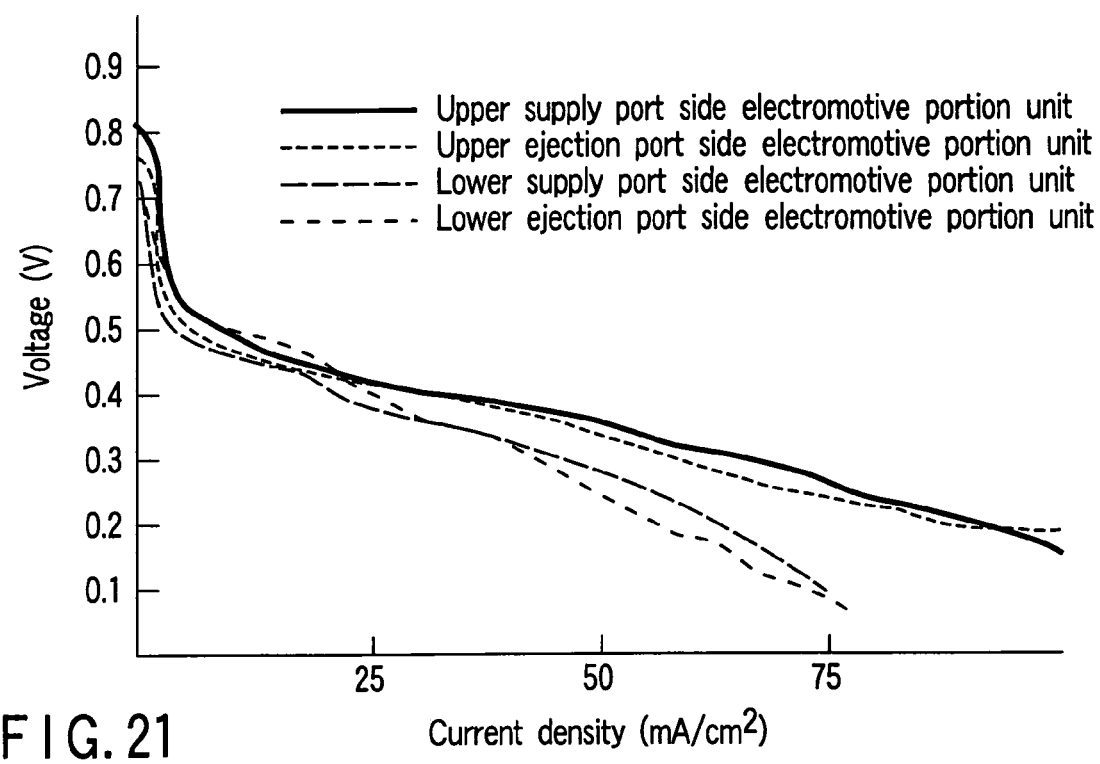
FIG. 21 is a view showing a current voltage characteristic of the direct type methanol fuel cell power generator.

FIG. 21 is a view showing a current voltage characteristic of the above-described direct type methanol fuel cell power generator 300. As is seen from FIG. 21, there are shown that an output difference between the electromotive portion units arranged in parallel in a planar direction is small, and that constant fuel supply is carried out as compared with a conventional serial type flow path and a conventional parallel type flow path of Comparative Example 4 and Comparative Example 5 described later.

However, a remarkable difference in value of the critical charge current density occurred between sets of the electromotive portion units disposed at the top and bottom. This is because a pipe is branched into two sections from the fuel supply port and the oxidizing agent supply port of a stack, whereby a fuel or an oxidizing agent is supplied to the sets of the top and bottom electromotive portion units, and thus, the fuel and oxidizing agent are not supplied uniformly to the sets of the top and bottom electromotive portion units.

Comparative Example 4

Figure 23:
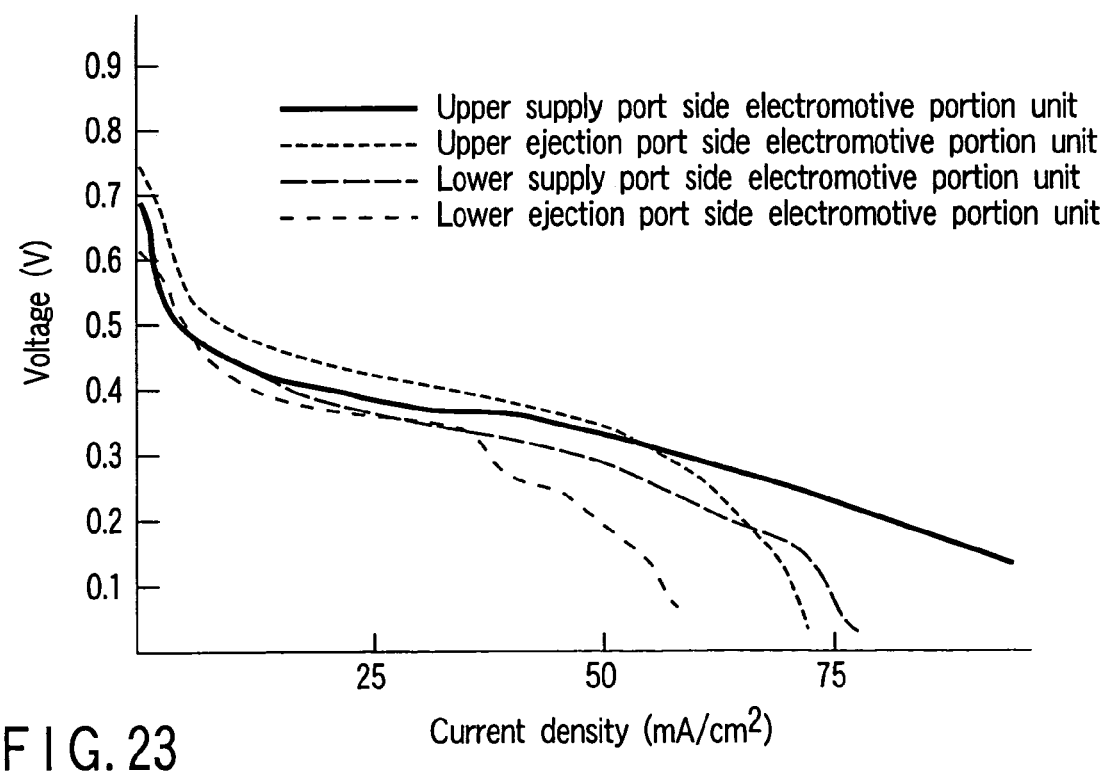
FIG. 23 is a view showing a test result concerning a stack of Comparative Example 4.
Figure 22C:
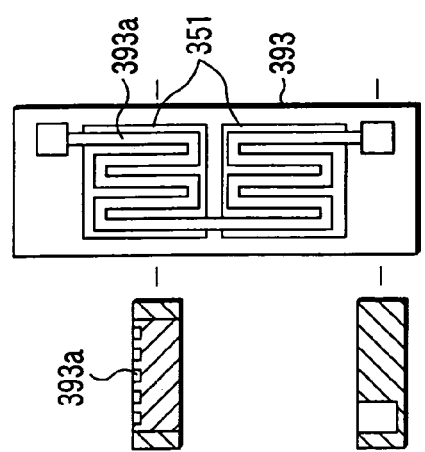
FIGS. 22A to 22C are views each showing a flow path plate having formed thereon a direct type flow path incorporated in a direct type methanol fuel cell power generator comprising four electromotive portion units.
Figure 22B:
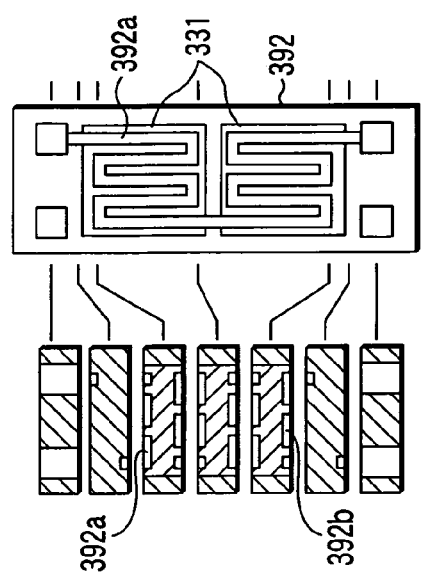
Figure 24:
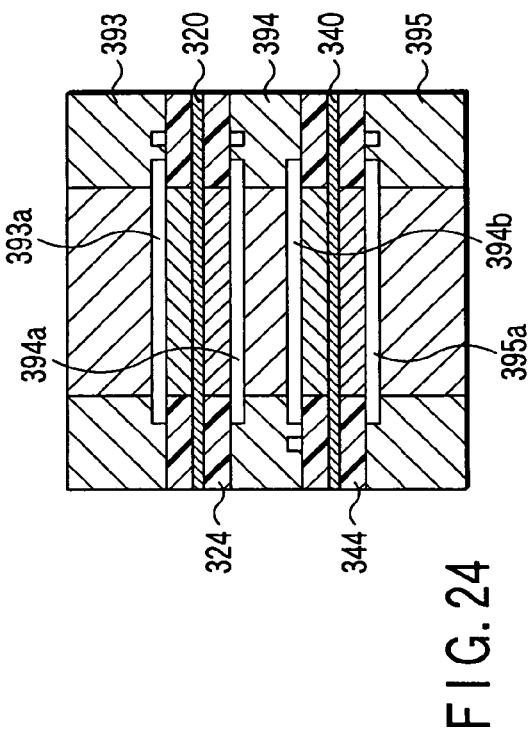
FIG. 24 is a view showing a flow path plate having formed thereon a parallel type flow path incorporated in a direct type methanol fuel cell power generator comprising for electromotive portion units according to Comparative Example 5.
Figure 22A:
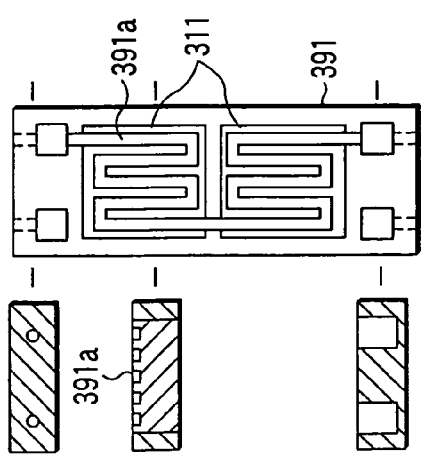
Figure 25A:
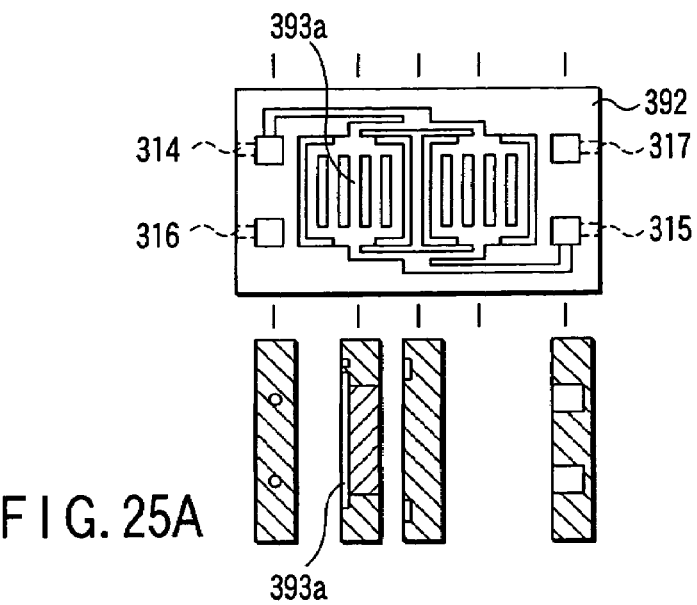
FIGS. 25A to 25E are views each showing the flow path plate having formed thereon the parallel type flow path incorporated in the direct type methanol fuel cell power generator comprising four electromotive portion units according to Comparative Example 5.
Figure 25B:
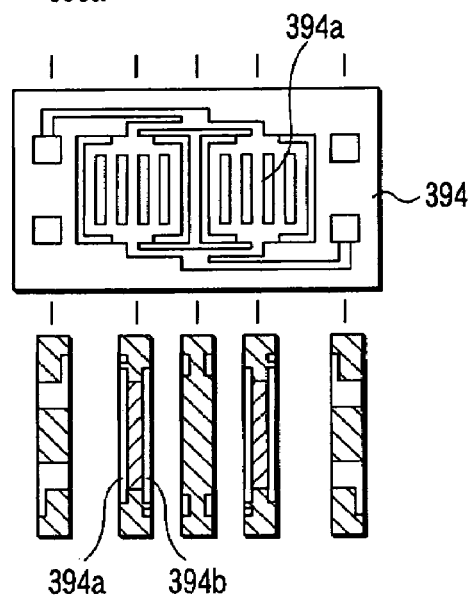
Figure 25C:
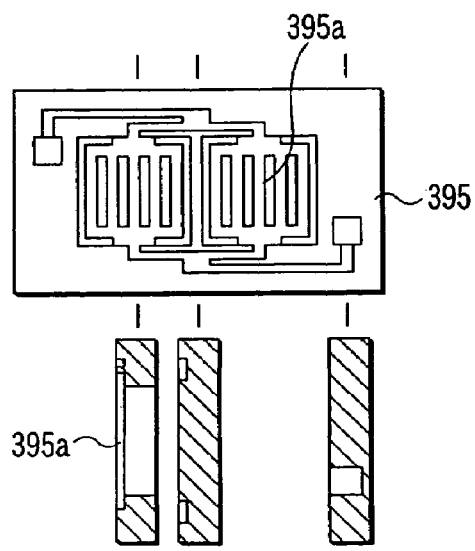
Figure 25D:
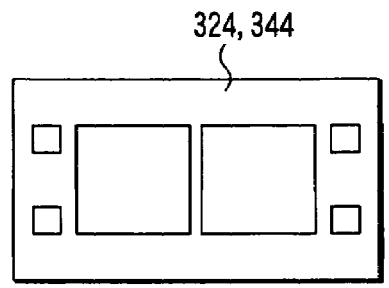
Figure 25E:
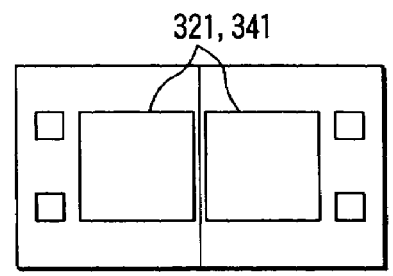

FIGS. 22A to 22C are views showing flow path plates 391 to 393 having formed thereon serial type flow paths incorporated in a direct type methanol fuel cell power generator comprising four electromotive portion units. FIG. 23 is a view showing a test result concerning a stack of Comparative Example 4. The flow path plate 392 is of bipolar type. In FIGS. 22A to 22C, like functional portions shown in FIGS. 20A to 20E are designated by like reference numerals. A detailed description of these functional portions is omitted here.

In Comparative Example 4, it was found that a value of the critical charge current density observed by the electromotive portion unit at the side of the ejection portion was lowered by about 30% as compared with a value of the critical charge current density obtained from the electromotive portion unit at the side of the fuel supply port. With respect to the sets of the top and bottom electromotive portion units as well, it was found that a remarkable difference occurred with the critical charge current values. This result is considered to have occurred because the conventional serial type flow path is employed in the shape of the flow path and because the pipe is branched in a vertical direction.

Comparative Example 5

FIG. 24 and FIGS. 25A to 25E are views showing flow path plates 393 to 395 having formed thereon parallel type flow paths incorporated in a direct type methanol fuel cell power generator comprising four electromotive portion units according to Comparative Example 5. In these figures, like functional portions in FIGS. 20A to 20E are designated by like reference numerals. A detailed description of these functional portions is omitted here. The flow path plate 394 is of bipolar type.

A parallel type was used as a flow path shape, and thus, the width in the short side direction of the flow path plates 393 to 395 was slightly increased by a branched pipe. Concurrently, the widths of the electrolyte films 321 and 341 of the electromotive portion units and those of the silicon rubber resin based sealing members 324 and 344 were increased similarly.

Figure 26:
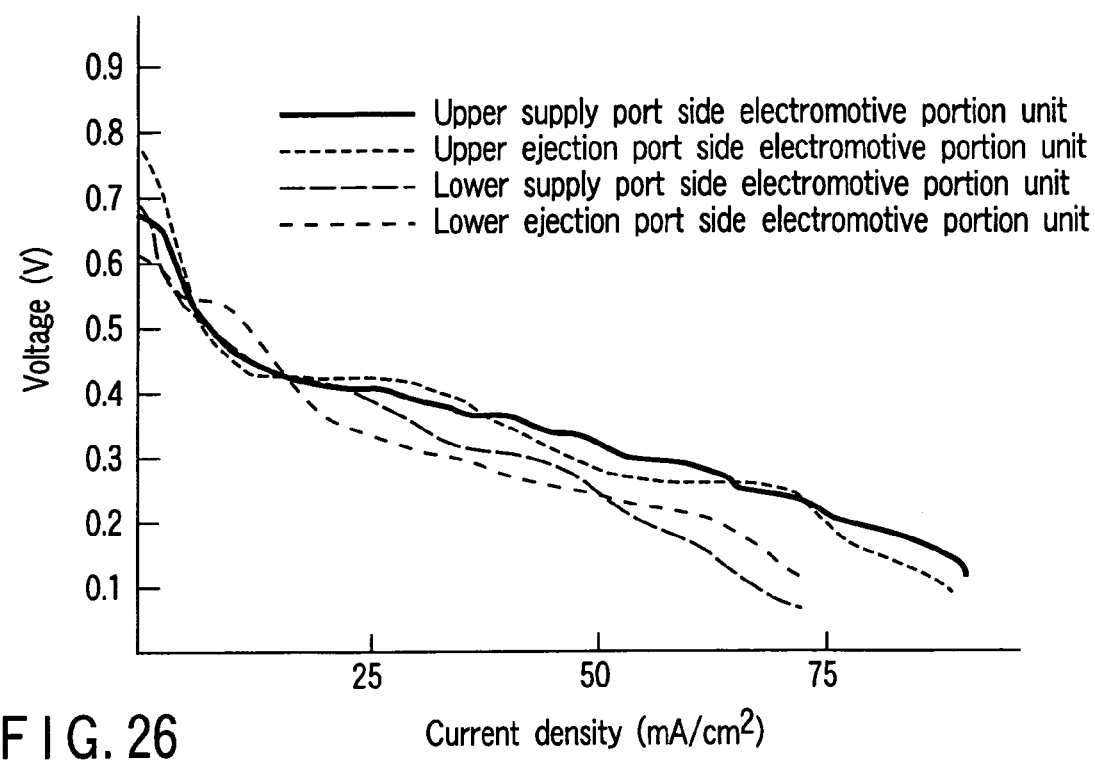
FIG. 26 is a view showing a result obtained by measuring a current voltage characteristic under an operating condition of Example 3.

FIG. 26 is a view showing a result obtained by measuring a current voltage characteristic under the operating condition of Example 3 with respect to the thus configured direct type methanol fuel cell power generator. As is seen from this figure, voltages became unstable with respect to all the electromotive portion units and a remarkable difference in critical charge current occurred with respect to the sets of the top and bottom electromotive portion units as well. This result is considered to have occurred because uniform fuel supply at a pipe branching portion was not carried out in the conventional parallel type flow path.

As has been described above, in the direct type methanol fuel cell power generator 300 according to the present embodiment, a deflection in output on an electromotive portion unit by unit basis is reduced and stable fuel supply can be carried out. Thus, a stable output can be obtained.

Fourth Embodiment

FIG. 27 is a side view showing a direct type methanol fuel cell power generator 400 according to a fourth embodiment of the present invention. FIGS. 28A to 28C are plan views showing flow path plates 410, 430, and 450 of the direct type methanol fuel cell power generator 400. These figures are sectional views showing the above plates.

In the direct type methanol fuel cell power generator 400, a stack body is stacked with the first flow path plate 410; a first electromotive portion layer 420, the second flow path plate 430, a second electromotive portion layer 440, and the third flow path plate 450 from the upper middle of FIG. 27. This stack body is sandwiched between thick plates 460 and 461 made of a stainless material, and is formed by tightening it with a bolt 462. Reference numerals 470 to 473 each designate a metallic terminal. Further, reference numeral 474 designates a copper wire, wherein the metallic terminal 471 and the metallic terminal 472 are made conductive.

The first flow path plate 410 is formed of an acrylic resin, and gold ribbons 411 and 412 of 20 μm in thickness and 2 mm in width are provided on a surface of the plate. In addition, on the bottom face, a first flow path 413 for fuel is formed in the shape of a recessed groove. Further, a fuel supply portion 414, a fuel ejection port 415, an oxidizing agent supply port 416, and an oxidizing agent ejection port 417 are formed, and pipes 418*a* to 418*d* are corrected thereto, respectively.

The gold ribbons 411 and 412 are disposed at a substantial center of each electromotive portion unit in order to capture a current from each electromotive portion unit. In addition, these ribbons are disposed at the top face, one side face, and the bottom face of the flow path plate 410 so as to obtain a positional relationship vertical to a current flow direction in the flow path 413. The above-described gold ribbons 411 and 412 are wound around the top and bottom of the first flow path plate 410 through the side face, thereby making it possible to establish an electrical serial state of electromotive portion units.

Another conductive member may be used instead of the gold ribbons 411 and 412. For example, it is desirable to use a material such as platinum, ruthenium, rhodium, or iridium. In the case where a base metal is used as a substrate, the substrate can be substituted by covering it with the above-described precious metal of about 10 μm in thickness on titanium or the like.

The first electromotive portion layer 420 is configured in the same manner as the first electromotive portion layer 320 of the above-described methanol fuel cell power generator 300. Thus, a detailed description of the layer is omitted here.

The second electromotive portion layer 430 is a flow path plate of bipolar type, and is formed of an acrylic resin. On a surface of the layer, gold ribbons 431 and 432 of 20 μm in thickness and 2 mm in width are provided. On the top face of the layer, a second flow path 433 for oxidizing agent is formed in the shape of a recessed groove, and on the bottom face thereof, a third flow path 434 for fuel is formed in the shape of a recessed groove.

The gold ribbons 431 and 432 are positioned at a substantial center of each electromotive portion unit in order to capture a current from each electromotive portion unit. In addition, these ribbons are disposed at the top face, one side face, and the bottom face of the flow path plate 430 so as to obtain a positional relationship vertical to a current flowing direction in the flow paths 433 and 434. That is, the gold ribbons 431 and 432 are wound around the top and bottom of the second flow path plate 430 through the side face, thereby making it possible to establish an electronic serial state between the electromotive portion units.

The second electromotive portion layer 440 is configured in the same manner as the second electromotive portion layer 340 of the above-described direct type methanol fuel cell power generator 300. Thus, a detailed description of this layer is omitted here.

The third flow path plate 450 is formed of an acrylic resin, and on a surface of the plate, gold ribbons 451 and 452 of 20 μm in thickness and 2 mm in width are provided. On the top face, a fourth flow path 453 for oxidizing agent is formed in a recessed groove. The above-described gold ribbons 451 and 452 are wound around the top and bottom of the third flow path plate 450 through the side face, thereby making it possible to establish an electrical serial state between the electromotive units.

In the thus configured direct type methanol fuel cell power generator 400, a fuel and an oxidizing agent are supplied or discharged in the same manner as the above-described direct methanol fuel cell power generator 300. Then, four electromotive power units are electrically connected in series, and thus, an electrical output is obtained from the metallic terminals 470 and 473 by means of an electron charge device.

EXAMPLE 4

Figure 29:
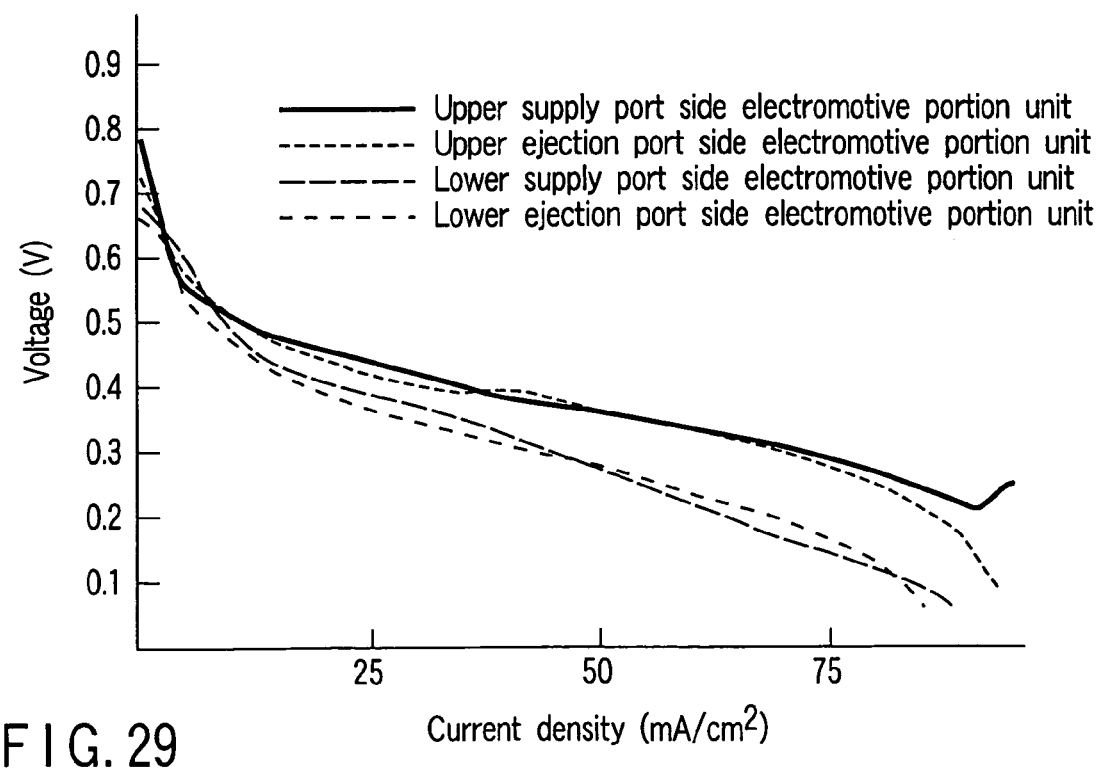
FIG. 29 is a view showing a current voltage characteristic when the direct type methanol fuel cell power generator has been operated under the operating condition of Example 3.

FIG. 29 is a view showing a current voltage characteristic when the above-described direct type methanol fuel cell power generator 400 has been operated under the operating condition of Example 3. As shown in FIG. 29, in Example 4, it is found that a stable output can be obtained as compared with a case in which a conventional serial flow path type and a conventional parallel type flow path of Example 5 and Example 6 described later have been used. This result indicates that constant fuel supply is carried out.

Further, a result of the current voltage characteristic is identical to a test result (FIG. 21) of Example 3 in which measurement has been carried out with respect to a stack portion at which the same flow path structure has been formed of a carbon material. Even by bringing a conductive member into contact with only a part of an electromotive portion, it was successfully demonstrated possible to make a power generating operation which is not inferior to a case in which the carbon material is used. Further, this demonstrates that a portion at which a conductive portion comes into contact with an electrode may not always be in the range as wide as possible all over the electrode in order to induce an electronic output from an electromotive portion unit, i.e., that a current can be sufficiently captured merely by partially arranging a conductive member. In particular, this indicates that the present invention can be fully applied to a cell power generator for fuel or the like for small sized portable electronic device which does not require an output at a mass current.

Moreover, as in the conventional stack structure, in the case of forming a flow path plate in which a carbon material is molded integrally with an insulating resin, it can be considered that a dislocation between members or a gap between flow paths due to a difference in hardness occurs when the carbon material and insulating resin are integrated with each other. In the case where a carbon-resin composite material which can be molded with a die suitable to mass production is used as an electrically conductive portion, a heat expansion rate with the peripheral insulating resin member, a difference in deformation temperature or the like must be considered. Even when a flow path is formed by cutting it after being integrally molded, there is a need to use a tool with high hardness because the carbon material is partially contained.

However, in the case where a bipolar type flow path plate is formed merely of a resin free of a carbon material, such a bipolar flow path plate may be merely formed in only one process for injection molding which has been carried out conventionally. Further, an advantage of the bipolar type flow path plate that wiring is simplified due to an electrical serial structure in a stacking direction is reduced in the case of a portable electronic device fuel cell in which reduction in thickness is important. Therefore, it is important to develop means for obtaining insulation between flow path plates for arranging electromotive portion units in the same planar direction. In this respect, by using the flow path plate in the present embodiment, there is no need to form a complicated flow path plate on which conductive portions and an insulating portion for insulating them from each other are integrally molded. Further, the easiness of molding properties by using a resin, i.e., easy reduction in thickness becomes further possible.

As has been described above, in the direct type methanol fuel cell battery power generator 400 according to the present embodiment, a deflection in output on an electromotive portion unit by unit basis is reduced and stable fuel supply can be carried out. Thus, a stable output can be obtained.

Fifth Embodiment

Figure 30C:
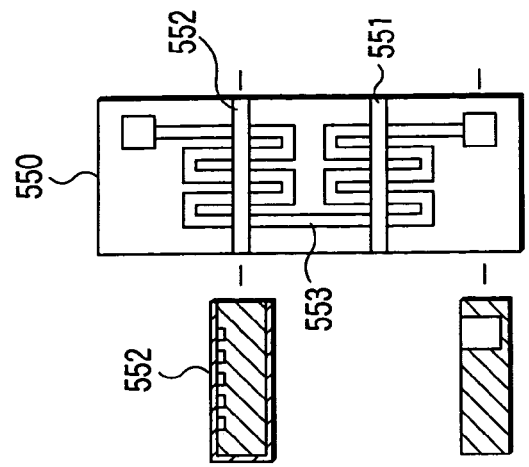
FIGS. 30A to 30C are views showing first to third flow path plates incorporated in a direct type methanol fuel cell power generator according to a fifth embodiment.
Figure 30B:
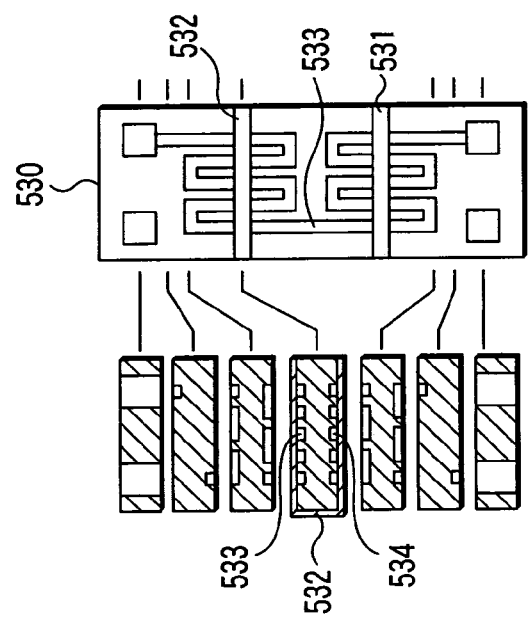
Figure 30A:
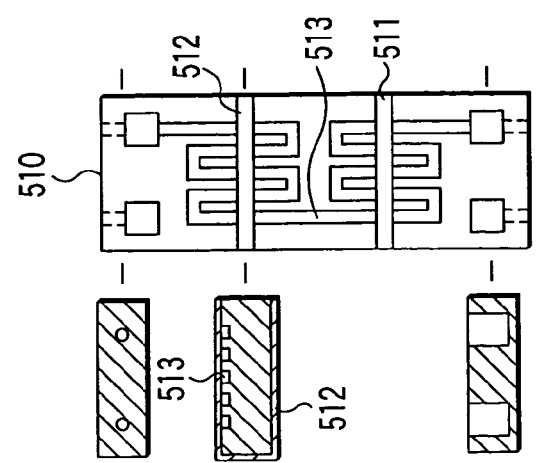

FIGS. 30A to 30C are views showing first to third flow path plates 510, 530, and 550 incorporated in a direct type methanol fuel battery cell power generator 500 (not shown) according to a fifth embodiment of the present invention. As a material for each flow path plate, an acrylic resin being an insulating resin was used. The power generator was configured by using bipolar type flow path plates 510, 530, and 550 each comprising a conventional serial type flow path shaped in the same way as in the case of Comparative Example 4. In the figures, reference numerals 511, 512, 531, 532, 551, and 552 designate gold ribbons disposed in the same manner as in Example 4, and reference numerals 513, 533, 534, and 553 designate flow paths.

EXAMPLE 5

Figure 31:
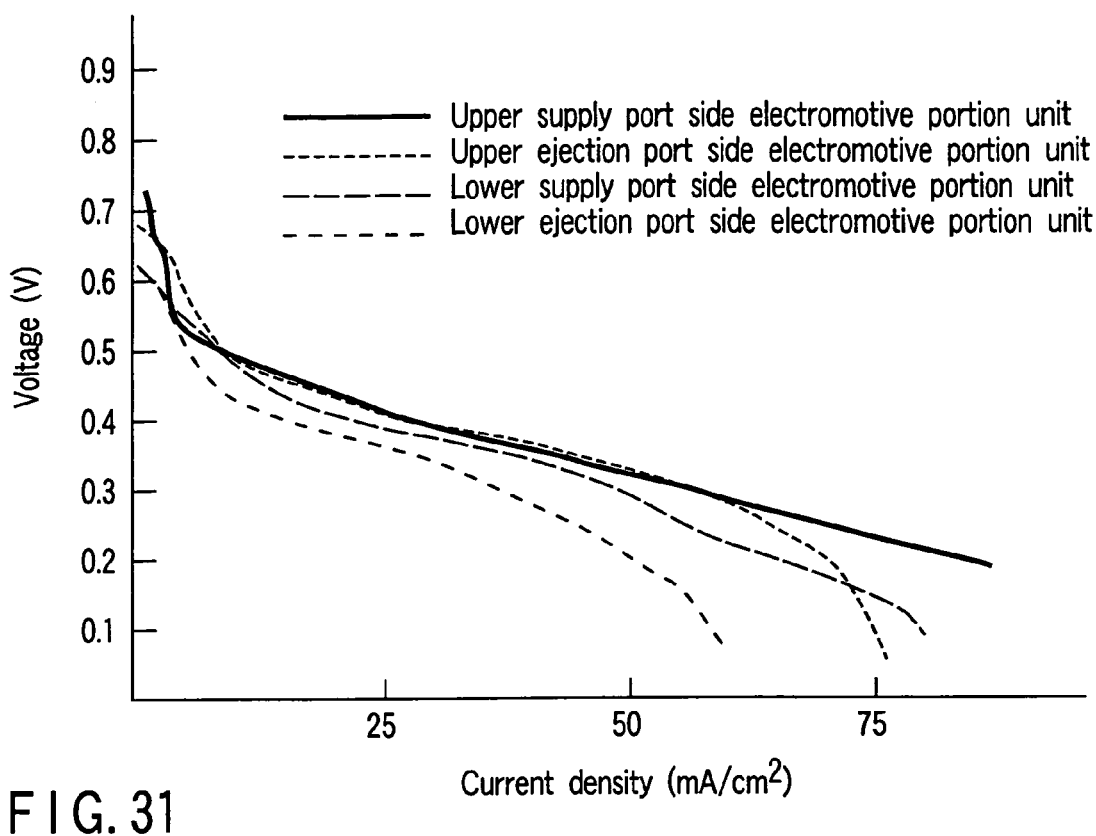
FIG. 31 is a view showing a current voltage characteristic when the direct type methanol fuel cell power generator has been operated under the operating condition of Example 3.

FIG. 31 is a view showing a current voltage characteristic when the above-described direct type methanol fuel cell power generator 500 has been operated under the operating condition of Example 3. Also in Example 5, the same output characteristic as that shown in Comparative Example 4 was obtained. That is, it was successfully demonstrated possible to make a power generating operation which was not inferior to a case in which a carbon material was used, merely by forming the flow path plates 510, 530, and 550 of an insulating resin member and bringing a conductive member into contact with only a portion of an electromotive portion.

However, it was found that the critical charge current density of the electromotive portion unit at the side of the fuel ejection port is lowered by 30% as compared with the critical charge current density of the electromotive portion unit at the side of the fuel supply port. This lowering was observed in a test result (refer to FIG. 23) concerning the stack of Comparative Example 4, and is considered to be produced because of the presence of the flow path structure, not because of the presence the material for flow path plate.

As has been described above, in the direct type methanol fuel cell power generator 500 according to the present embodiment, a deflection in output on an electromotive portion unit by unit basis is reduced and stable fuel supply can be carried out. Thus, a stable output can be obtained.

Sixth Embodiment

Figures 32A, 32B:
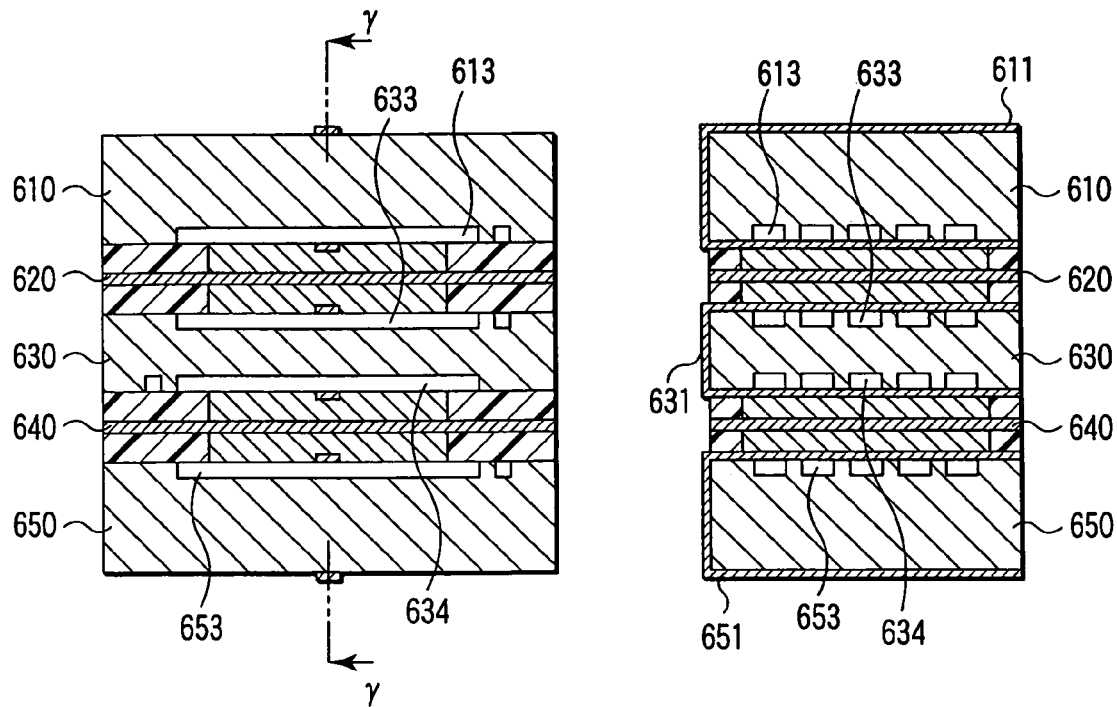
FIG. 32A is a longitudinal cross section showing a direct type methanol fuel cell power generator according to a sixth embodiment of the present invention.
FIG. 32B is a sectional view showing the direct type methanol fuel cell power generator viewed in a direction indicated by the arrow, the cross section being taken along the line γ-γ in FIG. 32A.

FIGS. 32A and 32B are views each showing a direct type methanol fuel cell power generator 600 according to a sixth embodiment of the present invention. FIG. 32A is a longitudinal cross section showing the power generator. FIG. 32B is a sectional view viewed in a direction indicated by the arrow, the sectional view being taken along the line γ-γ in FIG. 32A. FIGS. 33A to 33C are views showing first to third flow path plates 610, 630, and 650 incorporated in the direct type methanol fuel cell power generator 600.

The direct type methanol fuel cell power generator 600 is formed to be stacked with the first flow path plate 610, a first electromotive portion layer 620, the second flow path plate 630, a second electromotive portion layer 640, and the third flow path plate 650 in upward order in FIGS. 32A and 32B.

An acrylic resin being an insulating resin was used as a member of a flow path plate, and a flow path plate whose flow path is of parallel type and is formed in a stripe shape, which is identical in the case of Comparative Example 5, was used. A conductive member was arranged in the same manner as in Example 4.

An acrylic resin being an insulating resin was used as a material for each flow path plate. The power generator was configured by using bipolar type flow path plates 610, 630, and 650 comprising the conventional serial type flow paths which are shaped in the same manner as in the case of Comparative Example 4. In the figure, reference numerals 611, 612, 631, 632, 651, and 652 each designate a gold ribbon; and reference numerals 613, 633, 634, and 653 each designate a flow path. The gold ribbons 611, 612, 631, 632, 651, and 652 are disposed along long sides of the flow path plates 610, 630, and 650.

The first electromotive portion layer 620 is configured in the same way as in the first electromotive portion layer 320 of the above-described direct type methanol fuel cell power generator 300. A detailed description is omitted here. The second electromotive portion layer 640 is configured in the same way as in the second electromotive portion layer 340 of the above-described direct type methanol fuel cell power generator 320. Thus, a detailed description is omitted here.

EXAMPLE 6

FIG. 34 is a view showing a current voltage characteristic when the above-described methanol fuel cell power generator 600 has been operated under the operating condition of Example 3. As is seen from FIGS. 3A and 3B, the same output characteristic as that shown in Comparative Example 5 can be obtained. That is, it was successfully demonstrated possible to make a power generating operation which was not inferior to a case in which a carbon material was used, merely by forming a flow path of an insulating resin member and bringing a conductive member into contact with only a part of an electromotive portion.

However, likewise in a case shown in Comparative Example 2 and Comparative Example 5, it was observed that an output was unstable due to a deflection in a fuel supply amount with respect to two electromotive portion units arranged on the same plane. This instability is considered to be produced because of the presence of the flow path structure, not because of use of an acrylic material.

As has been described above, in the direct type methanol fuel cell power generator 600 according to the present embodiment, a deflection in output on an electromotive portion unit by unit basis is reduced and stable fuel supply can be carried out. Thus a stable output can be obtained.

Seventh Embodiment

Figure 37A:
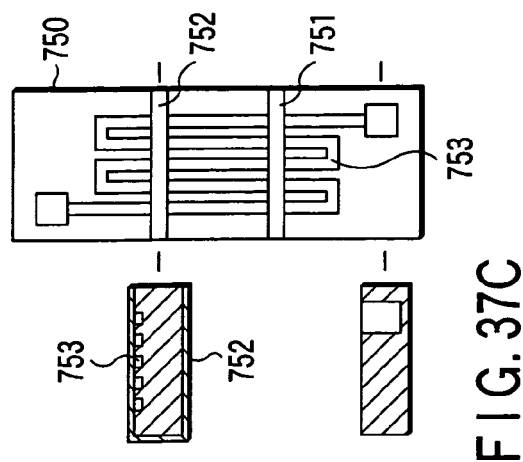
FIGS. 37A to 37C are views showing first to third flow path plates incorporated in the direct type methanol fuel cell power generator.
Figure 37B:
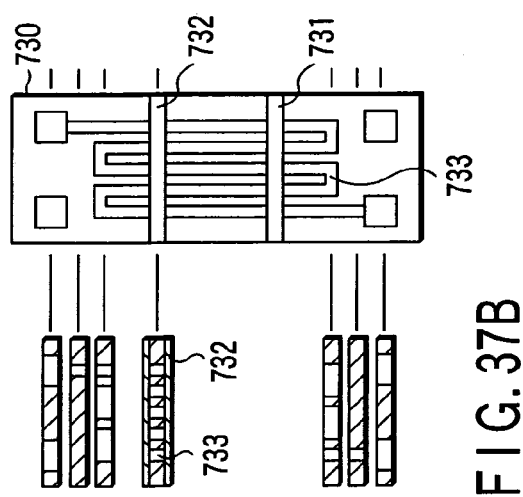
Figure 37C:
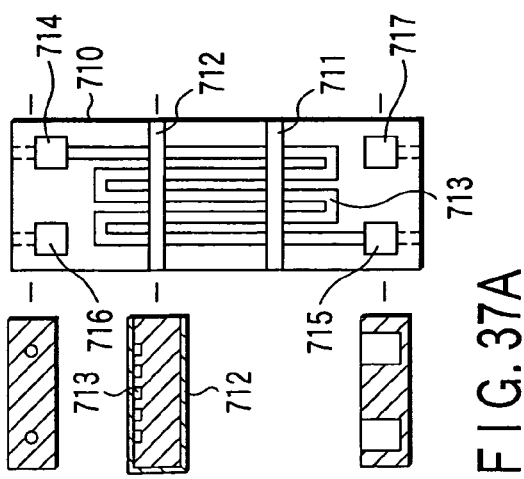

FIG. 35 is a side view showing a direct type methanol fuel cell power generator 700 according to a seventh embodiment of the present invention. FIGS. 36A and 36B are views each showing the direct type methanol fuel cell power generator 700. FIG. 36A is a perspective view showing the power generator. FIG. 36B is a sectional view showing the power generator. FIGS. 37A to 37C are views showing first to third flow path plates 710, 730, and 750 incorporated in the direct type methanol fuel cell power generator 700.

An acrylic resin being an insulating resin was made of a material, and a mono-polar type flow path plate having an alternate type flow path shape was used. In the direct type methanol fuel cell power generator 700, a stack body is stacked with the first flow path plate 710, a first electromotive portion layer 720, the second flow path plate 730, a second electromotive portion layer 740, and the third flow path plate 750 in the upper middle of FIG. 36. The stack body is sandwiched between thick plates 760 and 761 made of a stainless material, and is formed by tightening it with a bolt 762. Reference numerals 770*a* and 770*h* each designate a metallic terminal.

The first flow path plate 710 comprises gold ribbons 711 and 712. On the bottom face, a first flow path 713 for oxidizing agent is formed in the shape of a recessed groove. Further, a oxidizing agent supply port 714, a oxidizing agent ejection port 715, an fuel supply port 716, and an oxidizing agent ejection port 717 are formed, and pipes 718*a* to 718*d* are connected to these ports, respectively.

The anode electrode 723 is disposed at the lower side in the figure, and the cathode layer 722 is disposed at the upper side in the figure. The anode electrode 743 is disposed at the upper side in the figure, and the cathode layer 742 is disposed at the lower side in the figure.

The second flow path plate 730 is a mono-polar type flow path plate, and is formed of an acrylic material. A second flow path 733 for fuel is formed in a shape which penetrates in a thickness direction of second flow path plate. A detailed description of the layer is omitted here.

The third flow path plate 750 comprises gold ribbons 751 and 752. On the top face, a third flow path 753 for oxidizing agent is formed in the shape of a recessed groove.

Further, reference numerals 771*a* to 771*e* each denote a copper wire. The copper wire 771*a* causes conduction between the metallic terminals 770*a* and 770*b*. The copper wire 771*b* achieves conduction between the metallic terminals 770*c* and 770*e*. The copper wire 771*c* achieves conduction between the metallic terminals 770*d* and 770*f*. The copper wire 771*d* achieves conduction between the metallic terminals 770*g* and 770*i*. The copper wire 771*e* achieves conduction between the metallic terminals 770*h* and 770*j*.

The oxidizing agent fed from a fuel pump (not shown) is supplied to the oxidizing agent supply port 714 via the pipe 718*c*, and then, the supplied oxidizing agent is ejected from the oxidizing agent ejection port 715 through the first flow path 713 and the third flow path 753 to the outside of the cell via the pipe 718*d*. That is, the oxidizing agent is supplied to cathode electrodes 722 and 742. In addition, the fuel fed from an air pump (not shown) is supplied to an fuel supply port 716 via a pipe 718*a*, and then, the supplied fuel is ejected from an fuel ejection port 717 through the second flow path 733 to the outside of the cell via the pipe 718*b*. That is, the fuel is supplied to anode electrodes 723 and 743.

In the figure, reference numerals 711, 712, 751, and 752 each designate a gold ribbon, and reference numerals 713, 733, and 753 each designate a flow path. Further, the oxidizing agent supply port 714, the oxidizing agent ejection port 715, the fuel supply port 716, and the fuel ejection port 717 are formed, and pipes 718*a* to 718*d* are connected to these ports, respectively.

With respect to the mono-polar type flow path plates positioned among the four electromotive portions, a flow path penetrates a flow path plate on the top and bottom, and a fuel is supplied from the supply port to the flow path. The thickness of the mono-polar type flow path plate was defined to be twice of the depth of the flow path in Example 3 such that the depth of the flow path per electromotive portion unit is equal to that of the flow path in Example 3.

The gold ribbons 711, 712, 751, and 752 for inducing an electrical output from electromotive portion units each have the thickness and width equal to those of Example 4. However, with respect to the mono-polar type flow path plate, the top and bottom of the flow path plate was not rounded in order to ensure an insulated state on the top and bottom. Further, in order to provide electrical wiring among four gold ribbons of the mono-polar type flow path plate, as shown in FIG. 35, the gold wires 771*a* to 771*e* of 0.1 mm in diameter was inserted between each of the gold ribbons 711, 712, 751, and 752 and the silicon rubber resin base sealing member at the end of the flow path plate when a stack is formed.

An electromotive portion unit was installed such that the anode electrode faced the mono-polar type flow path plate 730, a fuel was supplied to the pipe 718*a* such that the fuel was supplied to a flow path with which the anode electrode comes into contact, and an oxidizing agent was supplied from the pipe 718c. A voltage on an electromotive portion unit by unit basis was measured by utilizing the gold wires which are electrically connected between the electromotive portion units.

EXAMPLE 7

Figure 38:
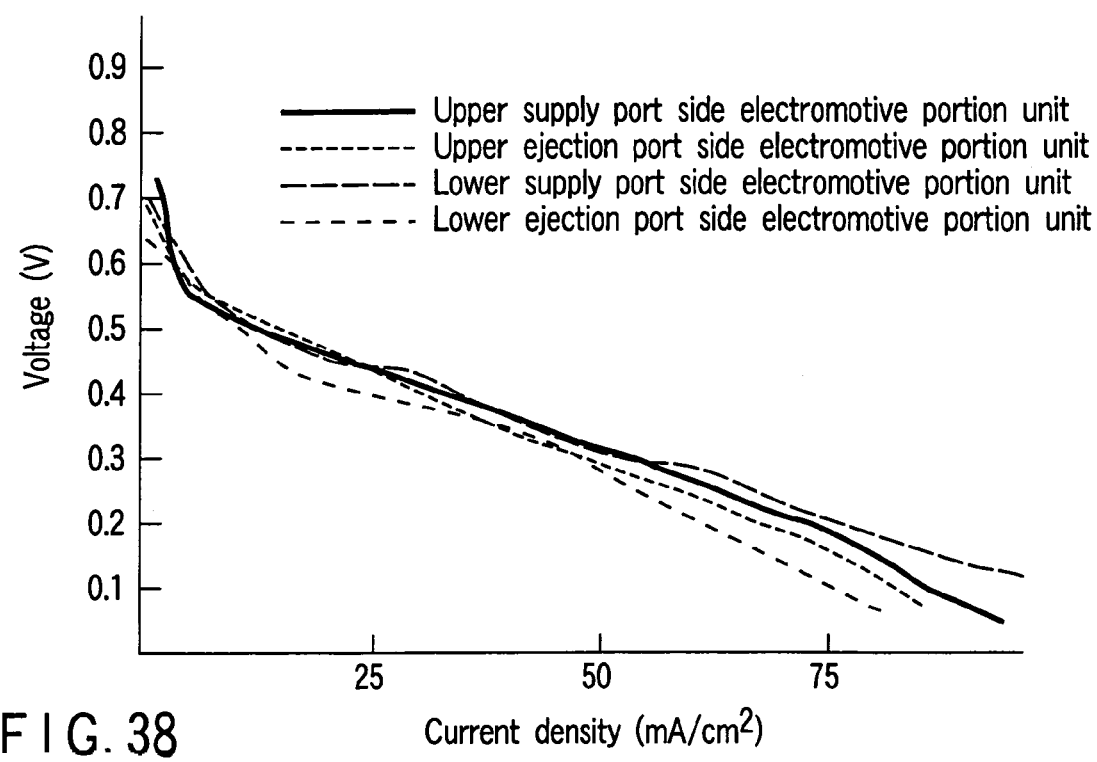
FIG. 38 is a view showing a current voltage characteristic when the direct type methanol fuel cell power generator has been operated under the operating condition of Example 3.

FIG. 38 is a view showing a current voltage characteristic when the above-described direct type methanol fuel cell power generator 600 has been operated under the operating condition of Example 3. As in Examples 2, 3 and 4, it was verified that advantageous effect of an alternate type flow path was well achieved. Further, it was found that an output difference between the electromotive portion units arranged on the top and bottom of the mono-polar type flow path plate 730 was very small as compared with that of Examples 3 and 4. This improvement is considered to have been achieved for the following reason. That is, in the case of Examples 3 and 4, a fuel was supplied to a set of two electromotive portion units by the two branched flow paths. In contrast, in Example 7, a fuel was supplied to four electromotive portion units by one flow path which does not branch. That is, in the mono-polar type flow path plate 730 as well, it was demonstrated that an alternate type flow path was effective, and its validity was verified.

In the mono-polar type flow path plate 730, by using the flow path 733 which is shaped to penetrate on both faces of the flow path plate, it was verified possible to make substantially uniform a supply amount of the fuel to electromotive portion units arranged on both faces of the flow path plate from this Example and the results of Examples 8 and 11 described later. This result indicates validity of claim 4 in the present invention. Further, the flow path is shaped so as to be bent and meandered as represented by the alternate type flow path shown in this Example or Example 8 described later instead of a parallel type shape, whereby it is found possible to carry out more stable supply of the fuel and oxidizing agent.

That is, by using the flow path plate according to the present embodiment, it becomes possible to flexibly design the shape of the flow path fully considering operating efficiency of the entire fuel cell power generator such as a burden of a complementary load due to lowering of a pressure loss in the flow path, prevention of residence of a product during power generation, supply of the fuel and oxidizing agent, position of the ejection port and the like. Further, by using the flow path plate having the alternate type flow path, it was verified possible to obtain a uniform and stable output in any of a plurality of electromotive portion units as shown in this Example.

As has been described above, in the direct type methanol fuel cell power generator 700 according to the present embodiment, a deflection in output on an electromotive portion unit by unit basis is reduced and stable fuel supply can be carried out. Thus, a stable output can be obtained.

Eighth Embodiment

Figure 39A:
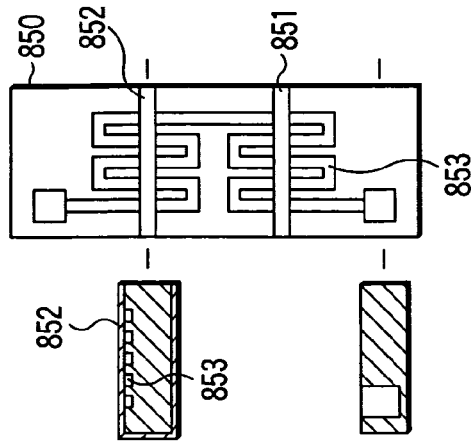
FIGS. 39A to 39C are plan views and sectional views of essential portions showing a direct type methanol fuel cell power generator according to an eighth embodiment of the present invention.
Figure 39B:
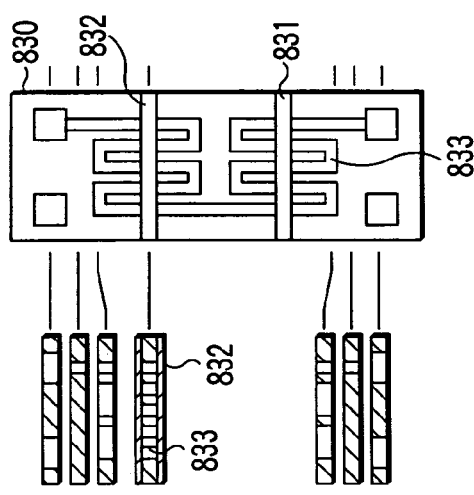
Figure 39C:
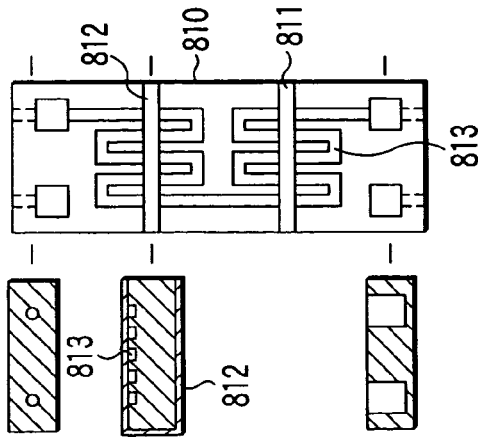

FIGS. 39A to 39C are plan views and sectional views of essential portions showing a direct type methanol fuel cell power generator 800 (not shown) according to an eighth embodiment of the present invention. FIG. 39A shows a first flow path plate 810, FIG. 39B shows a second flow path plate 830, and FIG. 39C shows a third flow path plate 850.

As in Example 7, an acrylic resin being an insulating resin was used as a member of a flow path plate, a mono-polar type flow path plate as shown in FIG. 35 comprising a serial type flow path was formed, and a direct type methanol fuel cell power generator was configured. In the figure, reference numerals 811, 812, 831, 832, 851, and 852 each designate a gold ribbon, and reference numerals 813, 833, and 853 each designate a flow path.

EXAMPLE 8

Figure 40:
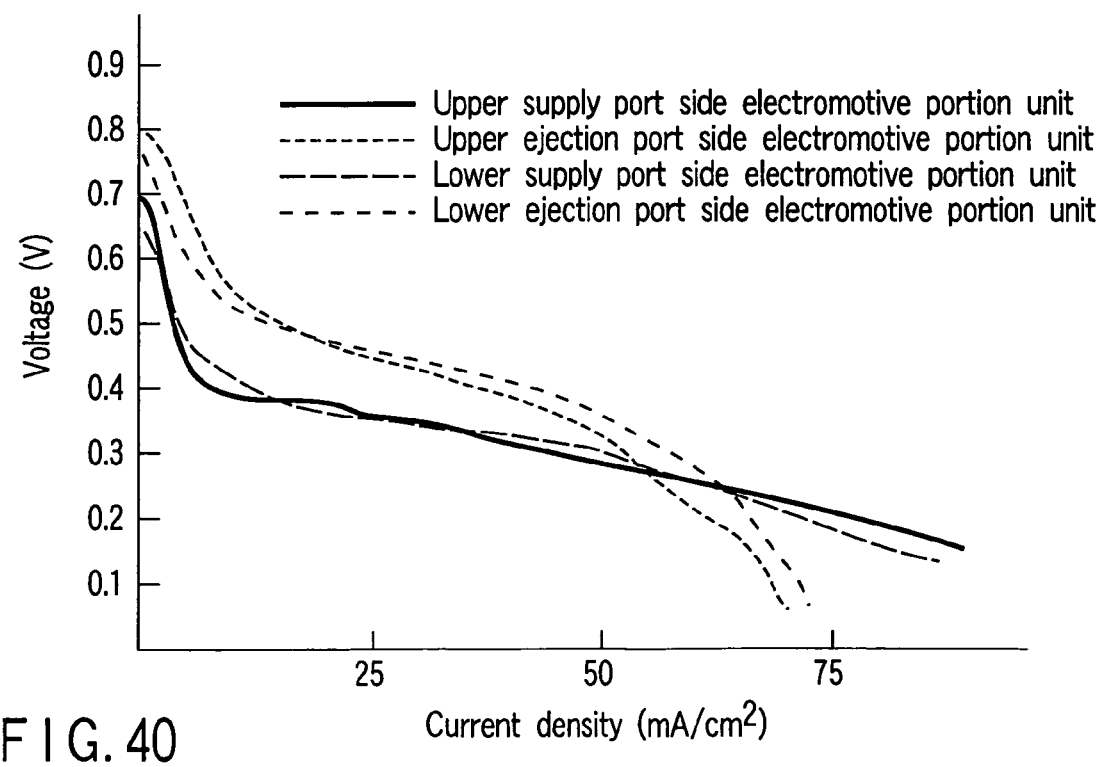
FIG. 40 is a view showing a current voltage characteristic when the direct type methanol fuel cell power generator has been operated under the operating condition of Example 3.

FIG. 40 is a view showing a current voltage characteristic when the above direct type methanol fuel cell power generator 800 has been operated under the operating condition of Example 3. As is seen from FIG. 40, as in Comparative Example 1, Comparative Example 4, and Example 5, the critical charge current density of the electromotive portion unit at the side of the fuel ejection port was lowered by about 30% as compared with the critical charge current density of the electromotive portion unit-at the side of the fuel supply port. However, as in Example 7, it was verified that an output difference is reduced between two groups of electromotive portion units arranged on the top and bottom of the mono-polar type flow path plate.

As has been described above, in the direct type methanol fuel cell power generator 800 according to the present embodiment, a deflection in output on an electromotive portion unit by unit basis is reduced and stable fuel supply can be carried out. Thus, a stable output can be obtained.

Ninth Embodiment

Figure 41:
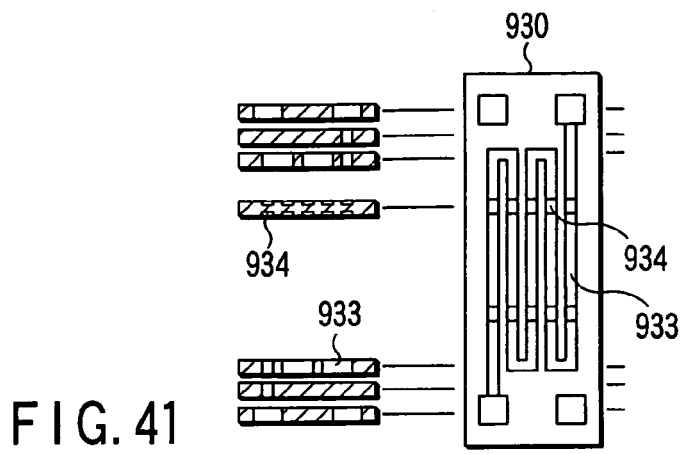
FIG. 41 is a plan view and a sectional view of essential portions showing a flow path plate incorporated in a direct type methanol fuel cell power generator according to a ninth embodiment of the present invention.

FIG. 41 is a plan view and a sectional view showing a flow path plate 930 incorporated in a direct type methanol fuel cell power generator 900 (not shown) according to a ninth embodiment of the present invention. These plan view and sectional view are shown as required.

A mono-polar type flow path 930 was formed by using an acrylic resin being an insulating resin. In the figure, reference numeral 933 shows an alternate type flow path. In addition, a reinforce member 934 is provided in the flow path 933. The reinforce member 934 has the thickness by about 75% of the depth of the flow path.

EXAMPLE 9

Figure 42:
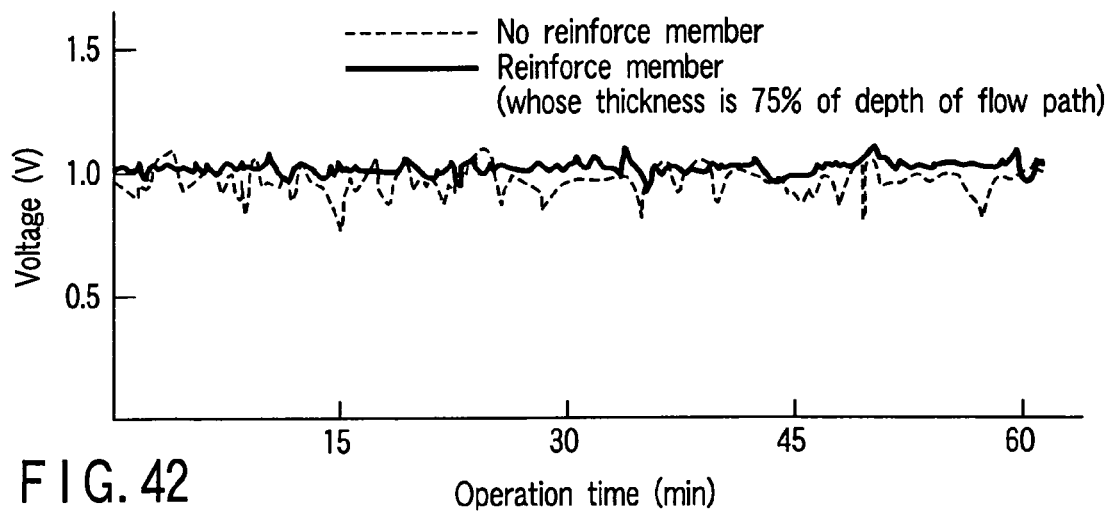
FIG. 42 is a view comparatively showing a current voltage characteristic of the direct type methanol fuel cell power generator.

FIG. 42 is a view comparatively showing current voltage characteristics in the case where the direct type methanol fuel cell power generator 900 and the direct type methanol fuel cell power generator 700 have been continuously operated for one hour under a charge current of 75 nA/cm$^2$ at 70° C., respectively. From FIG. 42, in the direct type methanol fuel cell power generator 700, it was verified that an irregular fluctuation of a voltage output occurred. In order to clarify the cause of this fluctuation, a sheet of silicon rubber resin was sandwiched between stacks as a dummy of a set of electromotive portion units positioned at the upper part of a mono-polar type flow path plate, and visualization of the mono-polar type flow path plate was carried out. As a result, it was found that a comb-shaped structure portion forming a flow path is significantly inclined or slightly swung by a tightening pressure in the vertical direction of the flow path plate when a stack is formed and expansion or the like in the thickness direction of the electromotive portion unit during operation, and then, air bubbles of carbon dioxide produced in the flow path of the mono-polar type flow path plate onto which a fuel is supplied short-circuits a flow path. In this way, it was found that air bubbles of carbon dioxide retained irregularly in a region of a part of the flow path, and the shortage of fuel supply occurred irregularly in a region of a part of the electromotive portion unit.

In the direct type methanol fuel cell power generator 900, as described above, the reinforce member 934 was formed. Thus, it was verified possible to decrease irregular fluctuation swing width of voltage output as seen in FIG. 42 to an extent of 50% before troubleshooting.

Tenth Embodiment

Figure 43:
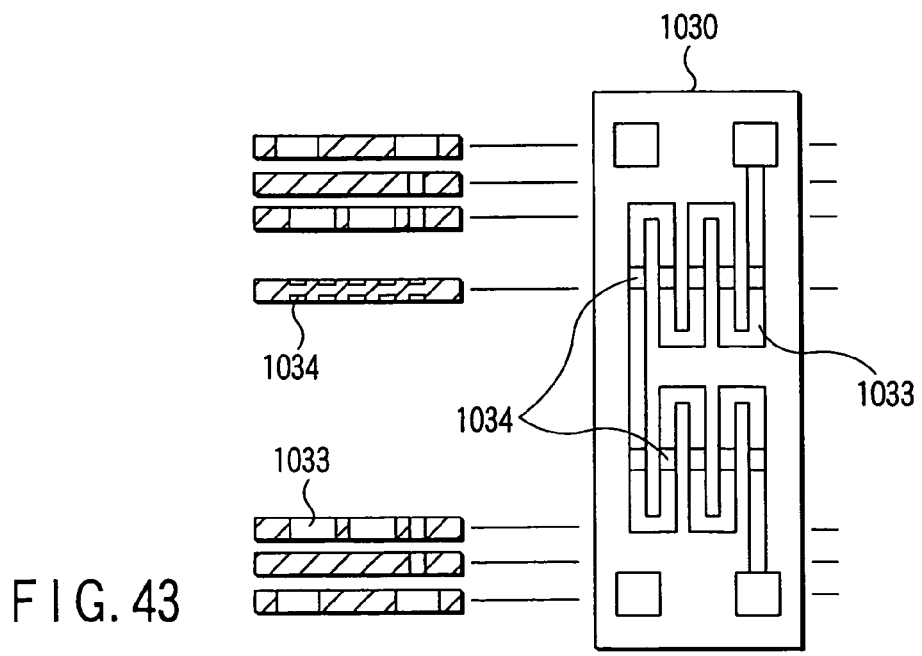
FIG. 43 is a plan view and a sectional view of essential portions showing a flow path plate incorporated in a direct type methanol fuel cell power generator according to a tenth embodiment of the present invention.

FIG. 43 is a plan view and a sectional view showing a flow path plate 1030 incorporated in a direct type methanol fuel cell power generator 1000 (not shown) according to a tenth embodiment of the present invention. These plan view and sectional view are shown as required.

A mono-polar type flow path 1030 was formed by using an acrylic resin being an insulating resin. In the figure, reference numeral 1033 designates a serial type flow path. A reinforce member 1034 is provided in the flow path 1033. The reinforce member 1034 has the thickness by about 75% of the depth of the flow path.

EXAMPLE 10

A power generating operation test similar to that of Example 9 was carried out in a mono-polar type flow path plate having formed thereon the serial type flow path used in Example 8. Further, the above mono-polar type flow path plate was compared with a flow path plate on which troubleshooting of a comb-shaped structure portion was carried out by forming the reinforce member 1030 as shown in FIG. 43. As a result, as in Example 9, it was verified that a voltage fluctuation appearing before troubleshooting decreased to about 40% before troubleshooting.

As has been above, in the direct type methanol fuel cell power generator 100 according to the present embodiment, a deflection in output on an electromotive portion unit by unit basis is reduced and a stable fuel supply can be carried out. Thus, a stable output can be obtained.

Eleventh Embodiment

Figure 44:
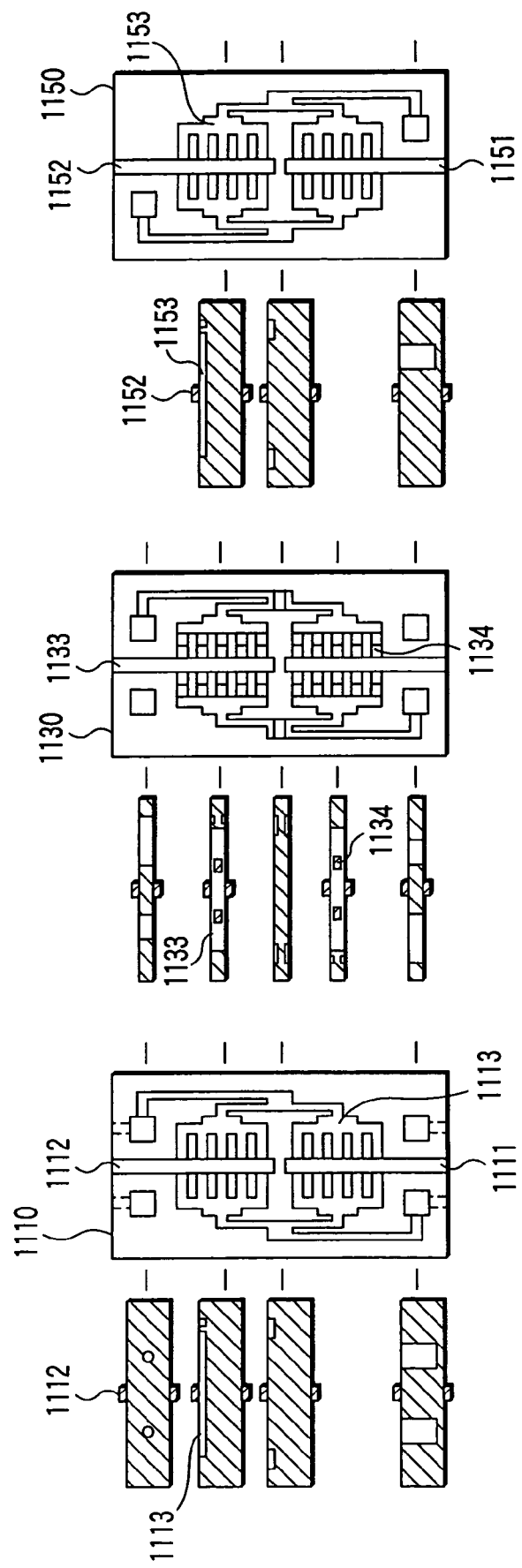
FIGS. 44A to 44C are views each showing a flow path plate incorporated in a direct type methanol fuel cell power generator according to an eleventh embodiment of the present invention.

FIGS. 44A to 44C are views each showing a flow path plate incorporated in a direct type methanol fuel cell power generator 1100 (not shown) according to an eleventh embodiment of the present invention. The figures show first to third flow path plates 1110, 1130, and 1150. An acrylic resin being an insulating resin was used as a material for each of the flow path plates. A mono-polar type flow path plate 1130 comprising a parallel type flow path was used. In the figures, reference numerals 1111, 1112, 1131, 1132, 1151, and 1152 each designate a gold ribbon, and reference numerals 1113, 1133, and 1153 each designate a flow path. In addition, reference numeral 1134 designates a reinforce member.

A parallel type flow path used in the direct type methanol fuel cell power generator 600 cannot be formed in a shape penetrating the top and bottom of a flow path plate unlike the direct type methanol fuel cell power generator 700 or direct type methanol fuel cell power generator 800 because a comb-shaped structure portion is not supported from the periphery of the flow path plate. In the direct type methanol fuel cell power generator 1100, by providing the reinforce member 1134, it has been possible to form a flow path in the shape penetrating the top and bottom of the flow path plate.

EXAMPLE 11A

Figure 45:
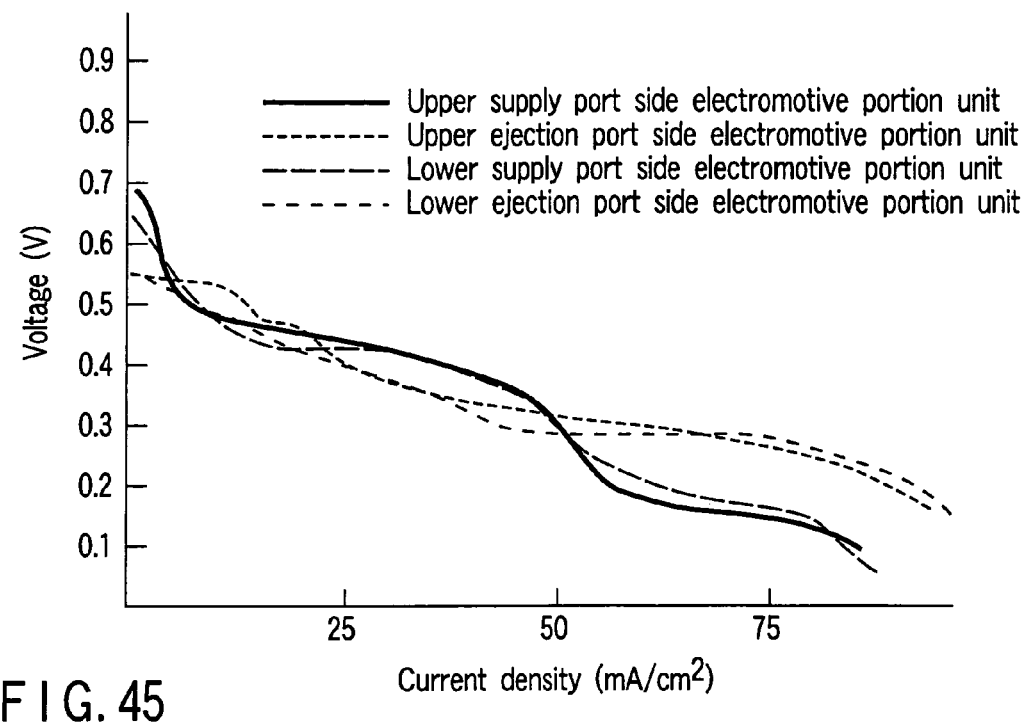
FIG. 45 is a view showing a current voltage characteristic when the direct type methanol fuel cell power generator has been operated under an operating condition of Example 9.

FIG. 45 is a view showing a current voltage characteristic when the above-described direct type methanol fuel cell power generator 1100 has been operated under the operating condition of Example 9 (or Example 10). As is seen from FIG. 45, as in Example 6, it was observed that an output was unstable due to a deflection in fuel supply amount with respect to two electromotive portion units arranged on the same plane. However, as in Examples 7 and 8, it was verified that an output difference between the sets of the top and bottom electromotive portion units decreases.

In addition, as in Examples 9 and 10, it was found possible to suppress a disposition of flow paths while in tightening or power generation or to prevent short-circuit or closing between the flow paths by means of the reinforce member formed in the flow path. Further, in the case of forming a stripe shaped flow path failing to comprise an external manifold, it was found very effective in preventing an island shaped portion in a flow path partitioning a flow path from completely slipping off from the periphery of the flow path plate.

EXAMPLE 11B

Figure 46:
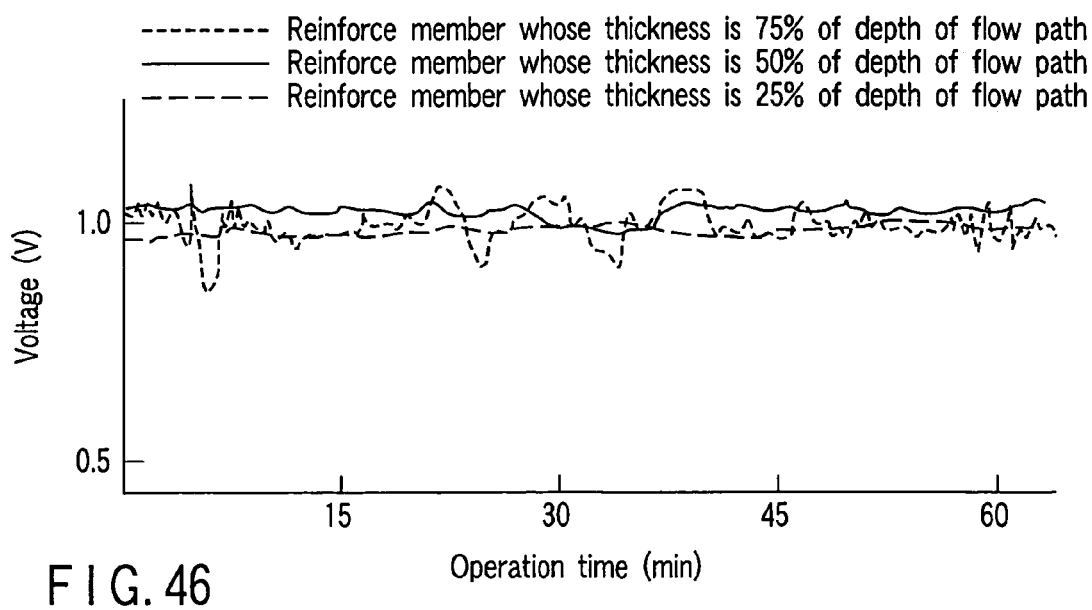
FIG. 46 is a view showing a current voltage characteristic when the direct type methanol fuel cell power generator has been operated under the operating condition of Example 9.

FIG. 46 is a view showing a current voltage characteristic when the above-described direct type methanol fuel cell power generator 1100 has been operated under the operating condition of Example 9 or Example 10. In Example 9, when continuous operation was carried out at a temperature of 70° C. and at a current density of 75 mA/cm$^2$ for one hour, a decrease in voltage output fluctuation of about 50% was achieved as shown in FIG. 42. However, a slight fluctuation of voltage output was observed. In this regard, if continuous operation in the same condition was carried out in a visualized state, it was found that air bubbles of carbon dioxide produced in the flow path were carried and retained in the reinforce member, which caused regular fluctuation of voltage output.

Some of the materials for which the thickness of the reinforce member of the flow path plate used in Example 9 is reduced in a stepwise manner with respect to the depth of the flow path were formed, and an attempt was made to investigate dependency on fluctuation of a voltage output.

It was clarified that a voltage fluctuation decreased rapidly by the thickness of the reinforce member being equal to or smaller than about 50% to 40% with respect to the depth of the flow path. Also in a flow path visualization operation, it was verified that the one-second or more retention of carbon dioxide by the reinforce member did not occur in thickness equal to or smaller than the above thickness.

Moreover, the retention of air bubbles of carbon dioxide by this reinforce member is more likely to occur as the sectional view of the reinforce member becomes closer to be vertical to the sectional view of the flow path. In order to decrease the retention of air bubbles of carbon dioxide more remarkably, it was found preferable to set to an acute angle the sectional view of the reinforce member against a directional face on which a fuel or an oxidizing agent advanced.

As has been described above, in the direct type methanol fuel cell power generator 1100 according to the present embodiment, a deflection in output on an electromotive portion unit by unit basis is reduced and stable fuel supply can be carried out. Thus, a stable output can be obtained.

Twelfth Embodiment

Figure 47:
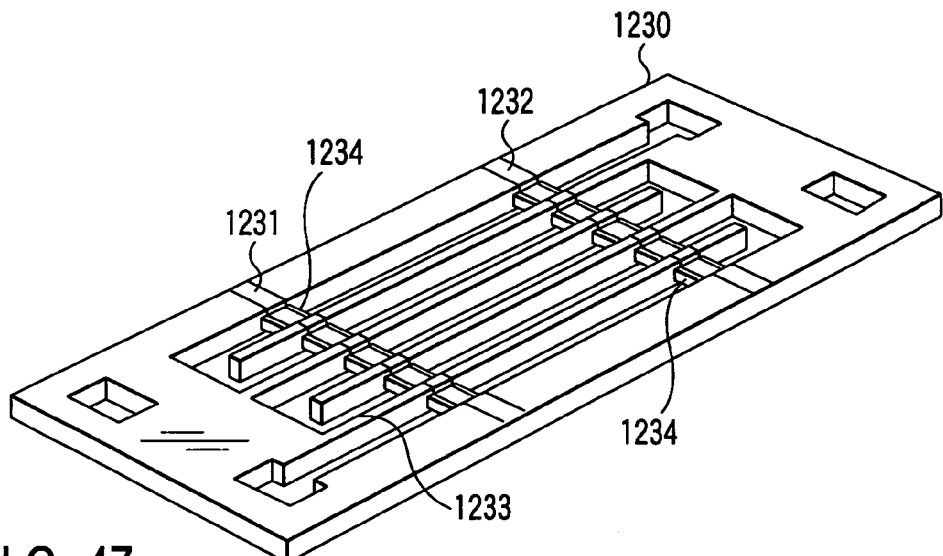
FIG. 47 is a view showing a flow path plate incorporated in a direct type methanol fuel cell power generator according to a twelfth embodiment of the present invention.

FIG. 47 is a view showing a flow path plate 1230 incorporated in a direct type methanol fuel cell power generator 1200 (not shown) according to a twelfth embodiment of the present invention.

On the flow path plate 1230, gold ribbons 1231 and 1232 were clawed so as to come into intimate contact with a reinforce member 1234, and further, were brought into intimate contact with the member by using a cyano acrylate based adhesive agent. During intimate contact, the adhesive agent was applied to only a portion of the reinforce member such that a site of the gold ribbons 1231 and 1232 coming into contact with an electromotive portion unit is not covered with the adhesive agent. Reference numeral 1233 designates a flow path.

EXAMPLE 12

In the above-described direct type methanol fuel cell power generator 1100 using the mono-polar type flow path plate in Example 11B, it is verified that, if one-hour continuous operation is carried out under a current density of 75 mA/cm$^2$ at 70° C. for one hour, the gold ribbons 1131 and 1132 are slackened in the center direction of the flow path, and the retention of air bubbles of carbon dioxide occurs due to such slackness. In addition, it was verified that, after the above operation had been repeated several times, the breakage of the gold ribbons 1131 and 1132 occurs due to expansion or contraction of an electromotive portion unit on rare occasion.

EXAMPLE 13

In the direct type methanol cell power generator 1200, even in the case where one-hour continuous operation had been repeated some tens of times under a charge current of 75 mA/cm2 at a temperature of 70° C. for one hour, no deformation or deflection of the gold ribbons occurred, and fluctuation or lowered output of a voltage output due to a failure of a conductive member was successfully prevented.

In the case where power collection from an electromotive portion is carried out by a conductive member, the conductive member must be routed in the planar direction of the flow path plate. In view of a situation in which contact with an electromotive portion is obtained, there is a need to use as a conductive member a precious metal or a base metal member coated with the precious metal, or a carbon which is prone to be comparatively higher in resistance. However, as routing of the conductive member is longer, the cost becomes higher in the case where the member is made of a precious metal. In the case where the member is made of a carbon material, an electrical resistance cannot be ignored. That is, there is a need to arrange conductive members in a distance as short as possible, and as in this Example, a situation that the flow path must be unavoidably crossed occurs. In such a case, it was verified possible to avoid unnecessarily covering the surface of the electromotive portion unit with the electromotive member as well as to prevent a malfunction such as short-circuit between the conductive members while in power generation.

As described above, in the direct type methanol fuel cell power generator 1200 according to the present embodiment, a deflection in output on an electromotive portion unit by unit basis is reduced and stable fuel supply can be carried out. Thus, a stable output can be obtained.

Thirteenth Embodiment

Figure 48A:
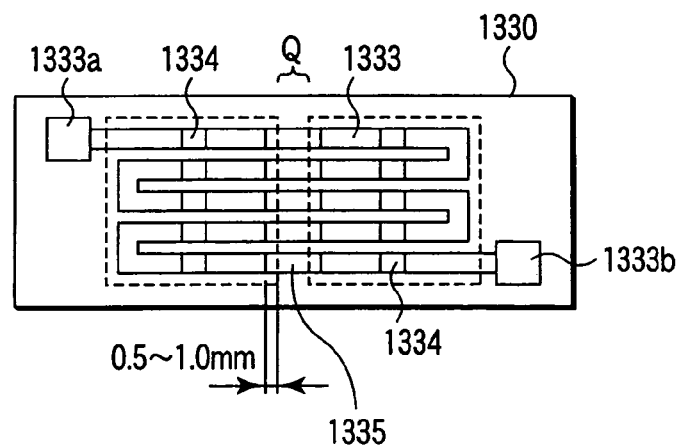
FIG. 48A is a plan view showing a flow path plate incorporated in a direct methanol fuel cell power generator according to a thirteenth embodiment of the present invention.
Figure 48B:
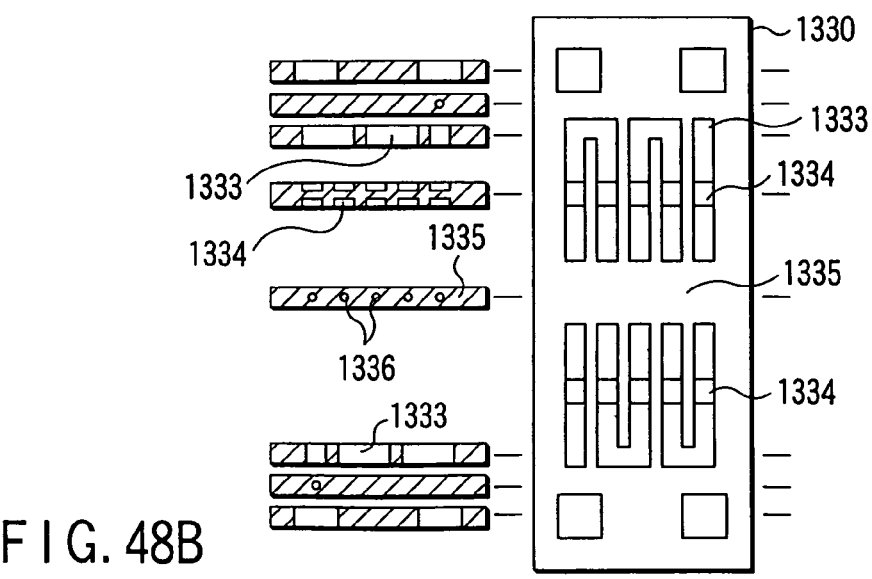
FIG. 48B is a plan view and a sectional view of essential portions showing the flow path plate.
Figure 51A:
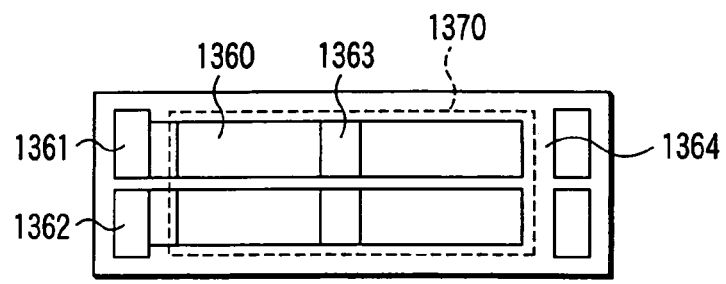
FIGS. 51A to 51E are plan views each showing a modified example of a flow path plate on which a penetrating portion is provided on a boundary wall.
Figure 51B:
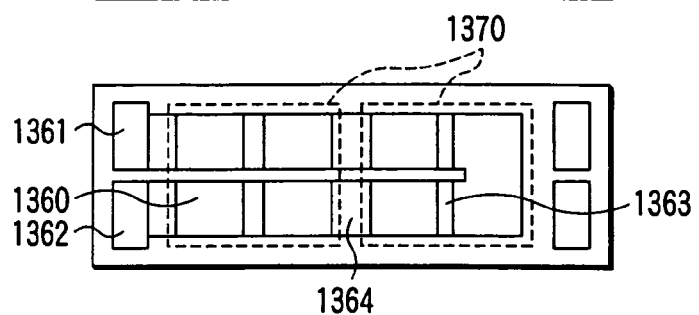
Figure 51C:
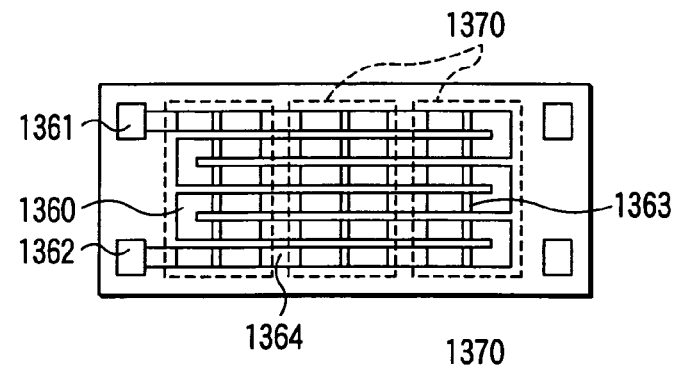
Figure 51D:
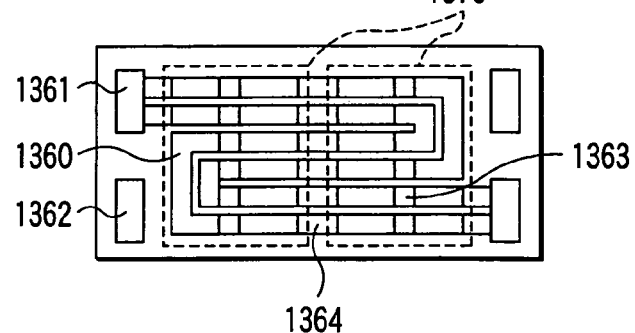
Figure 51E:
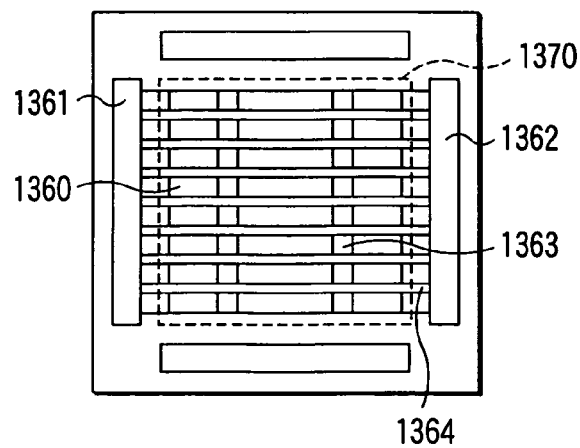
Figure 52A:
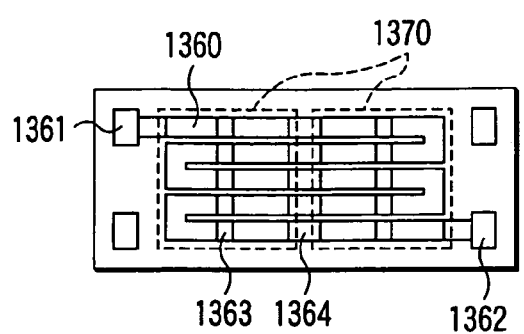
FIGS. 52A to 52F are plan views each showing a modified example of the flow path plate on which the penetrating portion is provided on the boundary wall.
Figure 52D:
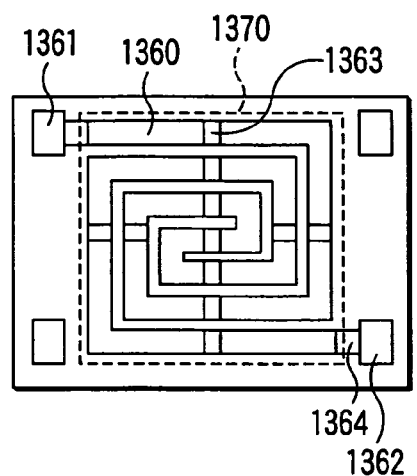
Figure 52B:
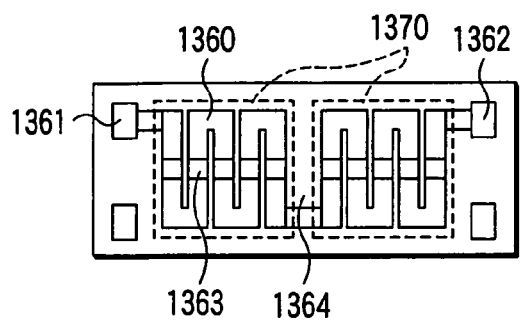
Figure 52E:
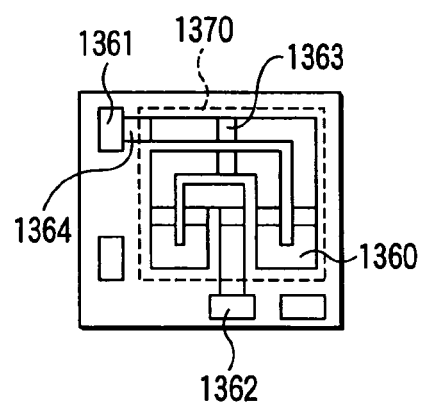
Figure 52C:
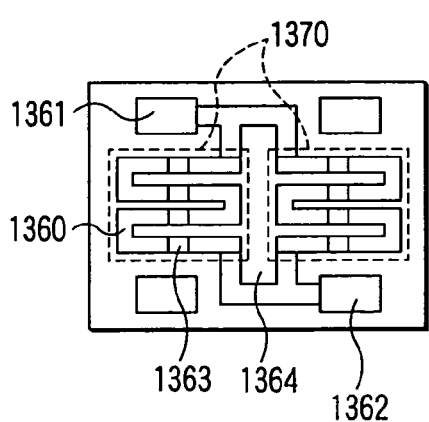
Figure 52F:
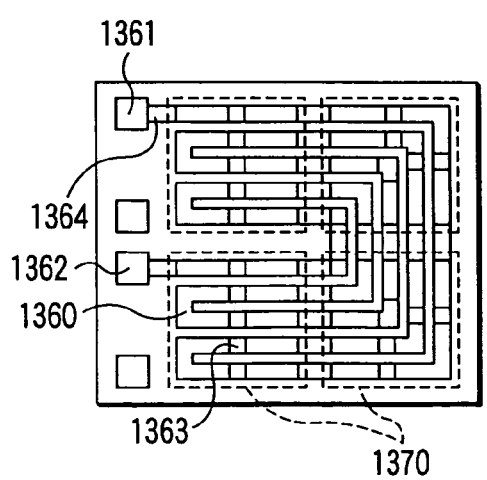

FIGS. 48A and 48B are a plan view and a sectional view showing a flow path plate 1330 incorporated in a direct type methanol fuel cell power generator 1300 (not shown) according to a thirteenth embodiment of the present invention. These plan view and sectional view are shown as required. FIG. 49 shows a flow path plate before forming a penetrating portion. FIGS. 50A to 50C are sectional views each showing a process for forming the penetrating portion.

The flow path plate 1330 has an alternate type flow path 1333, and a reinforce member 1334 is provide inside of the flow path. As shown in FIG. 48A, a site Q which is not covered with the anode electrode or cathode electrode is provided by several millimeters between the electromotive portion units formed in the same electromotive portion unit layer. At this site Q, since no reaction occurs, there is no need to expose the flow path 1333 to the surface of the flow path plate 1330. Therefore, after a boundary wall 1335 has been left on the flow path plate 1330, a tunnel shaped penetrating portion 1336 is formed on the boundary wall 1335. At this time, an outlet or an inlet of the penetrating portion 1336 was formed so as to be set at a position of 1.0 mm in the electrode inward direction of the anode electrode or cathode electrode from the end of the anode electrode or cathode electrode.

In a method for forming the penetrating portion 1336, as shown in FIGS. 49 and 50A, the flow path 1333 is formed while leaving the boundary wall 1335 being a boundary of the electromotive portion units. At the same time, a supply port 1333a and an ejection port 1333b are formed. Then, as shown in FIG. 50B, a through hole is cut by drilling it from a side face of the boundary wall 1335 to form the penetrating portion 1336.

EXAMPLE 13

According to the thus configured direct type methanol fuel cell power generator 1300, it is possible to prevent an occurrence of closing of a flow path, short-circuit between the flow paths, or leakage of the fuel and oxidizing agent. That is, in an electromotive portion unit, an electrolyte film swells during operation, and a sealing member may be deflected. Thus, there can occur closing of a flow path positioned between the adjacent electromotive portion units in the same electromotive portion unit layer, or short-circuit of a fuel or an oxidizing agent on a line on which an end of the electromotive portion unit crosses a flow path. Therefore, it was found that the lowering of an output occurred.

On the other hand, when a flow path plate was formed by aligning an inlet and an outlet of a tunnel-shaped structure with an end face of the anode electrode or cathode electrode, there occurred a phenomenon that an oxidizing agent and a fuel short-circuit between the adjacent flow paths after passing a gap produced at a contact portion between a cross section of the electrode and a cross section of the silicon rubber resin sealing member.

Therefore, it is desirable that the inlet and outlet of the tunnel-shaped structure be positioned inside of the anode electrode and cathode electrode. However, as the position to be formed is deeper in the inner direction of the anode electrode or cathode electrode, an area facing the cathode electrode of the flow path is reduced, and power generation efficiency is considered to be impaired.

According to a test, when the inlet and outlet were formed at the inside by 0.5 mm, there occurred a phenomenon that, after an operation test for a long period of time, a fuel and an oxidizing agent short-circuit due to contraction of an electrolyte film or silicon rubber resin sealing member on rare occasion. Further, when the inlet and outlet were formed at the inside by 1 mm, no failure was observed.

From these facts, it was found desirable to position the inlet and outlet of the penetrating portion by about 1.0 mm in the inward direction of the anode electrode and cathode electrode. Even in the case of using an anode electrode or a cathode electrode of a small area such that a loss of fuel supply in an area having a width of 1 mm in periphery cannot be ignored, it was found desirable to position the inlet and outlet at the inside of about 0.5 mm in order to prevent short-circuit or leakage.

With respect to the shape of an alternate type flow path, in order to achieve the feature more effectively, it is concluded preferable to reciprocate or encompass between a plurality of electromotive portion units or electrodes arranged in parallel on the same plane. However, as a result, there is higher possibility that a flow path faces a sealing member using a silicon based or Teflon based member. In particular, it was found important to form the tunnel-shaped structure in the flow path as shown in this Example in achieving the features of the shape of the alternate shape flow path.

In addition, it was found that such a tunnel-shaped structure was effective to the flow path portion positioned between the supply port or the ejection port of the flow path port and the electrode. Further, such a tunnel-shaped structure is not realistic from the viewpoint of rigidity in applying the structure to a brittle member such as a carbon. The above tunnel-shaped structure is significantly effective in the case of using the above-described insulating resin member.

FIGS. 51A to 51E and 52A to 52F are plan views each showing a modified example in which a boundary wall is provided on a flow path plate, and a penetrating portion is provided on the boundary wall. In these figures, reference numeral 1360 denotes a flow path; 1361 and 1362 denote a supply port and an ejection port; 1363 denotes a reinforce member; and 1364 denote a boundary wall. A penetrating portion (not shown) is provided at the inside, and a plurality of flow paths 1360 are connected to each other. Reference numeral 1370 denotes a range in which the anode electrode or cathode electrode comes into contact with the flow path plate.

As described above, in the direct type methanol fuel cell generator 1300 according to the present invention, a deflection in output on an electromotive portion unit by unit basis is reduced and stable fuel supply can be carried out. Thus, a stable output can be obtained.

Fourteenth Embodiment

Figure 53A:
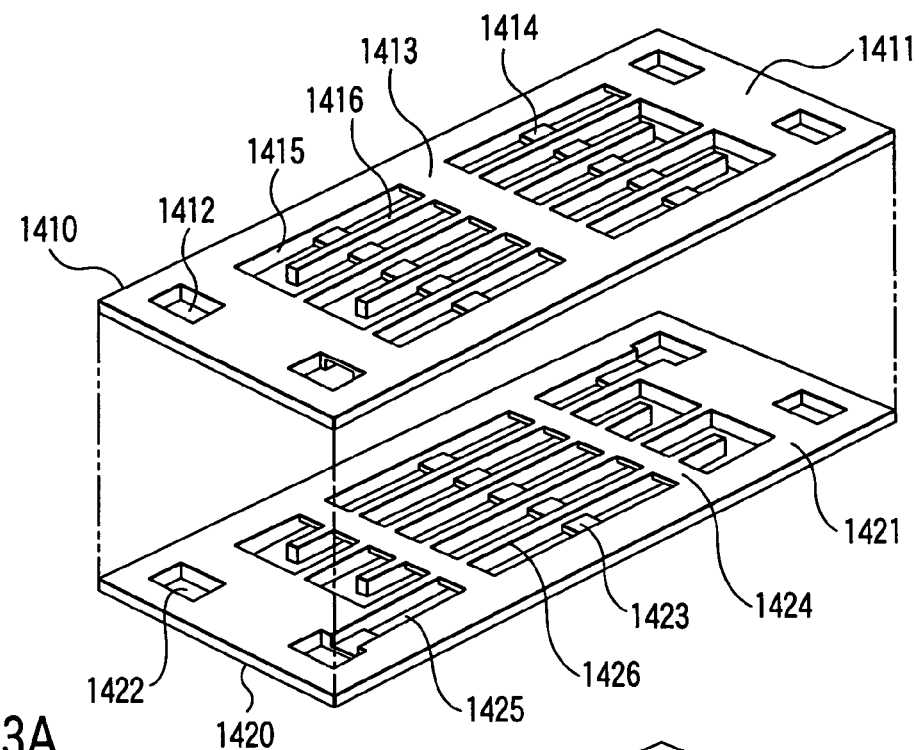
FIGS. 53A to 53C are views each showing a flow path incorporated in a direct type methanol fuel cell power generator according to a fourteenth embodiment of the present invention.
Figure 53B:
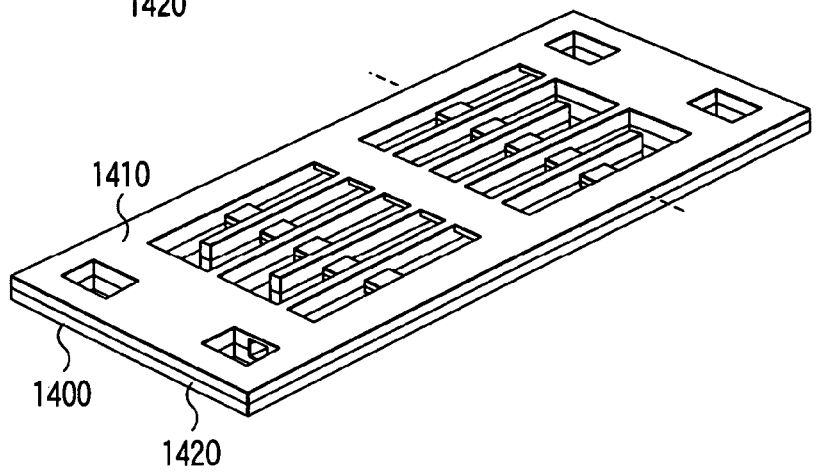
Figure 53C:
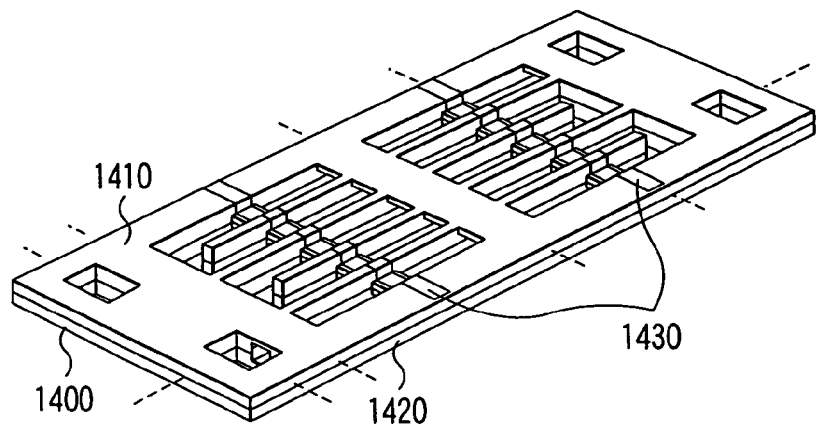

FIGS. 53A to 53C are views each showing a flow path plate incorporated in a direct type methanol fuel cell power generator 1400 according to a fourteenth embodiment of the present invention.

FIGS. 53A and 53B are views each showing a flow path plate 1400 having a penetrating portion. As the flow path plate 1400, there is shown an example when the plate is formed by pasting two resin material based planar members 1410 and 1420. FIG. 53B is a complete view showing the flow path plate 1400 formed by bonding and pasting the two planar members 1410 and 1420. The planar member 1400 has a member main body 1411, and at this member main body 1411, a site serving as each portion of the flow path plate 1400 is formed after assembled. Reference numeral 1412 denotes a hole portion forming portion for forming an ejection port and a supply port; 1413 denotes a boundary wall forming portion; 1414 denotes a reinforce member forming portion; 1415 denotes a flow path forming portion; and 1416 denotes a comb-shaped structure portion forming portion.

Similar, the planar member 1420 has a member main body 1421, and at this member main body 1411, a site serving as each portion of the flow path plate 1400 is formed after assembled. Reference numeral 1422 denotes a hole portion forming portion for forming an election port and a supply port; 1423 denotes a reinforce member forming portion; 1425 denotes a flow path forming portion; and 1426 denotes a comb-shaped structure portion forming portion.

The flow path forming portions 1415 and 1425 of the planar members 1410 and 1420 are formed to produce a mirror image when both of them are pasted with each other. The thickness of a portion of the boundary wall forming portion 1413 is formed to be smaller than the thickness of the member main body 1411 so as to produce the same plane as the surface of the planar members 1410 and 1420 in a face opposite to a face on which the planer members 1410 and 1420 are pasted with each other. It is desirable that the width of the flow path forming portion 1415 is formed to be equal to the width of the flow path forming portion 1425; the thickness of this forming portion is equal to or smaller than a half of the thickness of the member main body 1411 and is equal to or greater than the thickness such that the strength is sufficient.

The boundary wall forming portion 1413 may be formed at both of the planar members 1410 and 1420. Thus forming portion may be formed to be equal to a total of the thicknesses of these members and at only either of reference numerals 4601*a* and 4602*b*. However, it is desirable that a total of the thicknesses of the reinforce member forming portions 1414 and 1424 is equal to or smaller than a total of the thicknesses of the member main bodies 1411 and 1421 and is equal to or greater than 0.2 mm. In addition, it is desirable that this forming portion is formed so as to have the same surface on the face sides to be pasted with each other. In the case where the reinforce member forming portions 1414 and 1424 are formed at both of the planar members 1410 and 1420, it is desirable that the above forming portion is formed so as to produce the same plane as the surface of the planar members 1410 and 1420 in the faces of the planar members 1410 and 1420 to be pasted with each other.

In adhering and pasting these planar members 1410 and 1420, it is preferable to use an adhesive agent made of cyano acrylate or the like and a polymer alloy type thermosetting resin in consideration of chemical resistance, heat resistance, and water resistance. A thermosetting type epoxy resin based adhesive agent or the like may be selected according to adaptability or operating state between the material and adhesive agent of the planar members 1410 and 1420. In order to prevent closing of a flow path, it is desirable that an adhesive agent be applied as uniformly and thinly as possible on the outermost surface at the side of the adhesive face of the planar members 1410 and 1420.

In the flow path plate having the penetrating portion, it was verified that closing of the flow path, short-circuit between the flow paths, or leakage of a fuel and an oxidizing agent was eliminated. On the other hand, the sectional view of a through hole is shaped in a circle whose diameter is smaller than the depth of the flow path. Thus, it was observed that there occurred a significant fluctuation in voltage output due to retention of air bubbles of carbon dioxide as observed in Examples 12 and 13. With respect to the retention of air bubbles of carbon dioxide, the lowering of output with the air bubbles of carbon dioxide was observed for 30 minutes or more during a maximum of one-hour operation. This lowering is considered to have been produced as a result of clogged air bubbles because a sectional area of the penetrating portion on the flow path plate of Example 13 is small.

Therefore, there is a need to increase the sectional area of the penetrating portion. However, such increase of the sectional area is technically difficult in a method for drilling a through hole by using a drilling machine after forming a flow path plate, as shown in Example 13. Even if injection molding is used, the desired cross sectional member is installed before molding, and is removed after the molding. Thus, it is considered that as the number of electromotive portion units increases and as the flow path return count increases, the processes or steps of forming the penetrating portion become very complicated.

In the flow path plate 1400 according to the present embodiment, the flow path plate having a rigid tunnel structure can be easily formed by adhering only at least one set of two members having no penetrating portion formed by injection molding. In addition, in adhering members to each other, it is preferable to use an adhesive agent with a cyano acrylate based and polymer alloy type thermosetting resin in consideration of chemical resistance, heat resistance, and water resistance.

EXAMPLE 14

In a mono-polar type flow path plate 1400 on which acryl is used as a flow path member to be formed above, and a conductive member 1430 is formed as shown in FIG. 53C, a desired penetrating portion can be easily formed. In a one-hour continuous power generating operation under which visualization of a flow path using this flow path plate 1400 was carried out, the retention of air bubbles was equal to or smaller than 10 seconds at most, and a good power generation state was obtained.

As has been described above, in the flow path plate 1400 incorporated in the direct type methanol fuel cell power generator according to the present embodiment, a deflection in output on an electromotive portion unit by unit basis is reduced and stable fuel supply can be carried out. Thus, a stable output can be obtained.

Fifteenth Embodiment

Figure 54A:
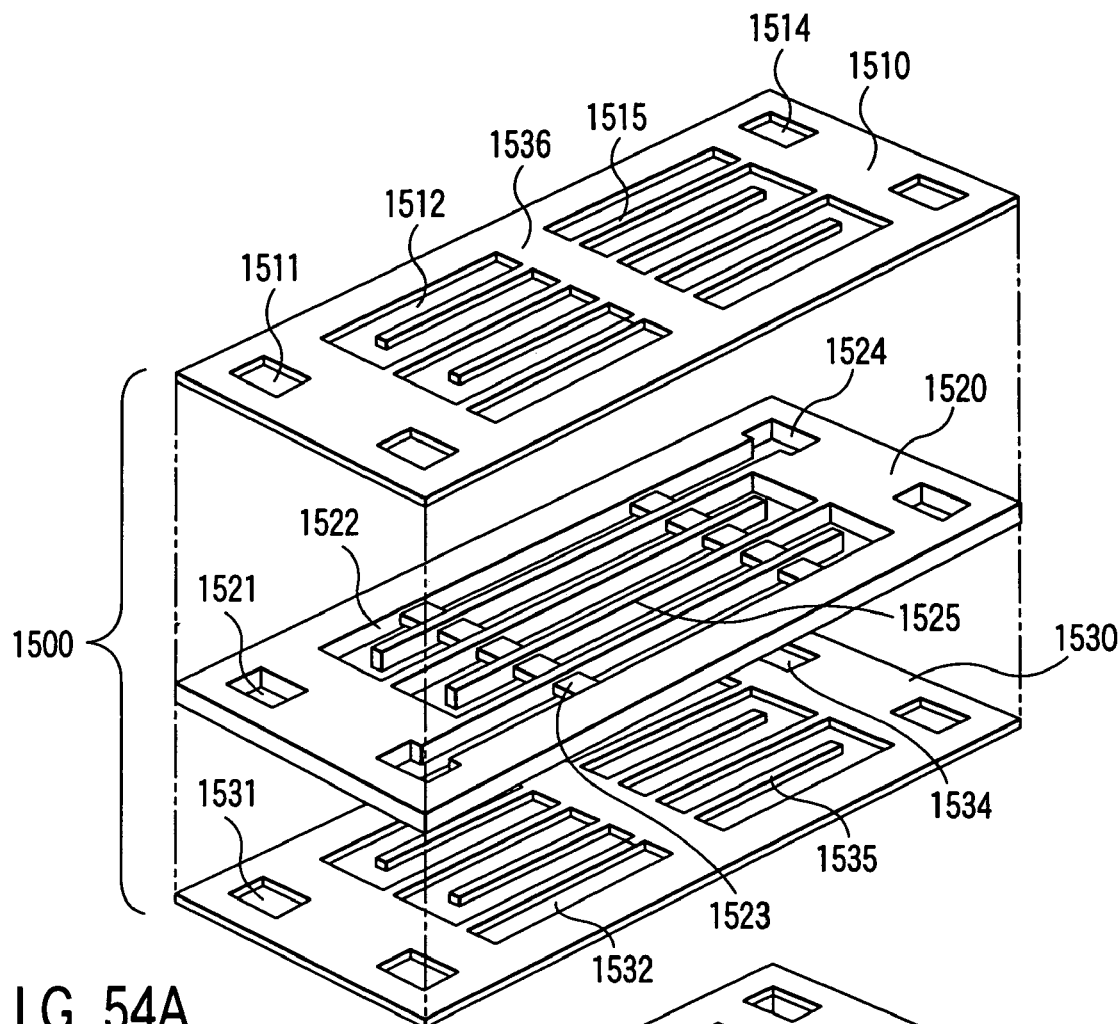
FIG. 54A is an exploded perspective view showing a flow path plate having formed thereon a penetrating portion incorporated in a direct type methanol fuel cell power generator according to a fifteenth embodiment of the present invention.
Figure 54B:
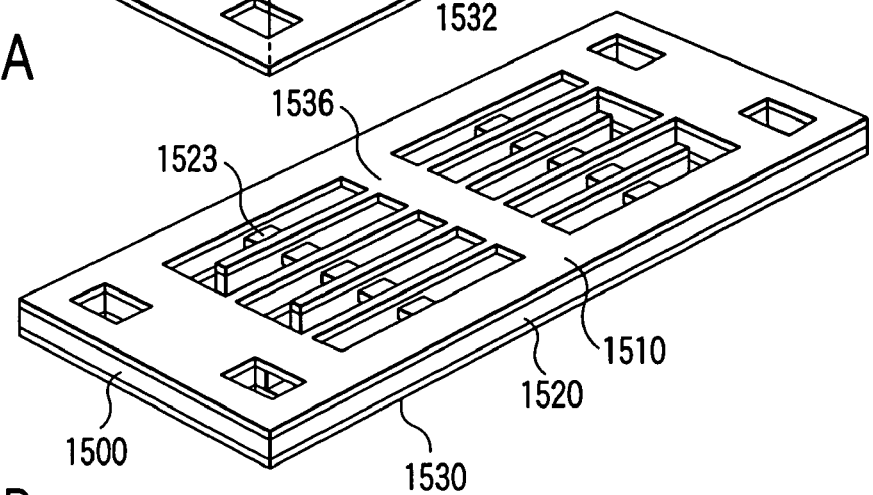
FIG. 54B is a perspective view showing the flow path plate.

FIGS. 54A and 54B is a view showing a flow path plate 1500 having formed thereon a penetrating portion, the flow path plate being incorporated in a direct type methanol fuel cell power generator according to a fifteenth embodiment. The flow path plate 1500 is shown as an example when the plate is formed by pasting three resin material based planar members 1510, 1520, and 1530. FIG. 54B is a complete view showing the flow path plate formed by adhering and pasting the planar members 1510 to 1530 of FIG. 54A.

When the flow path plate is further reduced in thickness, it may be difficult to form a tunnel-shaped structure. However, unlike a case of a flow path plate requiring conductivity, it is possible to provide an insulating resin based thin film which does not require corrosion or consideration of a technique for forming an extremely thin plate to be brought into intimate contact with a full face of the flow path plate.

FIGS. 54A and 54B each show an example when a flow path plate formed in a tunnel-shaped structure is formed by pasting the three planar members 1510 to 1530. FIG. 54B is a complete view showing a flow path plate formed by adhering and pasting the three members of FIG. 54A.

The planar member 1520 serves as a base portion of a flow path when the flow path plate of FIG. 54B is formed. Each of the planar members 1510 and 1530 primarily serves as a cap for forming a penetrating potion. In the figures, reference numerals 1511, 1521, and 1531 each denote a supply port forming portion or an ejection port forming portion; 1512, 1522, and 1532 each denote a flow path forming portion; 1523 denotes a reinforce member of a flow path; 1514, 1524, and 1534 each denote a penetrating port forming portion; 1515, 1525, and 1535 each denote a comb-shaped structure forming portion; and 1536 denotes a boundary wall on which a penetrating portion is formed.

It is desirable that the thickness of the planar members 1510 and 1530 is equal to or smaller than a half of the thickness of the planar member 1520 and is equal to or greater than the thickness such that the strength thereof is sufficient. It is desirable that the thickness of the reinforce member 1523 is equal to or smaller than a half of the thickness of the completed flow path plate and is equal to or greater than 0.2 mm.

A method for adhering and pasting these planar members 1510 to 1530 is identical to that in the case of Example 14. An adhesive agent may be applied to both faces of the planar member 1520 or an adhesive agent may be applied to the adhesive face side of the planar members 1510 and 1530.

In accordance with the above-described process, in a flow path plate formed by using an acryl resin of 1.5 mm in thickness for a member serving as a base station of the flow path plate and by using a polyimide resin film of about 0.2 mm in thickness for a capping portion, the following results were obtained.

EXAMPLE 15A

During one-hour continuous power generating operation, no retention of air bubbles of carbon dioxide of several seconds or more was observed, and a good power generation state was successfully maintained.

EXAMPLE 15B

Figure 55:
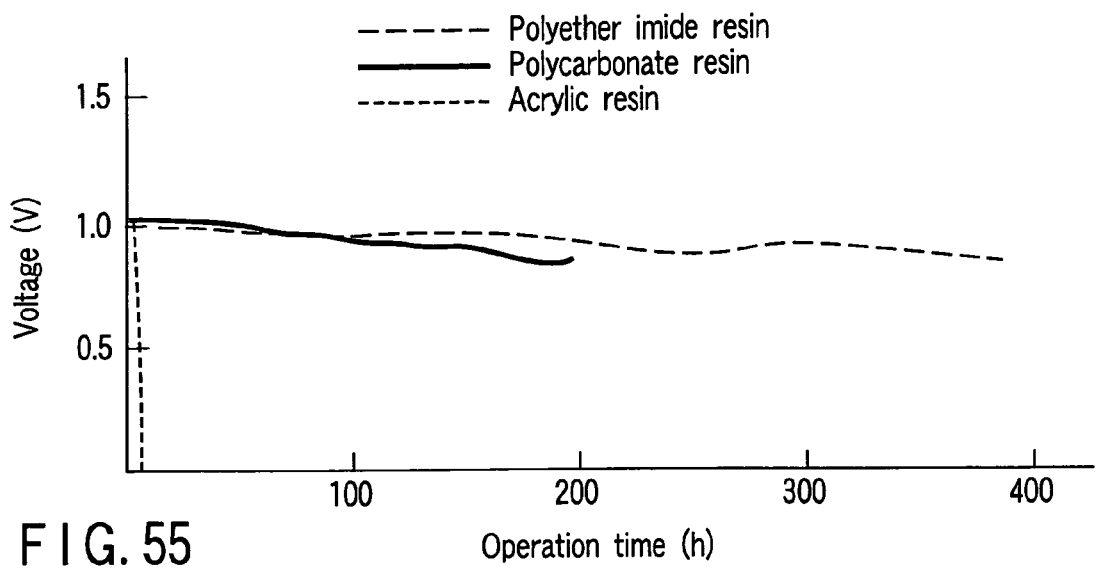
FIG. 55 is a view showing a current voltage characteristic in the direct type methanol fuel cell power generator.

By using the flow path plate used in Example 15A formed of an acrylic resin, when continuous operation under a charge current of 70 mA/cm$^2$ at 70° C., it was observed that an output was gradually lowered around about three hours, as shown in FIG. 55, and the output was hardly obtained after six hours. When a stack was dissembled after the completion of operation, it was found that a methanol aqueous solution fuel and an air were not normally supplied due to deformation of a member with a temperature increase.

Then, a poly-carbonate resin having a heat deformation temperature of 140° C. to 150° C. was used, a flow path plate shaped in the same way as in Example 15 was formed, and continuous operation under a charge current of 75 mA/cm$^2$ at 70° C. was carried out. As shown in FIG. 55, after continuous operation of about 200 hours, it was observed that an output is lowered by about 10%. After dissembling the stack, when a state of the flow path plate was checked, it was verified that fine irregularities were produced on a surface of the flow path plate by the presence of carbon paper provided in the electromotive portion unit. Further, it was verified that slight distortion occurred with the entire flow path plate.

Furthermore, in a polyether imide resin or polyimide resin having a higher heat deformation temperature, as shown in FIG. 55, it was observed that an output is lowered by about 5% in continuous operation of 300 hours or more as well. After dissembling the stack, no damage or change was observed on the surface of the flow path plate. In addition, from a result obtained by using a normal carbon based flow path plate, it was clarified that the output lowering of about 5% is due to the output lowering of the electromotive portion unit itself.

From the above result, it was clarified that a fuel cell flow path plate capable of making safe operation over a long period of time can be formed only in a resin member having at least a heat deformation temperature which is higher than an operation temperature by 100° C. or more.

The resin member used for the flow path plate described above must be sufficiently endurable to a temperature at which power is generated. One reason is that it is desired that heat deformation over a long period of time can be ignored with respect to a stack or fuel temperature during power generation. What is more important is that, while in actual power generating operation, a temperature of the cathode electrode surface in the electromotive portion unit is further higher than the stack or fuel temperature. A rise of 100° C. higher than the stack internal surface temperature is occasionally indicated depending on an operating condition for the fuel cell power generator. This indicates that a resin member having a heat deformation temperature at a point higher than at least 100° C. must be used as a flow path plate.

Therefore, in the case where an environment temperature of the fuel and stack is assumed to be 40° C. to 50° C., first, polyether imide resin, polyimide resin, polyamide imide resin, polysulfone resin, polyether sulfone resin, melamine phenol resin, or silicon resin, reliably having a heat deformation temperature at a temperature of 140° C. or more is used as a desired resin member for flow path plate. Next, in an operating condition for a fuel cell which is further close to a room temperature, it is preferable to apply polycarbonate resin, heat resistance vinyl ester resin, bis-phenol F-type epoxy resin, polyamide resin, polybutylene telephthalate resin or the like. In addition, at a temperature other than the above as well, it is concluded preferable to use a resin member whose temperature is higher than the stack surface temperature by 100° C. or more as a flow path plate.

As has been described above, in the direct type methanol fuel cell power generator 1500 according to the present embodiment, a deflection in output on an electromotive portion unit by unit basis is reduced and stable fuel supply can be carried out. Thus, a stable output can be obtained.

Sixteenth Embodiment

Figures 56A, 56B:
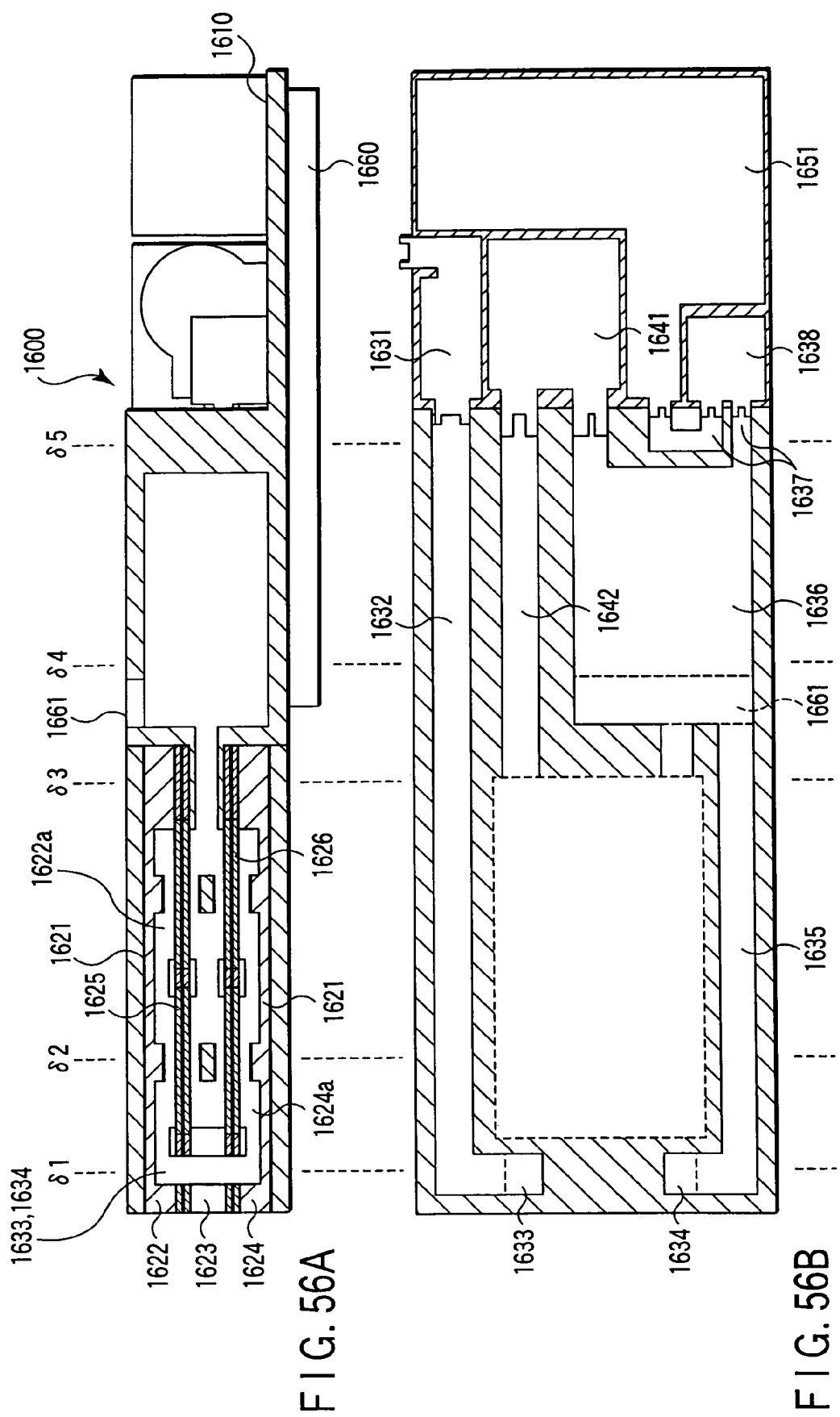
FIG. 56A is a longitudinal cross section showing a direct type methanol fuel cell power generator according to a sixteenth embodiment of the present invention.
FIG. 56B is a transverse cross section showing the direct type methanol fuel cell power generator.
Figure 57A:
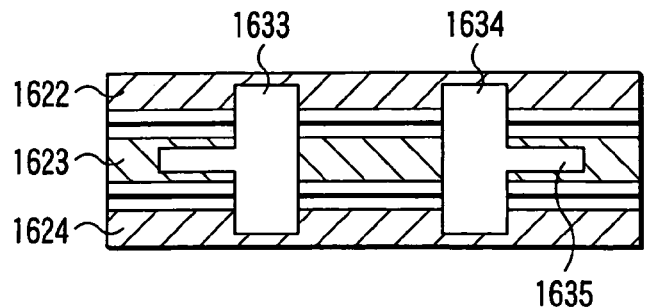
FIGS. 57A to 57E are sectional views taken along the lines δ1-δ1 to δ5-δ5 in FIGS. 56A and 56B.
Figure 57B:
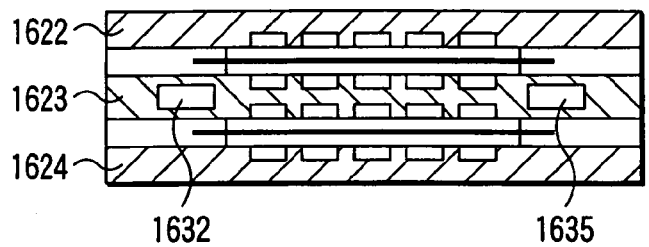
Figure 57C:
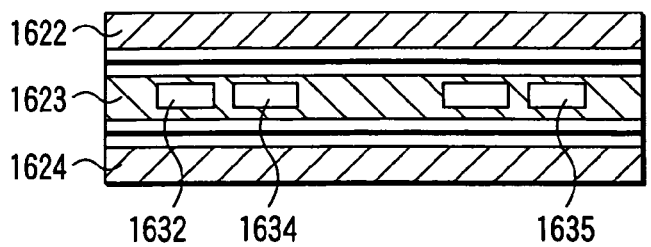
Figure 57D:
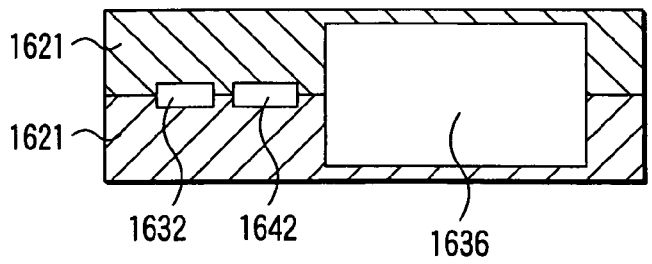
Figure 57E:
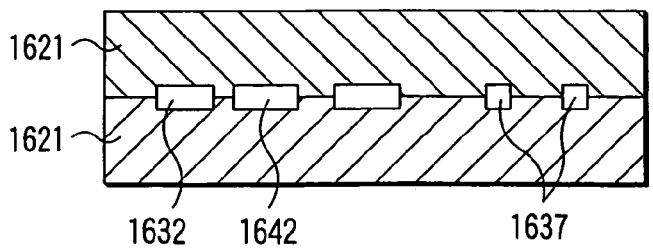

FIGS. 56A and 56B are views each showing a direct type methanol fuel cell power generator 1600 according to a sixteenth embodiment of the present invention. FIG. 56A is a longitudinal cross section showing the power generator. FIG. 56B is a transverse cross section showing the power generator. FIGS. 57A to 57E are sectional views taken along δ1-δ1 to δ5-δ5 in FIGS. 56A and 56B.

The direct type methanol fuel cell power generator 1600 was formed by a polyether imide resin for which long stability of the flow path plate used in Example 15 was demonstrated later as described such that the flow path plates 1622 to 1624 are integrated with a pipe and a fuel tank, as shown in FIG. 49.

The direct type methanol fuel cell power generator 1600 comprises a cabinet 1610, a stack portion 1620 held by this cabinet 1610, a supply portion 1630 for supplying a fuel and an oxidizing agent to this stack portion 1620, and a fuel and oxidizing tank portion 1650 removably provided at the cabinet 1610.

At the stack portion 1620, a set of electromotive part units having two electromotive units arranged in a horizontal direction is arranged on the top and bottom of one monopolar type flow path plate 1623. A methanol aqueous solution fuel is supplied to the flow path plate 1623. In addition, on the mono-polar type flow path plate 1623 and the flow path plates 1624, 1624 disposed at the top and bottom of four electromotive portion units, flow paths 1622a and 1624a are formed only on a face on which the electromotive portion units are arranged, so that air is supplied.

A tightening plate 1621 comprising a heat insulating material is installed on the outermost surface of the stack portion, and sealing is carried out by a sealing member included in the stack by using a tightening tool (not shown).

In the thus configured direct type methanol fuel cell power generator 1600, operation is carried out as follows. That is, air is fed to the stack portion 1610 by means of an air supply pump 1631, and the fed air flows through a supply channel 1632 for air supply formed at the outermost portion of the mono-polar type fuel flow path plate. At a portion 1633 penetrating in a stacking direction, the air is branched into flow paths of the top and bottom flow path plates 1622 and 1624. The air and steam having passed through a part of an electromotive portion unit meet the outermost ejection portion 1635 of the mono-polar type flow path plate at another penetrating port 1634. Then, the air and steam inflow a space 1636 for temporarily holding a methanol aqueous solution fuel.

On the other hand, the methanol aqueous solution fuel is fed from the space 1636 by means of a liquid supply pump 1641. The fed fuel flows through a fuel liquid supply channel 1637. After the fuel has flowed through the stack, the fuel inflows the space 1636 again together with carbon dioxide. A supply channel 1737 for supplying methanol with high concentration from a methanol cartridge 1651 by means of a high concentration methanol supply pump 1638 is formed in the space 1636.

EXAMPLE 16

In operation, the initial concentration of a methanol aqueous solution fuel was defined as 3 mol/l; a fuel flow rate was defined as 0.04 cm/min; and an air flow rate was defined as 40 cm/min. As a result of the operation, a temperature of the stack portion increased only to around 50° C. However, the leakage of the supplied air and methanol aqueous solution fuel was not observed. In addition, while distortion or the like was not observed with a flow path plate 4902 or the line including a space 4907 or the like, it was verified that continuous operation of 300 hours can be carried out.

In general, in a fuel cell power generator, a fuel container, a pipe, and a stack are handled as independent constituent elements, and the whole configuration is provided by combining these elements with each other. However, in a fuel cell power generator applied to use of a portable electronic device, there occurs a need to reduce equipment in thickness as well as structural simplification. Therefore, with respect to a stack included, it is preferable to arrange electromotive portions in parallel such that the number of stacks is remarkably reduced and such that a planar direction of electromotive portion units is parallel to a direction which is vertical to the thickness of equipment. This denotes that there occurs a need to reduce a pipe in thickness in order to supply or eject a fuel or an oxidizing agent with respect to a stack and that it becomes extremely difficult to apply piping to a side face of the flow path plate because the flow path plate is reduced in thickness. Further, it becomes difficult to maintain rigidity of equipment because the above plate is reduced in thickness. It is preferable that a fuel container or pipe be made of a resin, and the container or pipe made of the resin will suffice. However, in a situation in which the entire equipment must be specialized to ensure reduction in thickness, when the constituent elements are formed dependently, consideration must be taken into a structure for connecting a supply port or an ejection port of a stack fuel or oxidizing agent to a fuel container or pipe, or a structure for increasing the whole rigidity.

On the other hand, in the direct type methanol fuel cell power generator 1600, it becomes possible to produce a portion of a pipe or fuel container as an extension of a flow path plate, i.e., to form a tank or a pipe to be integrally molded by means of a resin member which is identical to the flow path plate. Thus, remarkable reduction in number of constituent parts and structure rigidity of a fuel cell power generator due to integration are easily achieved at the same time, making it possible to significantly improve productivity. In the case where a flow path plate is formed of a material consisting essentially of a carbon or is formed of a metal, it is very difficult to ensure such significant improvement. Thus, a material for the flow path plates 1622 to 1624 is required to be a resin material.

As has been described above, in the direct type methanol fuel cell power generator 1600 according to the present embodiment, a deflection in output on an electromotive portion unit by unit is reduced and stable fuel supply can be carried out. Thus, a stable output can be obtained.

In the above-described direct type methanol fuel cell power generator 1600, there may be provided an electric circuit 1660 for supplying a part of the power output obtained from the electromotive portion unit group to the liquid supply pump 1641; and the high concentration methanol supply pump 1638 and the air supply pump 1631 and for supplying the remaining power output to the external electric device.

In FIG. 56A, reference numeral 1661 denotes a gas-liquid separating mechanism for separating only a gas component from a discharged substance of the anode electrode; reference numeral 1660 denotes the electric circuit for supplying a part of the power output obtained from the electromotive portion unit group to the liquid supply pump 1641 and the high concentration methanol supply pump 1638 and for supplying at least a part of the remaining power output to the external electric circuit.

In this manner, even in the case where a part of the power output has been supplied to the external electric device, it has been successfully verified that good power generating operation can be carried out in the same manner as in Example 16.

Figure 58:
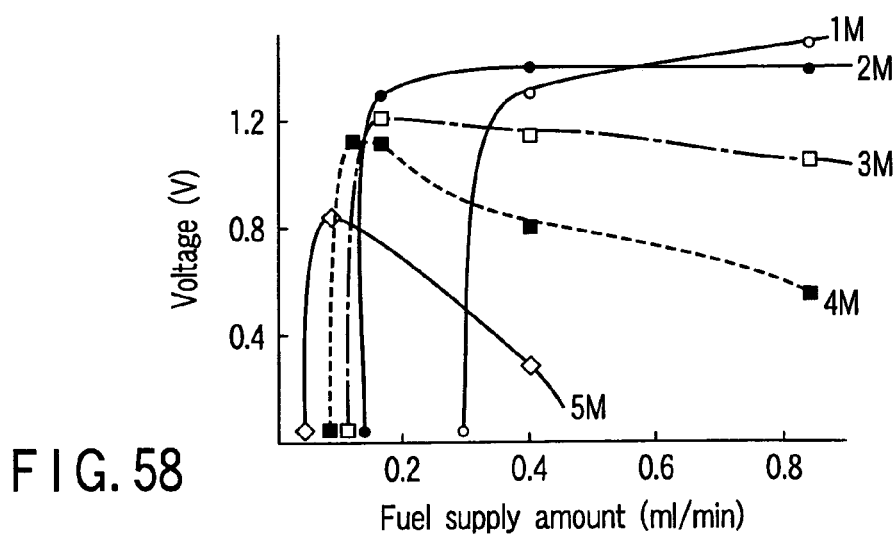
FIG. 58 is a view showing a fuel concentration by fuel concentration basis a relationship between a voltage and a fuel supply amount in the direct type methanol fuel cell power generator.
Figure 59:
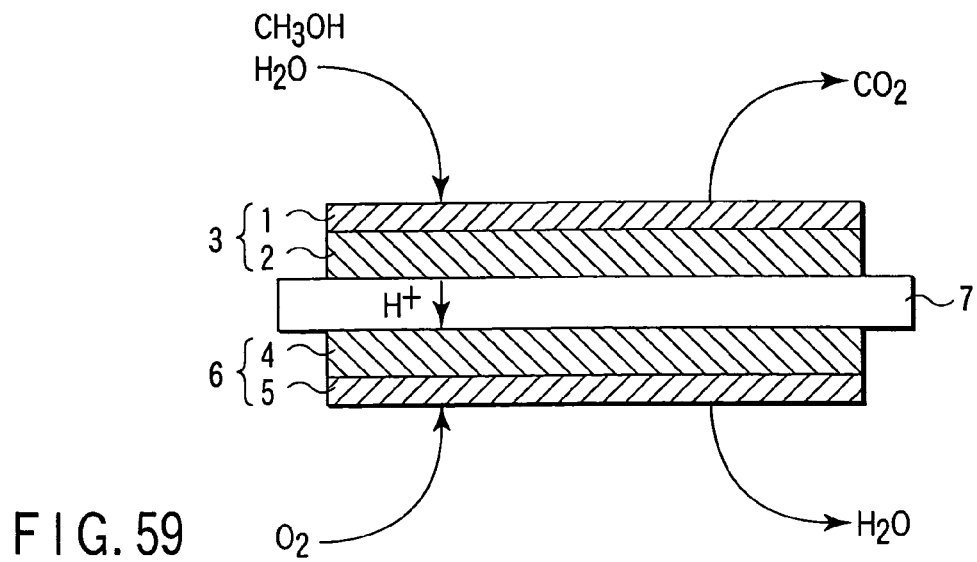
FIG. 59 is an illustrative view schematically illustrating an arrangement of general electromotive portion units.

In FIG. 58, in the direct type methanol fuel cell power generator 1600, a charge current output on a four-electromotive portion unit basis was set to 0.75A, and a methanol water solution fuel concentration and a fuel flow rate were changed, whereby a power generation test was carried out. An air supply amount was set to 240 ml/min.

As is evident from Formula III or mathematical formulas 3 and 4, in power generation, 6 electrons can be obtained from one molecule of paired methanol and water. Thus, in order to obtain a current of 1A by a single electromotive portion unit, methanol and water of 1.725 (mol/s) are obtained as a supply amount which is a theoretically minimum requirement. In addition, in the case where there are provided "n" electromotive portion units which are electrically wired in series or in parallel, a supply amount of 1.725×n (mol/sec) is required as a theoretical amount.

This denotes that: a theoretical supply amount of 34.5 (ml/min) is required to obtain a current of 1 A from a single electromotive portion unit in the case where a fuel having concentration of 3 mol/l is used; a theoretical amount of 51.8 (ml/min) is required in the case where a fuel having concentration of 2 mol/l is used; and a theoretical amount of 104 (ml/min) is required in the case where a fuel having concentration 1 mol/l is used; and a theoretical supply amount of 25.9 (ml/min) is required in the case where a fuel having concentration of 4 mol/l is used.

Further, in the case where a current of 1A is obtained from each of "n" electromotive portion units, a supply amount which is "n" times as much as these supply quantities is required as a total amount.

From FIG. 58, in fuel concentration of 3 mol/l, it is found that a maximum voltage is obtained in a supply amount of methanol water solution fuel of about 0.17 ml/min, and similarly, no maximum value is obtained in a supply amount of about 0.3 ml/min in fuel concentration of 2 mol/l and in 0.8 ml/min in fuel concentration of 1 mol/l. On the other hand, it is found that, in fuel concentration of 4 ml/min, although a maximum value is obtained in about 0.12 ml/min, the maximum value is slightly lower than a value in 3 mol/l, and a decrease of the maximum value is significant in 5 mol/l. Table 1 summarizes these results.

TABLE 1

| Concentration (mol/l) | Voltage value (V) in charge current of 0.75 A Supply amount | | | Theoretical supply amount (μ/min) in charge current of 0.75 A |
|---|---|---|---|---|
| | 176 (μl/min) | 400 (μl/min) | 800 (μl/min) | |
| 1 | 0.00 | 1.28 | 1.44 | 312 |
| 2 | 1.28 | 1.36 | 1.36 | 156 |
| 3 | 1.20 | 1.12 | 1.04 | 104 |
| 4 | 1.08 | 0.80 | 0.00 | 78 |

As is evident from Table 1, it is found that the maximum voltage obtained at each concentration cannot be reached or no voltage can be obtained; and that a value equal to or greater than 90% of the maximum voltage can be obtained in a supply amount which is about 1.5 to 2.0 times the theoretical amount. However, in the case of a supply amount more than the above range, a one-sided voltage drop is observed.

Moreover, in a concentration of about 4 mol/l or more, lowering of the maximum voltage value with a rise of concentration is significant. It is preferable to use a maximum of methanol water solution fuel concentration of about 5 mol or less. In the case of low concentration, a supply amount which is much more than 2 times the theoretical amount is required. Thus, it is found preferable to use methanol water solution fuel concentration of at least 1 mol/l or more in order to reduce a pressure loss subjected from the flow path plate, and to save power consumption of a complementary device.

That is, it is found that a condition for methanol water solution fuel concentration and supply amount is proper, the condition meeting Formulas (101) to (103).

In the above-described embodiments and Examples, although only a fuel flow path is of alternate type, an air flow path may be of alternative type. In addition, both of the fuel flow path and the air flow path may be of alternate type.

The present-invention is not limited to the above-described embodiments as is. At the stage of implementation, constituent elements can be embodied by modifying them without deviating from the spirit of the invention. In addition, a variety of inventions can be formed by using a proper combination of a plurality of constituent elements disclosed in the above-described embodiments. For example, some constituent elements may be deleted from all the constituent elements disclosed in the embodiments. Further, the constituent elements over the different embodiments may be combined with each other as required.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A direct type liquid fuel cell power generator, comprising:
    an electromotive portion unit group composed of a plurality of electromotive portion units formed by sandwiching an electrolyte film between an anode electrode including an anode catalyst layer and a cathode electrode including a cathode catalyst layer;
    a first flow path plate having formed thereon a first flow path which is disposed in abutment with the anode electrode of the electrode portion unit group and through which a fuel flows; and
    a second flow path plate having formed thereon a second flow path which is disposed in abutment with the cathode electrode of the electrode portion unit group and through which an oxidizing agent flows;
    wherein the electromotive portion units are interposed between the first flow path plate and the second flow path plate and have different electrolyte films, and
    wherein the first flow path passes so as to come into contact with all anode electrodes of the electromotive portion unit group without branching from an inlet thereof to an outlet, and is formed so as to come into contact with an anode electrode of at least one electromotive portion unit a plurality of times.

2. A direct type liquid fuel cell power generator according to claim 1 comprising: meeting the following condition:

$$Y \leq Y_0 \times 2 \quad (101)$$

$$Y_0 = 1.04 \times 10^{-4} \times nI/C_{MeOH} \quad (102)$$

$$1.0 \leq C_{MeOH} \leq 5.0 \quad (103)$$

wherein "n" denotes the number of electromotive portion units which the electromotive portion unit group has; I denotes a current outputted by each electromotive portion unit; $C_{MeOH}$ denotes a concentration of a methanol aqueous solution fuel to be supplied; Y denotes a total amount (l/min) of the methanol aqueous solution fuel supplied to the electromotive portion unit group; and a temperature of the each electromotive portion unit is within the range from 40° C. to 70° C.

3. A direct type liquid fuel cell power generator according to claim 1, comprising:
    a liquid fuel supply device which supplies a liquid fuel to the flow path plate which comes into contact with an anode electrode of the electromotive portion unit group;
    an oxidizing agent supply device which supplies an oxidizing agent to the flow path plate which comes into contact with a cathode electrode of the electromotive portion unit group;
    a liquid fuel container which houses a liquid fuel and supplies the liquid fuel to the liquid fuel supply device;
    a gas-liquid separating mechanism which separates only a gas component from a discharged matter of the anode electrode; and
    an electric circuit which supplies a part of a voltage output obtained from the electromotive portion unit group to the liquid fuel supply device and the oxidizing agent supply device and supplies at least a part of the remaining power output to external electric equipment.

* * * * *